(12) United States Patent
Visser et al.

(10) Patent No.: US 12,244,994 B2
(45) Date of Patent: Mar. 4, 2025

(54) PROCESSING OF AUDIO SIGNALS FROM MULTIPLE MICROPHONES

(71) Applicant: QUALCOMM Incorporated, San Diego, CA (US)

(72) Inventors: Erik Visser, San Diego, CA (US); Fatemeh Saki, San Diego, CA (US); Yinyi Guo, San Diego, CA (US); Lae-Hoon Kim, San Diego, CA (US); Rogerio Guedes Alves, Macomb Township, MI (US); Hannes Pessentheiner, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/814,660

(22) Filed: Jul. 25, 2022

(65) Prior Publication Data
US 2023/0036986 A1    Feb. 2, 2023

Related U.S. Application Data

(60) Provisional application No. 63/203,562, filed on Jul. 27, 2021.

(51) Int. Cl.
*H04R 3/00* (2006.01)
*H04R 1/10* (2006.01)
(Continued)

(52) U.S. Cl.
CPC ......... *H04R 1/1041* (2013.01); *H04R 1/1083* (2013.01); *H04R 1/406* (2013.01);
(Continued)

(58) Field of Classification Search
CPC .... H04R 1/1041; H04R 1/1083; H04R 1/406; H04R 3/005; H04R 5/027; H04S 3/008; H04S 7/30
(Continued)

(56) References Cited

U.S. PATENT DOCUMENTS 10,361,673 B1   7/2019  Matsukawa
2004/0252845 A1* 12/2004 Tashev ................. G01S 3/8034
                                                        381/56
(Continued)

FOREIGN PATENT DOCUMENTS

WO    2019183225 A1   9/2019
WO    2020159557 A1   8/2020
(Continued)

OTHER PUBLICATIONS

International Search Report and Written Opinion—PCT/US2022/074156—ISA/EPO—Nov. 8, 2022.
(Continued)

*Primary Examiner* — William J Deane, Jr.
(74) *Attorney, Agent, or Firm* — QUALCOMM Incorporated; Espartaco Diaz Hidalgo

(57) ABSTRACT

A first device includes a memory configured to store instructions and one or more processors configured to receive audio signals from multiple microphones. The one or more processors are configured to process the audio signals to generate direction-of-arrival information corresponding to one or more sources of sound represented in one or more of the audio signals. The one or more processors are also configured to and send, to a second device, data based on the direction-of-arrival information and a class or embedding associated with the direction-of-arrival information.

30 Claims, 23 Drawing Sheets

(51) Int. Cl.
*H04R 1/40* (2006.01)
*H04R 5/027* (2006.01)
*H04S 3/00* (2006.01)
*H04S 7/00* (2006.01)

(52) U.S. Cl.
CPC ............ *H04R 3/005* (2013.01); *H04R 5/027* (2013.01); *H04S 3/008* (2013.01); *H04S 7/30* (2013.01); *H04R 2410/01* (2013.01); *H04R 2430/23* (2013.01); *H04S 2400/01* (2013.01); *H04S 2400/11* (2013.01); *H04S 2400/15* (2013.01)

(58) Field of Classification Search
USPC .......................................... 381/92, 111–115
See application file for complete search history.

(56) References Cited

U.S. PATENT DOCUMENTS

| | | | |
|---|---|---|---|
| 2012/0020485 A1 | 1/2012 | Visser et al. | |
| 2013/0070928 A1* | 3/2013 | Ellis .................. | H04R 25/30 381/56 |
| 2013/0259243 A1* | 10/2013 | Herre .................. | G10L 19/02 381/57 |
| 2014/0337021 A1* | 11/2014 | Kim .................. | G10L 25/81 704/228 |
| 2016/0150020 A1 | 5/2016 | Farmer et al. | |
| 2016/0379456 A1 | 12/2016 | Nongpiur et al. | |
| 2017/0374455 A1 | 12/2017 | Shastry et al. | |
| 2018/0302738 A1 | 10/2018 | Di Censo et al. | |
| 2018/0307753 A1 | 10/2018 | Guo et al. | |
| 2019/0132685 A1 | 5/2019 | Skoglund et al. | |
| 2020/0059776 A1 | 2/2020 | Martin et al. | |
| 2020/0090644 A1 | 3/2020 | Klingler et al. | |
| 2021/0092514 A1 | 3/2021 | Agarwala et al. | |
| 2021/0200510 A1* | 7/2021 | Browy .................. | G06F 3/167 |
| 2021/0200519 A1 | 7/2021 | Mestchian | |
| 2021/0266655 A1 | 8/2021 | Patel et al. | |
| 2021/0289296 A1 | 9/2021 | Stamenovic et al. | |
| 2021/0321213 A1 | 10/2021 | Selfon | |
| 2022/0007106 A1 | 1/2022 | Soto | |
| 2022/0292134 A1 | 9/2022 | Shahbazi Mirzahasanloo | |
| 2023/0035531 A1 | 2/2023 | Visser | |

FOREIGN PATENT DOCUMENTS

| | | |
|---|---|---|
| WO | 2021202023 A1 | 10/2021 |
| WO | 2022015427 A1 | 1/2022 |
| WO | 2022115838 | 6/2022 |

OTHER PUBLICATIONS

Stephen X., et al., "Improving Pedestrian Safety in Cities Using Intelligent Wearable Systems", IEEE Internet of Things Journal, IEEE, USA, vol. 6, No. 5, Oct. 1, 2019, pp. 7497-7514, XP011749742, DOI: 10.1109/JIOT.2019.2903519 [Retrieved on Oct. 8, 2019] p. 7500, Right-Hand Column—p. 7503, Right-Hand Column, Figures 1,8.

* cited by examiner

PROCESSING OF AUDIO SIGNALS FROM MULTIPLE MICROPHONES

I. CROSS-REFERENCE TO RELATED APPLICATIONS

The present application claims priority from Provisional Patent Application No. 63/203,562, filed Jul. 27, 2021, entitled "DIRECTIONAL AUDIO SIGNAL PROCESSING," the content of which is incorporated herein by reference in its entirety.

II. Field

The present disclosure is generally related to audio signal processing.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Devices, such as mobile and smart phones, can be paired with a headset to enable a user to listen to audio without holding a mobile phone to the user's ear. One of the drawbacks of a user wearing a headset is that the user may be unaware of a surrounding environment. As a non-limiting example, if a user is crossing an intersection on foot, the user may not be able to hear an approaching vehicle. In scenarios where the user's focus is elsewhere (e.g., on the user's mobile phone or looking in a direction away from the approaching vehicle), the user may not be able to determine that the vehicle is approaching or from which direction the vehicle is approaching.

IV. SUMMARY

According to one implementation of the present disclosure, a first device includes a memory configured to store instructions and one or more processors. The one or more processors are configured to receive audio signals from multiple microphones. The one or more processors are also configured to process the audio signals to generate direction-of-arrival information corresponding to one or more sources of sound represented in one or more of the audio signals. The one or more processors are further configured to send, to a second device, data based on the direction-of-arrival information and a class or embedding associated with the direction-of-arrival information.

According to another implementation of the present disclosure, a method of processing audio includes receiving, at one or more processors of a first device, audio signals from multiple microphones. The method also includes processing the audio signals to generate direction-of-arrival information corresponding to one or more sources of sound represented in one or more of the audio signals. The method further includes sending, to a second device, data based on the direction-of-arrival information and a class or embedding associated with the direction-of-arrival information.

According to another implementation of the present disclosure, a non-transitory computer-readable medium includes instructions that, when executed by one or more processors of a first device, cause the one or more processors to receive audio signals from multiple microphones. The instructions, when executed by the one or more processors, further cause the one or more processors to process the audio signals to generate direction-of-arrival information corresponding to one or more sources of sound represented in one or more of the audio signals. The instructions, when executed by the one or more processors, also cause the one or more processors to send, to a second device, data based on the direction-of-arrival information and a class or embedding associated with the direction-of-arrival information.

According to another implementation of the present disclosure, a first device includes means for receiving audio signals from multiple microphones. The first device also includes means for processing the audio signals to generate direction-of-arrival information corresponding to one or more sources of sound represented in one or more of the audio signals. The first device also includes means for sending, to a second device, data based on the direction-of-arrival information and a class or embedding associated with the direction-of-arrival information.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
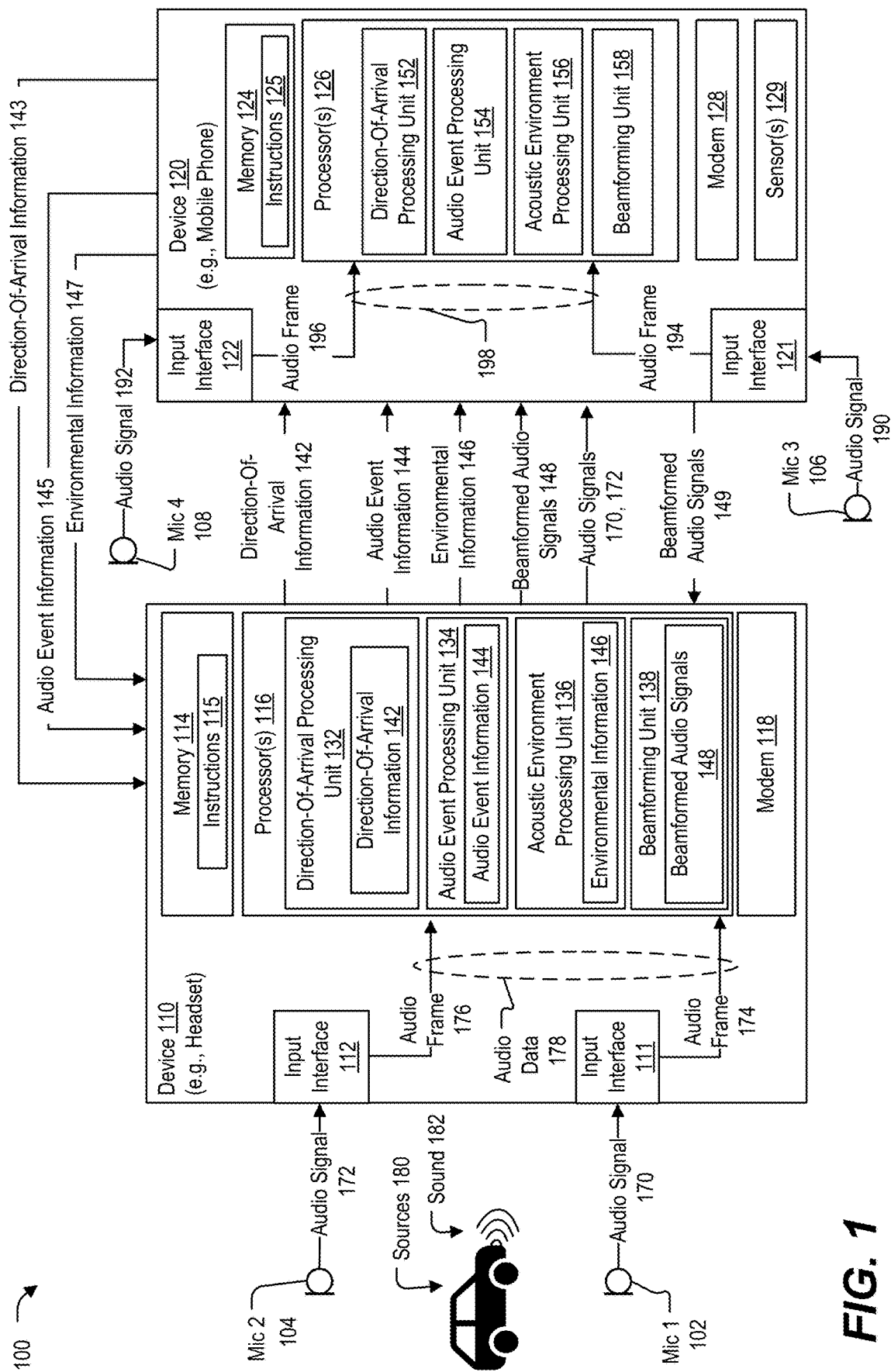
FIG. 1 is a block diagram of a particular illustrative aspect of a system configured to perform directional processing on one or more audio signals received from one or more microphones, in accordance with some examples of the present disclosure.

Systems and methods of performing directional audio signal processing are disclosed. A first device, such as a headset, can include a plurality of microphones configured to capture sounds in a surrounding environment. Each microphone may have a different orientation and location on the first device, such as to capture sounds from different directions. In response to capturing the sounds, each microphone can generate a corresponding audio signal that is provided to a directional audio signal processing unit. The directional audio signal processing unit can process the audio signals from the microphones to identify different audio events associated with the sounds and a location of each audio event. In some implementations, audio signals associated with an audio event are processed via one or more classifiers at the first device to identify an audio class of the audio event. In a non-limiting example, if at least one microphone of the plurality of microphones captures a car sound, the directional audio signal processing unit can identify the car sound based on characteristics (e.g., pitch, frequency, etc.) associated with the corresponding audio signal and can identify a relative direction of the car sound based on the respective microphones that captured the sound. In response to identifying the car sound and the corresponding relative direction, the first device can generate data representative of the sound and direction, and can provide the data to a second device, such as a mobile phone. In some examples, the data representative of the sound can include an audio class or embedding and direction-of-arrival information associated with the source of the sound. The second device can use the data (e.g., the directional information) to perform additional operations. As a non-limiting example, the second device may determine whether to generate a visual alert or a physical alert to warn a user of the headset of a nearby vehicle.

According to some aspects, distributed audio processing is performed using a first device, such as a headset device, to capture sounds using multiple microphones and to perform preliminary processing of audio corresponding to the captured sounds. For example, the first device may perform direction-of-arrival processing to locate one or more sound sources, acoustic environment processing to detect an environment or a change of environment of the first device based on ambient sounds, audio event processing to identify sounds corresponding to audio events, or a combination thereof, as illustrative, non-limiting examples.

Because the first device may be relatively constrained in terms of processing resources, memory capacity, battery life, etc., the first device can send information regarding the audio processing to a second device, such as a mobile phone, that has greater computational, memory, and power resources. For example, in some implementations the first device sends a representation of the audio data and a classification of an audio event detected in the audio data to the second device, and the second device performs additional processing to verify the classification of the audio event. According to some aspects, the second device uses information provided by the first device, such as direction information and a classification associated with a sound event, as additional inputs to a classifier that processes the audio data. Performing classification of audio data in conjunction with the direction information, the classification from the first device, or both, can improve an accuracy, speed, or one or more other aspects of the classifier at the second device.

Such distributed audio processing enables the user of the first device to benefit from the enhanced processing capability of the second device, such as by providing accurate detection of sound events occurring in the vicinity of the user and enabling the first device to alert the user of detected events. For example, the first device may automatically transition from a playback mode (e.g., playing music or other audio to the user) to a transparency mode in which sound corresponding to a detected audio event is played to the user. Other benefits and examples of applications in which the disclosed techniques can be used are described in further detail below and with reference to the accompanying figures.

Particular aspects of the present disclosure are described below with reference to the drawings. In the description, common features are designated by common reference numbers. As used herein, various terminology is used for the purpose of describing particular implementations only and is not intended to be limiting of implementations.

For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 110 including one or more processors ("processor(s)" 116 of FIG. 1), which indicates that in some implementations the device 110 includes a single processor 116 and in other implementations the device 110 includes multiple processors 116. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform directional processing on multiple audio signals received from multiple microphones is disclosed and generally designated 100. The system 100 includes a first microphone 102 and a second microphone 104 that are each coupled to, or integrated in, a device 110. The system 100 also includes a third microphone 106 and a fourth microphone 108 that are coupled to, or integrated in, a device 120. Although two microphones 102, 104 are illustrated coupled to or integrated in the device 110, and two microphones 106, 108 are illustrated coupled to or integrated in the device 120, in other implementations, the device 110, the device 120, or both, can each be coupled to any number of additional microphones. As a non-limiting example, four (4) microphones can be coupled to the device 110 and another four (4) microphones can be coupled to the device 120. In some implementations, the microphones 102, 104, 106, and 108 are implemented as directional microphones. In other implementations, one or more (or all) of the microphones 102, 104, 106, and 108 are implemented as omni-directional microphones.

According to one implementation, the device 110 corresponds to a headset and the device 120 corresponds to a mobile phone. In some scenarios, the device 110 can be paired with the device 120 using a wireless connection (e.g., a Bluetooth® (a registered trademark of Bluetooth SIG, Inc., Washington) connection). For example, the device 110 can communicate with the device 120 using a low-energy protocol (e.g., a Bluetooth® low energy (BLE) protocol). In other examples, the wireless connection corresponds to transmission and receipt of signals in accordance with an IEEE 802.11-type (e.g., WiFi) wireless local area network or one or more other wireless radiofrequency (RF) communication protocols.

The first microphone 102 is configured to capture sound 182 from one or more sources 180. In the illustrative example of FIG. 1, the source 180 corresponds to a vehicle, such as a car. Thus, if the device 110 corresponds to a headset, the microphones 102, 104 can be used to capture sounds 182 of a nearby car. However, it should be understood that the vehicle is merely a non-limiting example of a sound source and that the techniques described herein can be implemented with other sound sources. Upon capturing the sound 182 from the source 180, the first microphone 102 is configured to generate an audio signal 170 that is representative of the captured sound 182. In a similar manner, the second microphone 104 is configured to capture the sound 182 from the one or more sources 180. Upon capturing the sound 182 from the source 180, the second microphone 104 is configured to generate an audio signal 172 that is representative of the captured sound 182.

The first microphone 102 and the second microphone 104 can have different locations, different orientations, or both. As a result, the microphones 102, 104 may capture the sound 182 at different times, with different phases, or both. To illustrate, if the first microphone 102 is closer to the source 180 than the second microphone 104 is to the source 180, the first microphone 102 may capture the sound 182 prior to the second microphone 104 capturing the sound 182. As described below, if the location and orientation of the microphones 102, 104 are known, the audio signals 170, 172 generated by the microphones 102, 104, respectively, can be used to perform directional processing at the device 110, the device 120, or both. That is, the audio signals 170, 172 can be used by the device 110 to determine a location of the source 180, to determine a direction-of-arrival of the sound 182, to spatially filter audio corresponding to the sound 182, etc. As further described below, the device 110 can provide results of the directional processing (e.g., data associated with the directional processing) to the device 120 for high-complexity processing, and vice versa.

The device 110 includes a first input interface 111, a second input interface 112, a memory 114, one or more processors 116, and a modem 118. The first input interface 111 is coupled to the one or more processors 116 and is configured to be coupled to the first microphone 102. The first input interface 111 is configured to receive the audio signal 170 (e.g., a first microphone output) from the first microphone 102 and to provide the audio signal 170 to the processor 116 as an audio frame 174. The second input interface 112 is coupled to the one or more processors 116 and is configured to be coupled to the second microphone 104. The second input interface 112 is configured to receive the audio signal 172 (e.g., a second microphone output) from the second microphone 104 and to provide the audio signal 172 to the processor 116 as an audio frame 176. The audio frames 174, 176 may also be referred to herein as audio data 178.

The one or more processors 116 optionally include a direction-of-arrival processing unit 132, an audio event processing unit 134, an acoustic environment processing unit 136, a beamforming unit 138, or a combination thereof. According to one implementation, one or more of the components of the one or more processors 116 can be implemented using dedicated circuitry. As non-limiting examples, one or more of the components of the one or more processors 116 can be implemented using a field programmable gate array (FPGA), an application-specific integrated circuit (ASIC), etc. According to another implementation, one or more of the components of the one or more processors 116 can be implemented by executing instructions 115 stored in the memory 114. For example, the memory 114 can be a non-transitory computer-readable medium that stores instructions 115 executable by the one or more processors 116 to perform the operations described herein.

The direction-of-arrival processing unit 132 can be configured to process the multiple audio signals 170, 172 to generate direction-of-arrival information 142 corresponding to the sources 180 of the sound 182 represented in the audio signals 170, 172. To illustrate, the direction-of-arrival processing unit 132 can select audio frames 174, 176 generated from audio signals 170, 172 from each microphone 102, 104 that represent a similar sound, such as the sound 182 from the source 180. For example, the direction-of-arrival processing unit 132 can process the audio frames 174, 176 to compare sound characteristics and ensure that the audio frames 174, 176 represent the same instance of the sound 182. In an illustrative, non-limiting example of direction-of-arrival processing, in response to determining that the audio frames 174, 176 represent the same instance of the sound 182, the direction-of-arrival processing unit 132 can compare time stamps of each audio frame 174, 176 to determine which microphone 102, 104 captured the corresponding instance of the sound 182 first. If the audio frame 174 has an earlier time stamp than the audio frame 176, the direction-of-arrival processing unit 132 can generate direction-of-arrival information 142 indicating that the source 180 is closer in proximity to the first microphone 102. If the audio frame 176 has an earlier time stamp than the audio frame 174, the direction-of-arrival processing unit 132 can generate direction-of-arrival information 142 indicating that the source 180 is closer in proximity to the second microphone 104. Thus, based on timestamps of similar audio frames 174, 176, the direction-of-arrival processing unit 132 can localize the sound 182 and the corresponding source 180. Time stamps from audio frames from additional microphones can be used to improve localization in a similar manner as described above.

In some implementations, one or more other techniques to determine the direction-of-arrival information 142 can be used instead of, or in addition to, time differences as described above, such as measuring phase differences of the sound 182 received at each microphone in a microphone array of the device 110 (e.g., the microphones 102 and 104). In some implementations, the microphones 102, 104, 106, and 108 may be operated, in conjunction with the device 120, as a distributed microphone array, and the direction-of-arrival information 142 is generated based on characteristics, such as time of arrival or phase, of the sound from each of the microphones 102, 104, 106, and 108 and based on relative positions and orientations of the microphones 102, 104, 106, and 108. In such implementations, information regarding sound characteristics (e.g., phase information, time information, or both), the captured audio data (e.g., at least a portion of the audio signals 170, 172), or a combination thereof, may be transmitted between the device 110 and the device 120 for direction-of-arrival detection using the distributed microphone array.

The direction-of-arrival information 142 may be sent to the device 120. For example, the modem 118 may send data to the device 120 based on the direction-of-arrival information 142. In some examples, generating the direction-of-arrival information 142 at the device 110 corresponds to performing low-complexity processing operations. The device 120 may use the direction-of-arrival information 142 to perform high-complexity processing operations. For example, in some implementations, the device 110 may be a resource-constrained device, such as a device with limited battery life, limited memory capacity, or limited processing capacity relative to the device 120. Performing high-complexity processing operations at the device 120 may offload resource-intensive operations from the device 110.

To illustrate, the device 120 may optionally include one or more sensors 129. As non-limiting examples, the sensors 129 may include non-audio sensors, such as a 360-degree camera, a lidar sensor, etc. Based on the direction-of-arrival information 142, the device 120 can command the 360-degree camera to focus on the source 180, command the lidar sensor to measure the distance between a user of the devices 110, 120 and the source 180, etc.

The audio event processing unit 134 can be configured to process the multiple audio signals 170, 172 to perform audio event detection. To illustrate, the audio event processing unit 134 can process sound characteristics of the audio frames 174, 176 and compare the sound characteristics to a plurality of audio event models to determine whether an audio event has occurred. For example, the audio event processing unit 134 may access a database (not shown) that includes models for different audio events, such as a car horn, a train horn, a pedestrian talking, etc. In response to the sound characteristics matching (or substantially matching) a particular model, the audio event processing unit 134 can generate audio event information 144 indicating that the sound 182 represents an audio event associated with the particular model. As used herein, sound characteristics of an audio frame may "match" a particular sound model if the pitch and frequency components of the audio frame are within threshold values of pitch and frequency components of the particular sound model.

In some implementations, the audio event processing unit 134 includes one or more classifiers configured to process audio signal data, such as the audio signals 170, 172, the sound characteristics of the audio frames 174, 176, beamformed data based on the audio signals 170, 172, or a combination thereof, to determine an associated class from among multiple classes supported by the one or more classifiers. In an example, the one or more classifiers operate in conjunction with the plurality of audio event models described above to determine a class (e.g., a category, such as "dog barking," "glass breaking," "baby crying," etc.) for a sound represented in one or more of the audio signals and associated with an audio event. For example, the one or more classifiers can include a neural network that has been trained using labeled sound data to distinguish between sounds corresponding to the various classes and that is configured to process the audio signal data to determine a particular class for a sound represented by the audio signal data (or to determine, for each class, a probability that the sound belongs to that class). The class can correspond to or be included in the audio event information 144. An example of the device 110 including the one or more classifiers is described in further detail with reference to FIG. 6.

In some implementations, the audio event processing unit 134 includes one or more encoders configured to process audio signal data, such as the audio signals 170, 172, the sound characteristics of the audio frames 174, 176, beamformed data based on the audio signals 170, 172, or a combination thereof, to generate a signature of a sound represented in the audio signal data. For example, the encoder can include one or more neural networks configured to process the audio signal data to generate an embedding corresponding to a particular sound in the audio signal data and associated with an audio event. An "embedding" can designate a relatively low-dimensional space represented by a vector (e.g., an ordered sequence of values or a set of indexed values) into which higher-dimensional vectors can be translated and that may preserve semantical relationships. To illustrate, an audio signal can be represented using a sequence of relatively large vectors (e.g., representing spectral data and other audio features) that can be processed to generate an embedding that is represented by a smaller vector. The embedding may include sufficient information to enable detection of the particular sound in audio signals. The signature (e.g., the embedding) can correspond to or be included in the audio event information 144. An example of the device 110 including the one or more encoders is described in further detail with reference to FIG. 7.

In a non-limiting example, the audio event may correspond to a sound of an approaching vehicle (e.g., the source 180). Based on the audio event, the audio event processing unit 134 can generate the audio event information 144, and the audio event information 144 may be sent to the device 120. For example, the modem 118 may send data, corresponding to a detected event, to the device 120. In some examples, generating the audio event information 144 at the device 110 corresponds to performing low-complexity processing operations. The device 120 may use the audio event information 144 to perform high-complexity processing operations. To illustrate, based on the audio event information 144, the device 120 can perform one or more operations such as processing audio data at a larger, more accurate classifier to verify the audio event, editing an audio scene based on the sound signature (e.g., to remove sounds that correspond to an embedding included in the audio event information 144, or to remove sounds that do not correspond to the embedding), commanding the 360-degree camera to focus on the source 180, commanding the lidar sensor to measure the distance between a user of the devices 110, 120 and the source 180, etc.

The acoustic environment processing unit 136 can be configured to process the multiple audio signals 170, 172 to perform acoustic environment detection. To illustrate, the acoustic environment processing unit 136 can process sound characteristics of the audio frames 174, 176 to determine acoustic characteristics of a surrounding environment. As a non-limiting example, the acoustic characteristics may include a direct-to-reverberant ratio (DRR) estimation of the surrounding environment. The acoustic environment processing unit 136 may generate environmental information 146 based on the acoustic characteristics of the surrounding environment. For example, if the DRR estimation is relatively high, the environmental information 146 may indicate that the device 110 is in an indoor environment. However, if the DRR estimation is relatively low, the environmental information 146 may indicate that the device 110 is in an outdoor environment. In some implementations, the acoustic environment processing unit 136 can include or be implemented as one or more classifiers configured to generate an output indicating an audio environment class, which may correspond to or be included in the environmental information 146.

The environmental information 146 may be sent to the device 120. For example, the modem 118 may send data, corresponding to (e.g., identifying) a detected environment, to the device 120. In some examples, generating the environmental information 146 at the device 110 corresponds to performing low-complexity processing operations. The device 120 may use the environmental information 146 to perform high-complexity processing operations. To illustrate, based on the environmental information 146, the device 120 can perform one or more operations such as removing environmental or background noise from one or more audio signals, editing an audio scene based on the environmental information 146, or changing a setting of the 360-degree camera to capture outdoor images as opposed to indoor images, as illustrative, non-limiting examples.

The beamforming unit 138 can be configured to process the multiple audio signals 170, 172 to perform beamforming. In some examples, the beamforming unit 138 performs beamforming based on the direction-of-arrival information 142. Alternatively or additionally, in some examples the beamforming unit 138 performs adaptive beamforming that utilizes a multichannel signal processing algorithm to spatially filter the audio signals 170, 172 and determine a location of the source 180. The beamforming unit 138 may point a beam of increased sensitivity to the location of the source 180 and suppress audio signals from other locations. In some examples, the beamforming unit 138 is configured to adjust processing of the audio signal 170 relative to the audio signal 172 (e.g., by introducing a temporal or phase delay, adjusting a signal amplitude, or both, based on the different sound propagation paths from the source 180 to each of the different microphones 102, 104) to emphasize (e.g., via constructive interference) sounds arriving from the direction of the source 180 and to attenuate sounds arriving from one or more other directions. In some examples, if the beamforming unit 138 determines that the location of the source 180 is proximate to the first microphone 102, the beamforming unit 138 may send a command to change the orientation or direction of the first microphone 102 to capture the sound 182 and to null sounds from other directions, such as directions associated with the second microphone 104.

The resulting one or more beamformed audio signals 148 (e.g., a representation of the audio signals 170, 172) may be sent to the device 120. For example, the modem 118 may send one or more beamformed audio signals 148 to the device 120. In a particular implementation, a single beamformed audio signal 148 is provided to the device 120 for each audio source of interest. In some examples, generating the beamformed audio signals 148 at the device 110 corresponds to performing low-complexity processing operations. The device 120 may use the beamformed audio signals 148 to perform high-complexity processing operations. In an illustrative example, based on the beamformed audio signals 148, the device 120 can command the 360-degree camera to focus on the source 180, command the lidar sensor to measure the distance between a user of the devices 110, 120 and the source 180, etc.

Optionally, the device 110 can send at least a portion of the audio data captured by the microphones 102, 104 (e.g., the audio signals 170, 172) to the device 120 for distributed audio processing in which a portion of processing described as being performed by the device 110 is offloaded to the device 120, or for additional processing using greater processing, memory, and power resources that may be available at the device 120. As an example, in some implementations the device 110 can send at least a portion of the audio signals 170, 172 (e.g., the audio data 178) to the device 120 for higher-accuracy direction-of-arrival processing, higher-accuracy audio event detection, higher-accuracy environment detection, or a combination thereof. In some implementations, the device 110 can send at least a portion of the audio signals 170, 172 (e.g., the audio data 178) to the device 120 instead of, or in addition to, sending the beamformed audio signals 148.

Figure 25:
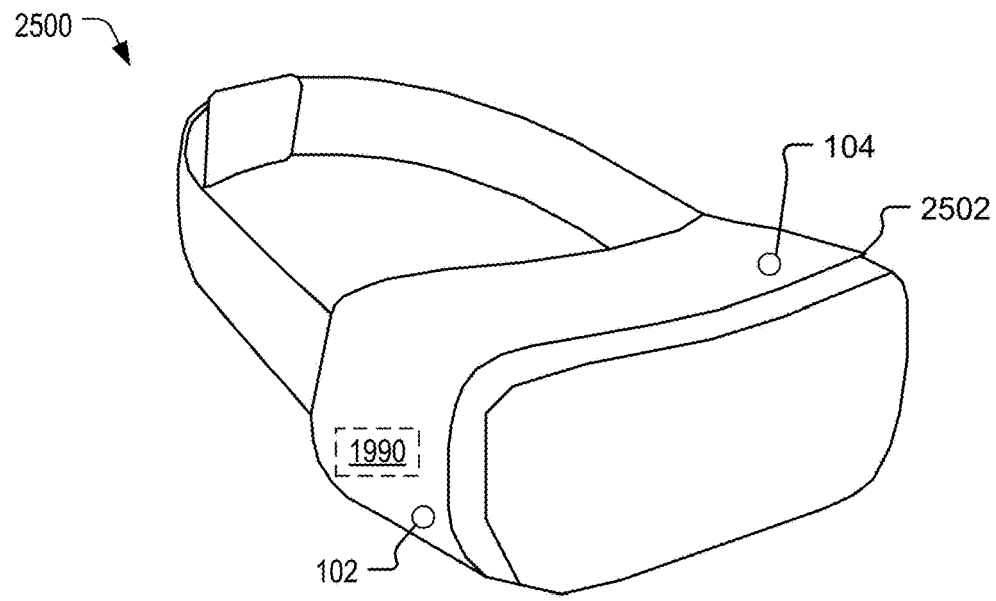
FIG. 25 is a diagram of a headset, such as a virtual reality, mixed reality, or augmented reality headset that includes a directional audio signal processing unit for generating directional audio signal data, in accordance with some examples of the present disclosure.
Figure 26:
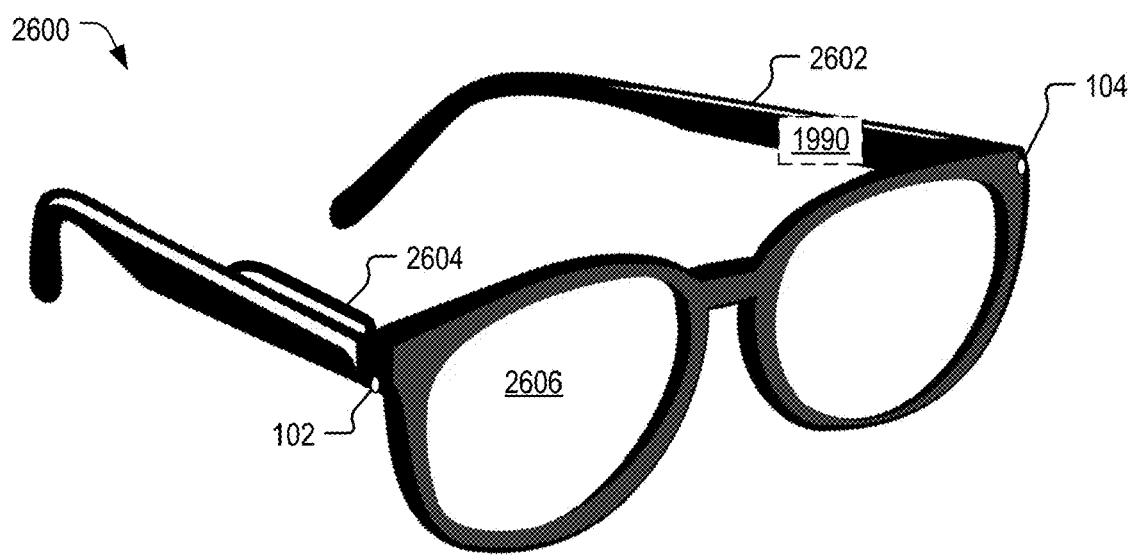
FIG. 26 is a diagram of a mixed reality or augmented reality glasses device that includes a directional audio signal processing unit for generating directional audio signal data, in accordance with some examples of the present disclosure.

Optionally, the device 110 can include, or be coupled to, a user interface device, such as a visual user interface device (e.g., a display, such as illustrated in FIG. 25, or a holographic projection unit, such as illustrated in FIG. 26, as non-limiting examples), an audio user interface device (e.g., a speaker, such as described with reference to FIG. 3, or a voice user interface, such as described with reference to FIG. 5, as non-limiting examples), or a haptic user interface device (e.g., as described with reference to FIG. 22, as a non-limiting example). The one or more processors 116 can be configured to provide a user interface output that is indicative of at least one of an environmental event or an acoustic event to the user interface device. To illustrate, the user interface output can cause the user interface device to provide a notification of a detected audio event or environment condition, such as based on the audio event information 144, audio event information 145 received from the device 120, the environmental information 146, environmental information 147 received from the device 120, or a combination thereof.

Various techniques described above illustrate the device 110 (e.g., the low-power device) performing directional context awareness processing. That is, the device 110 processes audio signals 170, 172 from multiple microphones 102, 104 to determine a direction from which the sound 182 originates. In a particular implementation, the device 110 corresponds to a headset and the device 120 corresponds to a mobile phone. In this implementation, the headset performs directional context awareness processing and can send resulting data to the mobile phone to perform additional high-complexity processing. In other implementations, the device 110 corresponds to one or more other devices, such as a head-mounted device (e.g., a virtual reality headset, mixed reality headset, or an augmented reality headset), glasses (e.g., augmented reality glasses or mixed reality glasses), a "smart watch" device, a virtual assistant device, or an internet-of-things device, which has smaller computational capability as compared to the device 120 (e.g., a mobile phone, a tablet device, a personal computer, a server, a vehicle, etc.).

As described below, the device 120 (e.g., the mobile phone) can also perform directional context awareness processing based on the audio signals 170, 172 received from the device 110, based on audio signals 190, 192 from the microphones 106, 108, or a combination thereof. The device 120 can provide results of the directional context awareness processing to the device 110 (e.g., the headset) such that the device 110 can perform additional operations, such as an audio zoom operation as described in greater detail with respect to FIG. 3.

The device 120 includes a memory 124, one or more processors 126, and a modem 128. Optionally, the device 120 also includes one or more of a first input interface 121, a second input interface 122, and the one or more sensors 129.

In some implementations, the first input interface 121 and the second input interface 122 are each coupled to the one or more processors 126 and are configured to be coupled to the third microphone 106 and the fourth microphone 108, respectively. The first input interface 121 is configured to receive an audio signal 190 from the third microphone 106 and to provide the audio signal 190 to the one or more processors 126, such as an audio frame 194. The second input interface 122 is configured to receive an audio signal 192 from the fourth microphone 108 and to provide an audio signal 192 to the one or more processors 126, such as an audio frame 196. The audio signals 190, 192 (e.g., the audio frames 194, 196) can be referred to as audio data 198 that is provided to the one or more processors 126.

The one or more processors 126 optionally include a direction-of-arrival processing unit 152, an audio event processing unit 154, an acoustic environment processing unit 156, a beamforming unit 158, or a combination thereof. According to some implementations, one or more of the components of the one or more processors 126 can be implemented using dedicated circuitry. As non-limiting examples, one or more of the components of the one or more processors 126 can be implemented using a FPGA, an ASIC, etc. According to another implementation, one or more of the components of the one or more processors 126 can be implemented by executing instructions 125 stored in the memory 124. For example, the memory 124 can be a non-transitory computer-readable medium that stores instructions 125 executable by the one or more processors 126 to perform the operations described herein.

The direction-of-arrival processing unit 152 can be configured to process multiple audio signals (e.g., two or more of the audio signals 170, 172, 190, or 192) to generate direction-of-arrival information 143 corresponding to the sources 180 of the sound 182 represented in the multiple audio signals. To illustrate, the direction-of-arrival processing unit 152 can be configured to process the multiple audio signals using one or more of the techniques (e.g., time of arrival, phase differences, etc.) described in reference to the direction-of-arrival processing unit 132. The direction-of-arrival processing unit 152 may have more powerful processing capability, and may therefore generate more accurate results, than the direction-of-arrival processing unit 132.

In some implementations, the audio signals 170, 172 are received from the device 110, and the direction-of-arrival processing unit 152 can process the audio signals 170, 172 to determine the direction-of-arrival information 143 without processing the audio signals 190, 192 at the direction-of-arrival processing unit 152. For example, one or more of the microphones 106, 108 may be occluded or otherwise unable to generate a useful representation of the sound 182, such as when the device 120 is a mobile device that is being carried in a user's pocket or bag.

In other implementations, the audio signals 190, 192 are received from the microphones 106, 108 and processed at the direction-of-arrival processing unit 152 to determine the direction-of-arrival information 143 without processing the audio signals 170, 172 at the direction-of-arrival processing unit 152. For example, the audio signals 170, 172 may not be transmitted by the device 110, or may not be received by the device 120. In another example, the audio signals 170, 172 may be low quality, such as due to a high amount of noise (e.g., wind noise) at the microphones 102, 104, and the device 120 may elect to use the audio signals 190, 192 and to disregard the audio signals 170, 172.

In some implementations, the audio signals 170, 172 are received from the device 110 and are used in conjunction with the audio signals 190, 192 at the direction-of-arrival processing unit 152 to generate the direction-of-arrival information 143. To illustrate, the device 110 can correspond to a headset having one or more sensors, such as a position or location sensor (e.g., a global positioning system (GPS) receiver), an inertial measurement unit (IMU) that tracks one or more of an orientation, movement, or acceleration, or a combination thereof, of the device 110 (e.g., head-tracker data). The device 120 may also include one or more position or location sensors (e.g., a GPS receiver) and an IMU to enable the device 120 to determine, in conjunction with the head-tracker data received from the device 110, absolute or relative positions and orientations of the microphones 102, 104, 106, and 108 for operation as a distributed microphone array. The direction of arrival information 142, the direction-of-arrival information 143, or both, may be relative to a reference frame of the device 110, relative to a reference frame of the device 120, relative to an absolute reference frame, or a combination thereof, and may be converted by the device 110, the device 120, or both, between various reference frames as appropriate.

The direction-of-arrival information 143 may be sent to the device 110. For example, the modem 128 may send data to the device 110 based on the direction-of-arrival information 143. The device 110 may use the direction-of-arrival information 143 to perform audio operations, such as an audio zoom operation. For example, the one or more processors 116 may send a command to capture (or focus on) audio from the direction of the source 180 and the sound 182.

The audio event processing unit 154 can be configured to process the multiple audio signals to perform audio event detection and to generate audio event information 145 corresponding to one or more detected audio events. To illustrate, in an implementation in which the audio signals 170, 172 are received at the device 120, the audio event processing unit 154 can process sound characteristics of the audio signals 170, 172 (e.g., the audio frames 174, 176) and compare the sound characteristics to a plurality of audio event models to determine whether an audio event has occurred. In some implementations in which the audio signals 190, 192 are received at the device 120, the audio event processing unit 154 can process sound characteristics of the audio signals 190, 192 (e.g., the audio frames 194, 196) and compare the sound characteristics to the plurality of audio event models to detect an audio event. In some implementations in which a beamformed audio signal 148 is received, the audio event processing unit 154 can process sound characteristics of the beamformed audio signal 148 to detect an audio event. In some implementations in which the beamforming unit 158 generates a beamformed audio signal 149, the audio event processing unit 154 can process sound characteristics of the beamformed audio signal 149 to detect an audio event.

The audio event processing unit 154 may access a database (not shown) that includes models for different audio events, such as a car horn, a train horn, a pedestrian talking, etc. In response to the sound characteristics matching (or substantially matching) a particular model, the audio event processing unit 154 can generate audio event information 145 indicating that the sound 182 represents an audio event associated with the particular model. In some implementations, the audio event processing unit 154 includes one or more classifiers configured to determine a class of an audio event in a similar manner as described for the audio event processing unit 134. As compared to the audio event processing unit 134, however, the audio event processing unit 154 may perform more complex operations, may support a much larger set of models or audio classes than the audio event processing unit 134, and may generate a more accurate determination (or classification) of an audio event than the audio event processing unit 134.

In some examples, the audio event processing unit 134 is a relatively low-power detector that is configured to have a relatively high sensitivity that reduces the probability that an audio event goes undetected, which may also result in an increased number of false alerts (e.g., a determination that an audio event is detected when no audio event has actually occurred). The audio event processing unit 154 can provide higher audio event detection accuracy using information received from the device 110 and can verify the audio event (e.g., the classification) received from the audio event processing unit 134 by processing corresponding audio signals (e.g., one or more of the audio signals 170, 172, 190, 192, one or more of the beamformed audio signals 148, 149, or a combination thereof).

The audio event information 145 may be sent to the device 110. For example, the modem 128 may send data, corresponding to a detected event, to the device 110. The device 110 may use the audio event information 145 to perform audio operations, such as an audio zoom operation. For example, the one or more processors 116 may send a command to capture (or focus on) sound from the audio event. In another example, the audio event information 145 may cause the one or more processors 116 to ignore (e.g., do not focus on) or to attenuate or remove the sound from the audio event. For example, the audio event processing unit 154 may determine that the audio event corresponds to the buzzing of a fly near the device 110, and the audio event information 145 may indicate that the device 110 is to ignore the buzzing sound or to direct a null beam in the direction of the source of the buzzing sound. In implementations in which the device 110 selects whether to playback environmental sounds to a user of the device 110, such as when the device 110 is a headset configured to enter a "transparency" mode to enable a user to hear external sounds under specific circumstances, the audio event information 145 can indicate to the device 110 whether the sound 182 should trigger the device 110 to transition into the transparency mode.

The acoustic environment processing unit 156 can be configured to process the multiple audio signals 170, 172, the multiple audio signals 190, 192, or a combination thereof, to perform acoustic environment detection. To illustrate, the acoustic environment processing unit 156 can process sound characteristics of the audio frames 174, 176, the audio frames 194, 196, or both, to determine acoustic characteristics of a surrounding environment. In some implementations, the acoustic environment processing unit 156 functions in a similar manner as the acoustic environment processing unit 136. However, as compared to the acoustic environment processing unit 136, the acoustic environment processing unit 156 may perform more complex operations, may support a much larger set of models or audio environment classes than the acoustic environment processing unit 136, and may generate a more accurate determination (or classification) of an acoustic environment than the acoustic environment processing unit 136.

In some examples, the acoustic environment processing unit 136 is a relatively low-power detector, as compared to the acoustic environment processing unit 156, that is configured to have a relatively high sensitivity to environment changes (e.g., detecting a change in background sound characteristics when the device 110 moves from an indoor environment to an outdoor environment, or from an outdoor environment to a vehicle, as non-limiting examples) but may have relatively low accuracy in determining the environment itself. The acoustic environment processing unit 156 can provide higher acoustic environment detection accuracy using information received from the device 110 and can verify the environmental information 146 (e.g., a classification) received from the acoustic environment processing unit 136 by processing corresponding audio signals (e.g., one or more of the audio signals 170, 172, 190, 192, one or more of the beamformed audio signals 148, 149, or a combination thereof).

The acoustic environment processing unit 156 may generate environmental information 147 based on the acoustic characteristics of the surrounding environment. The environmental information 147 may be sent to the device 110. For example, the modem 128 may send data, corresponding to a detected environment, to the device 110. The device 110 may use the environmental information 147 to perform additional audio operations.

The beamforming unit 158 can be configured to process multiple audio signals 170, 172 to perform adaptive beamforming. To illustrate, in some examples, the beamforming unit 158 utilizes a multichannel signal processing algorithm to spatially filter the audio signals 170, 172 to point a beam of increased sensitivity to the location of the source 180 and suppress audio signals from other locations in a similar manner as described for the beamforming unit 138. In another example, the beamforming unit 158 utilizes the multichannel signal processing algorithm to spatially filter the audio signals 190, 192 to point a beam of increased sensitivity to the location of the source 180. In another example in which the devices 120 receives the audio signals 170, 172 from the device 110 and also receives the audio signals 190, 192, the beamforming unit 158 may perform spatial filtering based on all of the audio signals 170, 172, 190, and 192. In some implementations, the beamforming unit 158 generates a single beamformed audio signal for each sound source detected in the audio signals. For example, if a single sound source is detected, a single beamformed audio signal 149 directed to the sound source is generated. In another example, if multiple sound sources are detected, multiple beamformed audio signals 149 may be generated, with each of the multiple beamformed audio signals 149 directed to a respective one of the sound sources.

The resulting beamformed audio signals 149 may be sent to the device 110. For example, the modem 128 may send one or more beamformed audio signals 149 to the device 110. The device 110 may use the beamformed audio signals 149 to playback improved audio.

Although various components of the device 110 and the device 120 are illustrated and described above, it should be understood that, in other implementations, one or more of the components can be omitted or bypassed. It should also be understood that various combinations of components of the device 110, the device 120, or both, can enable interoperability that enhances performance of the device 110, the device 120, or both, such as described in the non-limiting examples listed below.

In a particular implementation, the device 110 includes the audio event processing unit 134 and omits (or deactivates, or bypasses operation of) the direction-of-arrival processing unit 132, the acoustic environment processing unit 136, and the beamforming unit 138. In this implementation, the audio event information 144 can be provided to the device 120 and used in conjunction with processing at the device 120 using the audio signals 170, 172, using the audio signals 190, 192, or using a combination of the audio signals 170, 172, 190, 192, as described above.

In another particular implementation, the device 110 includes the audio event processing unit 134 and the direction-of-arrival processing unit 132 and omits (or deactivates, or bypasses operation of) the acoustic environment processing unit 136 and the beamforming unit 138. In this implementation, the direction-of-arrival information 142 and the audio event information 144 are generated at the device 110 and can be provided to the device 120 for use as previously described. The direction-of-arrival information 142 can be used to enhance audio event detection (e.g., via increased accuracy, reduced latency, or both) that may be performed at the audio event processing unit 134, at the audio event processing unit 154, or both. For example, the direction-of-arrival information 142 can be provided as an input to the audio event processing unit 134, and the audio event processing unit 134 can compare the direction-of-arrival information 142 to directions associated with one or more previously detected audio events or sound sources. In another example, the audio event processing unit 134 can use the direction-of-arrival information 142 to enhance or reduce a likelihood that particular audio events are detected. To illustrate, because a sound originating from above a user is more likely to be from a bird or an aircraft than from an automobile, a weighting factor can be applied to reduce the probability that the overhead sound is determined to match an automobile-based audio event, as an illustrative, non-limiting example. Additionally, or alternatively, the direction-of-arrival information 142 can be used to enhance performance of the audio event processing unit 154 in a similar manner as described for the audio event processing unit 134.

Figure 9:
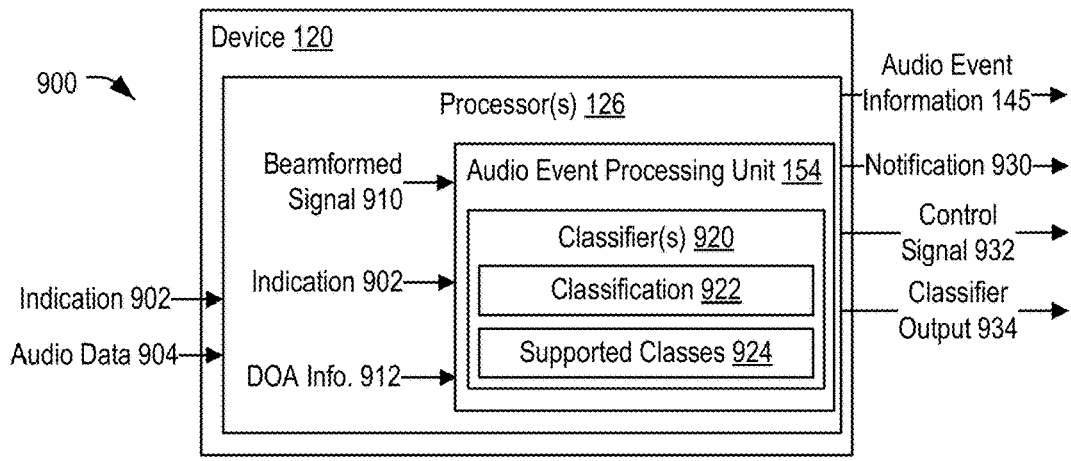
FIG. 9 is a block diagram of another particular illustrative aspect of a system configured to perform directional processing on one or more audio signals received from one or more microphones, in accordance with some examples of the present disclosure.

As explained further with reference to FIG. 9, performance of the audio event processing unit 154 can be enhanced by providing the audio event information 144 (e.g., an audio class detected by the audio event processing unit 134) as an input to the audio event processing unit 154. For example, the audio event information 144 can be used as a starting point for an event model database search or as an input that can influence a classification operation performed by a neural network-based audio event classifier. Thus, by using the direction-of-arrival information 142 at the audio event processing unit 134 to improve the accuracy of the audio event information 144, the improved accuracy of the audio event information 144 can also improve performance of the audio event processing unit 154.

In some implementations in which the device 110 further includes the acoustic environment processing unit 136, the environmental information 146 can be used to improve performance of the audio event processing unit 134, the audio event processing unit 154, or both. For example, because some audio events (e.g., a car horn) are more likely to occur in some environments (e.g., on a busy street or in a vehicle) than in other environments (e.g., in an office), the audio event processing unit 134 can adjust operation based on the environment. For example the audio event processing unit 134 may prioritize searching of sound event models that are more likely to occur in the particular environment, which may result in increased accuracy, reduced latency, or both. As another example, the audio event processing unit 134 may adjust weighting factors for one or more sound event models, based on the environment, to increase or reduce the likelihood that the sound 182 is determined to match those sound event models. In some implementations, the environmental information 146 can be sent to the device 120 and used to improve performance of the audio event processing unit 154 in a similar manner.

In some implementations in which the device 110 includes the beamforming unit 138, the beamformed audio signals 148 can be used to improve operation of the audio event processing unit 134, the audio event processing unit 154, or both. For example, a beamformed audio signal 148 can be directed toward the source 180 of the sound 182 and may thus enhance the sound 182, attenuate or remove sounds from other sources or ambient noise, or a combination thereof. As a result, in implementations in which the audio event processing unit 134 operates on the beamformed audio signal 148, the beamformed audio signal 148 can provide an improved representation of the sound 182, as compared to the audio signals 170, 172, which enables the audio event processing unit 134 to more accurately determine the audio event information 144 (e.g., by reducing a likelihood of misclassification of the sound 182). Similarly, in implementations in which the beamformed audio signal 148 is sent to the device 120 and the audio event processing unit 154 operates on the beamformed audio signal 148, the beamformed audio signal 148 can enable improved performance of the audio event processing unit 154.

In a particular implementation, the device 120 includes the audio event processing unit 154 and omits (or deactivates, or bypasses operation of) the direction-of-arrival processing unit 152, the acoustic environment processing unit 156, and the beamforming unit 158. In this implementation, the audio event processing unit 154 can operate using the audio signals 170, 172, using the beamformed audio signals 148, using the audio signals 190, 192, or a combination thereof, as described above.

In another particular implementation, the device 120 includes the audio event processing unit 154 and the direction-of-arrival processing unit 152 and omits (or deactivates, or bypasses operation of) the acoustic environment processing unit 156 and the beamforming unit 158. In this implementation, the direction-of-arrival information 143 and the audio event information 145 are generated at the device 120 and can be provided to the device 110 for use as previously described. The direction-of-arrival information 143 can be used to enhance audio event detection (e.g., via increased accuracy, reduced latency, or both) that may be performed at the audio event processing unit 154 in a similar manner as described for the direction-of-arrival information 142.

In some implementations in which the device 120 further includes the acoustic environment processing unit 156, the environmental information 147 can be used to improve performance of the audio event processing unit 134, the audio event processing unit 154, or both, in a similar manner as described for the environmental information 146. In some implementations in which the device 120 includes the beamforming unit 158, the beamformed audio signals generated by the beamforming unit 158 can be used to improve operation of the audio event processing unit 154 in a similar manner as described for the beamformed audio signals 148.

The techniques described with respect to FIG. 1 enable each device 110, 120 to perform directional context aware processing based on the audio signals 170, 172 generated by the microphones 102, 104, the audio signals 190, 192 generated by the microphones 106, 108, or a combination thereof. As a result, each device 110, 120 is able to detect context for different use cases and is able to determine characteristics associated with a surrounding environment. As non-limiting example, the techniques enable each device 110, 120 to distinguish between one or more moving sound sources (e.g., a siren, a bird, etc.), one or more fixed sound sources (e.g., a television, a loudspeaker, etc.), or a combination thereof.

It should be appreciated that the techniques described with respect to FIG. 1 may enable multi-channel or single-channel audio context detection to distinguish between different sounds based on a direction-of-arrival. According to one implementation, the microphones 102, 104, 106, and 108 can be included in a microphone array that has microphones located at different locations in a building, such as a house. In a scenario where somebody falls on the floor, if the microphones of the microphone array are connected to a mobile device, such as the device 120, using the techniques described herein, the mobile device can determine where the sound came from using direction-of-arrival information, determine the context of the sound, and perform appropriate actions (e.g., notify paramedics).

Figure 2:
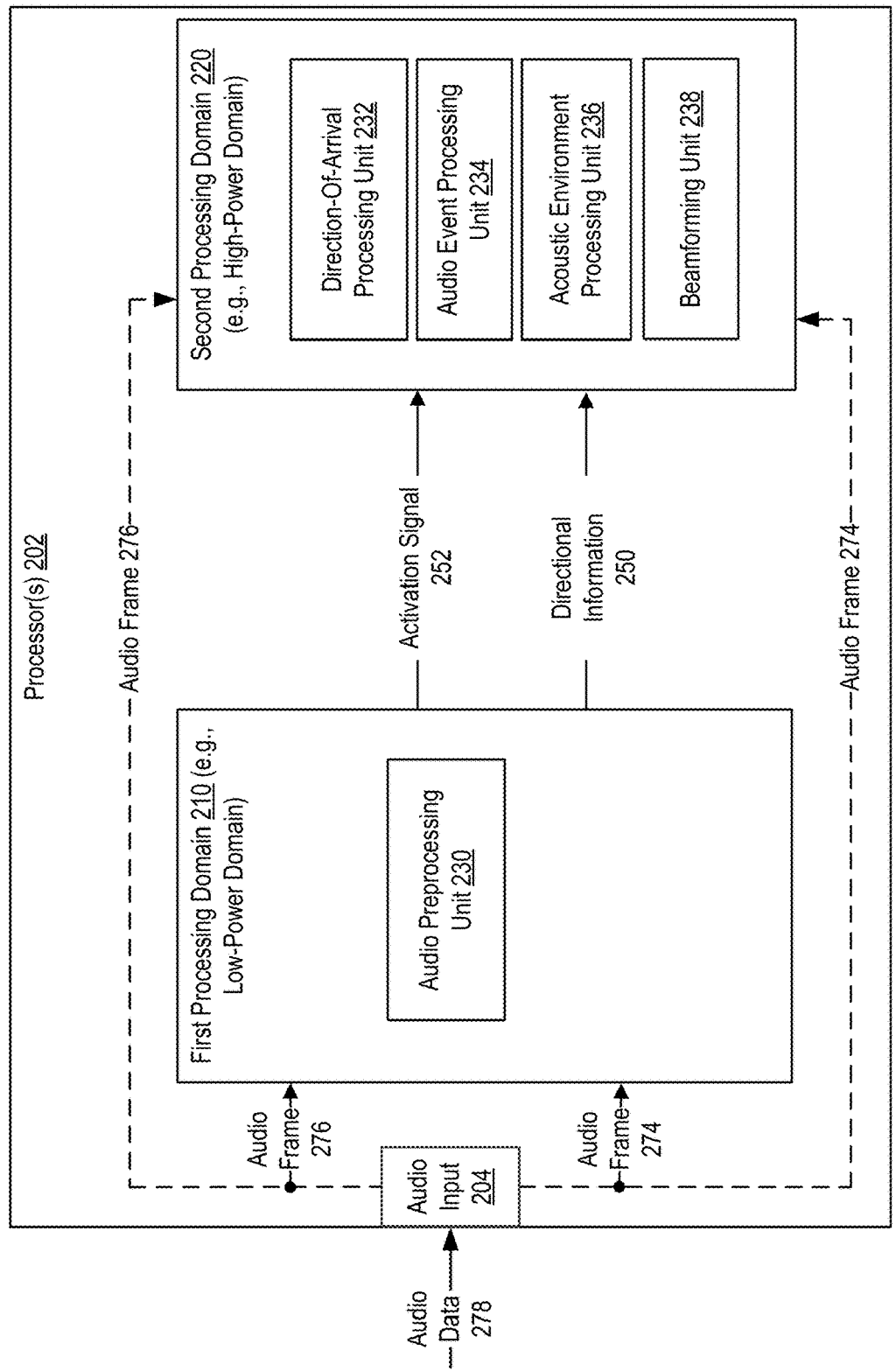
FIG. 2 is a block diagram of another particular illustrative aspect of a system configured to perform directional processing on one or more audio signals received from one or more microphones, in accordance with some examples of the present disclosure.

Referring to FIG. 2, another particular illustrative aspect of a system configured to perform directional processing on multiple audio signals received from multiple microphones is disclosed and generally designated 200. The system 200 includes one or more processors 202. The one or more processors 202 can be integrated into the device 110 or into the device 120. For example, the one or more processors 202 can correspond to the one or more processors 116 or the one or more processors 126.

The one or more processors 202 optionally include an audio input 204 that is configured to receive audio data 278, such as the audio data 178 of FIG. 1, and to output audio frames 274, 276. The one or more processors 202 include a first processing domain 210 and a second processing domain 220. The first processing domain 210 may correspond to a low-power domain that operates in a low-power state, such as an "always-on" power domain. The first processing domain 210 may remain in an active state to process the audio frame 274 and the audio frame 276. In some implementations, the audio frames 274 and 276 correspond to the audio frames 174 and 176, respectively. In another implementation, the audio frames 274 and 276 correspond to the audio frames 194 and 196, respectively. The second processing domain 220 may correspond to a high-power domain that transitions between an idle state and a high-power state.

The first processing domain 210 includes an audio preprocessing unit 230. The audio preprocessing unit 230 may consume a relatively low amount of power in comparison to one or more components in the second processing domain 220. The audio preprocessing unit 230 may process the audio frames 274, 276 to determine whether there is any audio activity. According to some implementations, the audio preprocessing unit 230 may receive and process audio frames from a single microphone to conserve additional power. For example, in some implementations, the audio frame 276 may not be provided to the first processing domain 210 and the audio preprocessing unit 230 can determine whether audio activity is present in the audio frame 274.

If the audio preprocessing unit 230 determines audio activity is present in the audio frame 274 or in both audio frames 274, 276, the audio preprocessing unit 230 can generate an activation signal 252 to transition the second processing domain 220 from the idle state to the high-power state. According to some implementations, the audio preprocessing unit 230 can determine preliminary directional information 250 regarding the audio activity and provide the preliminary directional information 250 to the second processing domain 220. For example, if audio activity is present in the audio frame 274 and there is a lesser amount of audio activity, or no audio activity, present in the audio frame 276, the preliminary directional information 250 may indicate that the sound 182 is originating proximate to the microphone that captured the audio signal corresponding to the audio frame 274.

The second processing domain 220 includes a direction-of-arrival processing unit 232, an audio event processing unit 234, an acoustic environment processing unit 236, a beamforming unit 238, or a combination thereof. The direction-of-arrival processing unit 232 may correspond to the direction-of-arrival processing unit 132 of FIG. 1 or the direction-of-arrival processing unit 152 of FIG. 1 and may operate in a substantially similar manner. The audio event processing unit 234 may correspond to the audio event processing unit 134 of FIG. 1 or the audio event processing unit 154 of FIG. 1 and may operate in a substantially similar manner. The acoustic environment processing unit 236 may correspond to the acoustic environment processing unit 136 of FIG. 1 or the acoustic environment processing unit 156 of FIG. 1 and may operate in a substantially similar manner. The beamforming unit 238 may correspond to the beamforming unit 138 of FIG. 1 or the beamforming unit 158 of FIG. 1 and may operate in a substantially similar manner.

Thus, the second processing domain 220 may operate in different modes. For example, the second processing domain 220 may be used to activate different sensors, such as the sensors 129 of FIG. 1. Additionally, the second processing domain 220 may be used to perform direction-of-arrival processing and calculations, beamforming, DRR operations, indoor/outdoor detections, source distancing determinations, etc.

The system 200 enables the first processing domain 210 to selectively activate the second processing domain 220 in response to detecting the presence of audio activity. As a result, battery power can be conserved at a device, such as a headset or a mobile phone, by transitioning the second processing domain 220 (e.g., the high-power processing domain) into an idle state when audio activity is not detected by using low-power processing.

Figure 3:
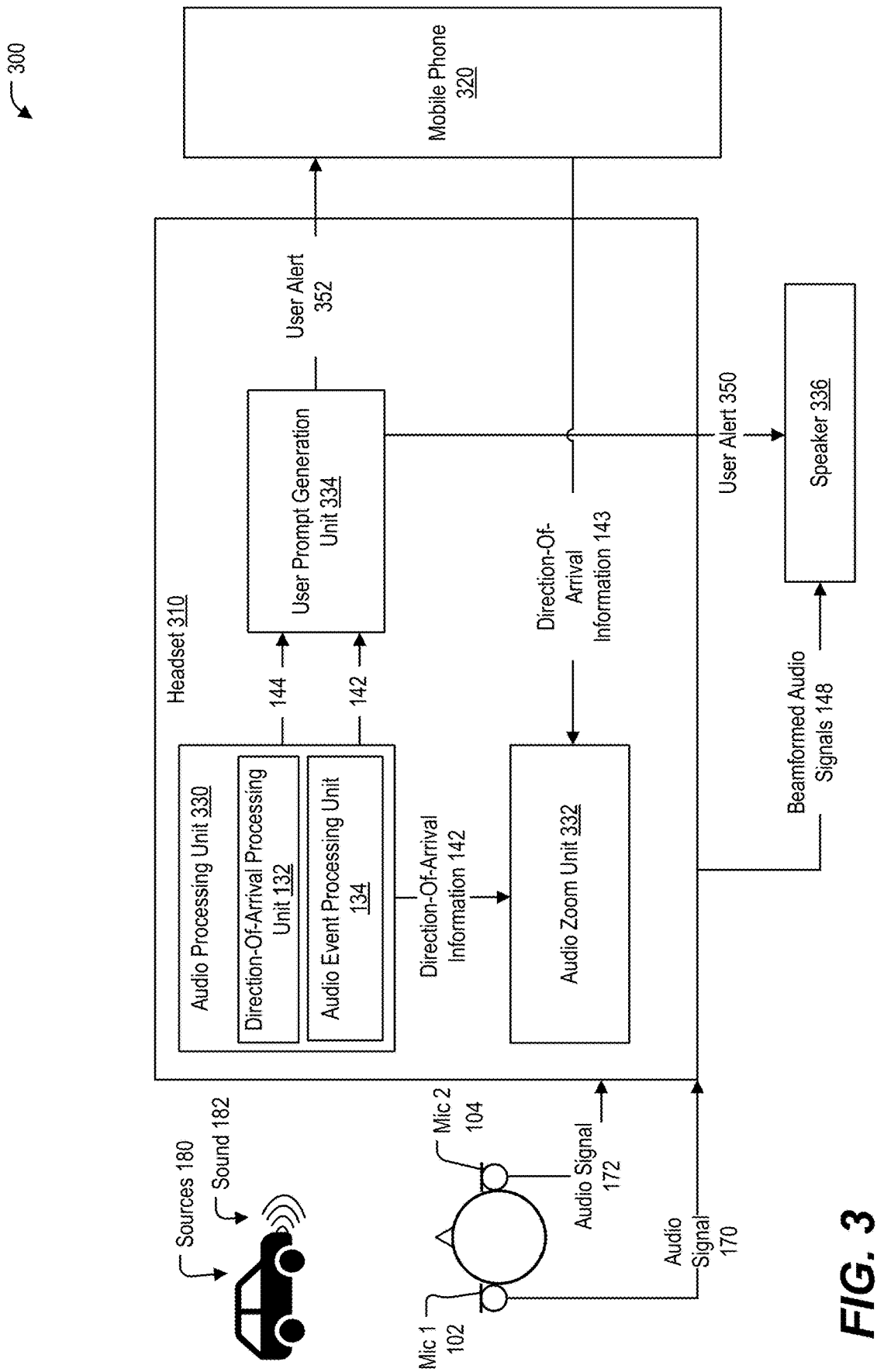
FIG. 3 is a block diagram of another particular illustrative aspect of a system configured to perform directional processing on one or more audio signals received from one or more microphones, in accordance with some examples of the present disclosure.

Referring to FIG. 3, another particular illustrative aspect of a system configured to perform directional processing on multiple audio signals received from multiple microphones is disclosed and generally designated 300. The system 300 includes a headset 310 and a mobile phone 320. The headset 310 can correspond to the device 110 and the mobile phone 320 can correspond to the device 120.

The headset 310 includes an audio processing unit 330, an audio zoom unit 332, an optional user prompt generation unit 334, or a combination thereof. The audio processing unit 330 includes the direction-of-arrival processing unit 132 and the audio event processing unit 134. As described with respect to FIG. 1, the direction-of-arrival processing unit 132 can generate the direction-of-arrival information 142 that indicates a location of (e.g., a direction toward) the source 180 of the sound 182. The direction-of-arrival information 142 is provided to the audio zoom unit 332 and to the user prompt generation unit 334. As described with respect to FIG. 1, the audio event processing unit 134 can generate the audio event information 144 indicating that the sound 182 is related to a vehicle sound. The audio event information 144 is provided to the user prompt generation unit 334.

The audio zoom unit 332 may also receive the direction-of-arrival information 143 from the mobile phone 320. The audio zoom unit 332 may be configured to adjust the beamforming algorithm of the beamforming unit 138 based on the direction-of-arrival information 142 or the direction-of-arrival information 143. As a result, the audio zoom unit 332 may adjust the focus of the microphones 102, 104 to the sound of interest (e.g., the sound 182) and attenuate sound from other directions. The headset 310 can thus generate beamformed audio signals 148 focused on the sound 182 from the source 180 and provide the beamformed audio signals 148 to a speaker 336 for playback. In some implementations, playback of the beamformed audio signals 148 is performed at multiple speakers 336 (e.g., a left speaker for a user's left ear and right speaker for a user's right ear) in a manner that directionality to the source 180 of the sound 182 is preserved, so that the user perceives that the focused sound 182 is originating from the direction (or, if distance information is determined, from the position) of the source 180.

The user prompt generation unit 334 can generate a user alert 350 that is provided to the speaker 336 for playback. For example, the user alert 350 can be audio that indicates a vehicle (e.g., the source 180) is approaching. The user prompt generation unit 334 can also generate one or more user alerts 352 that are provided to the mobile phone 320. The user alerts 350 can include text that indicates that a vehicle is approaching, a vibration programmed to indicate that a vehicle is approaching etc.

Thus, the system 300 of FIG. 3 enables the headset 310 to focus (e.g., audio zoom) on the sound 182 of interest and may generate user alerts 350, 352. To illustrate, in the scenario when a user is wearing the headset 310, the system 300 can alert the user to surrounding events, such as an approaching vehicle, that the user may otherwise not be aware of.

Figure 4:
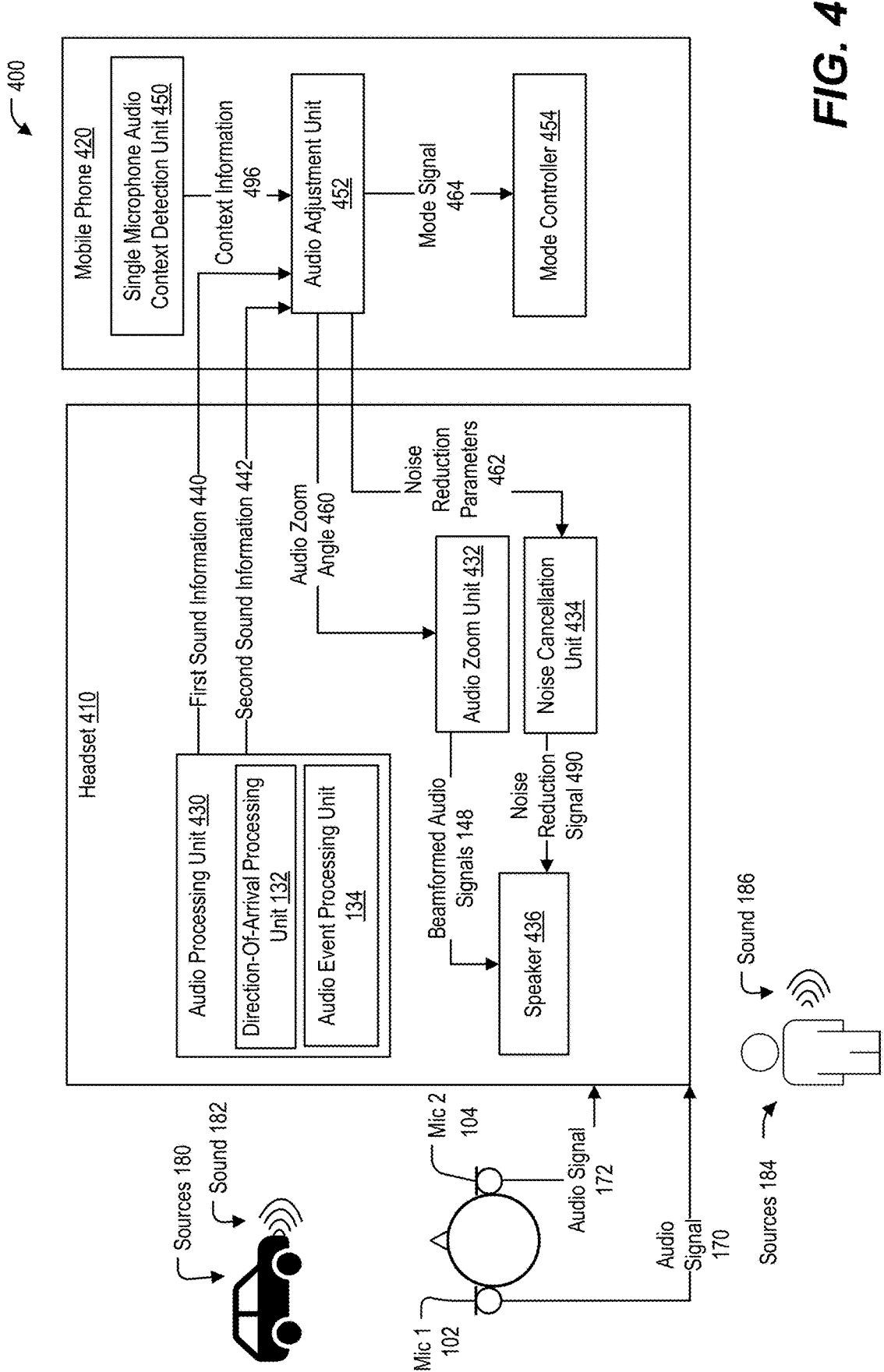
FIG. 4 is a block diagram of another particular illustrative aspect of a system configured to perform directional processing on one or more audio signals received from one or more microphones, in accordance with some examples of the present disclosure.

Referring to FIG. 4, another particular illustrative aspect of a system configured to perform directional processing on multiple audio signals received from multiple microphones is disclosed and generally designated 400. The system 400 includes a headset 410 and a mobile phone 420. The headset 410 can correspond to the device 110 and the mobile phone 420 can correspond to the device 120.

The headset 410 includes an audio processing unit 430 and optionally includes an audio zoom unit 432, a noise cancellation unit 434, one or more speakers 436, or a combination thereof. The audio processing unit 430 includes the direction-of-arrival processing unit 132 and the audio event processing unit 134. As described with respect to FIG. 1, the direction-of-arrival processing unit 132 can generate direction-of-arrival information that indicates a proximate location of the source 180 of the sound 182. The direction-of-arrival processing unit 132 can also generate direction-of-arrival information that indicates a proximate location of a source 184 of a sound 186. As described with respect to FIG. 1, the audio event processing unit 134 can generate audio event information indicating that the sound 182 is related to a vehicle sound. The audio event processing unit 134 can also generate audio event information indicating that the sound 186 is related to human speech.

The audio processing unit 430 can be configured to generate first sound information 440 that indicates the direction-of-arrival information associated with the sound 182 (e.g., a first output of the direction-of-arrival processing unit 132) and indicates that the sound 182 is related to a vehicle (e.g., a first output of the audio event processing unit 134). The audio processing unit 430 can also be configured to generate second sound information 442 that indicates the direction-of-arrival information associated with the sound 186 (e.g., a second output of the direction-of-arrival processing unit 132) and indicates that the sound 186 is related to human speech (e.g., a second output of the audio event processing unit 134). Optionally, the headset 410 may send audio signal data, such as one or more portions of the audio signals 170, 172 that correspond to the sounds 182, 186, to the mobile phone 420. The audio signal data may be included in the sound information 440, 442 or may be separate from the sound information 440, 442.

The mobile phone 420 includes a single microphone audio context detection unit 450, an audio adjustment unit 452, and a mode controller 454. The first sound information 440 and the second sound information 442 are provided to the audio adjustment unit 452. According to some implementations, the single microphone audio context detection unit 450 can provide additional context information 496 to the audio adjustment unit 452, such as the direction-of-arrival information 143 generated by the direction-of-arrival processing unit 152, the audio event information 145 generated by the audio event processing unit 154, the environmental information 147 generated by the acoustic environment processing unit 156, or a combination thereof, of FIG. 1. For example, the single microphone audio context detection unit 450 can process audio signal data received from the headset 410 (e.g., one or more portions of the audio signals 170, 172), audio signal data received from one or more microphones of the mobile phone 420 (e.g., the audio signals 190, 192), or a combination thereof.

The audio adjustment unit 452 can be configured to generate an audio zoom angle 460 and noise reduction parameters 462 based on the sound information 440, 442 from the audio processing unit 430. That is, based on the context information 496 from the single microphone audio context detection unit 450, the audio adjustment unit 452 can determine the audio zoom angle 460 that is to be focused for beamforming purposes and can determine noise reduction parameters 462 to reduce noise from other directions. Thus, based on the context information 496, if the audio adjustment unit 452 determines that a priority is to focus on the sound 182, the audio zoom angle 460 may indicate an angle associated with the source 180 and the noise reduction parameters 462 may include parameters to reduce noise from the source 184. The audio zoom angle 460 is provided to the audio zoom unit 432, and the noise reduction parameters 462 are provided to the noise cancellation unit 434.

The audio adjustment unit 452 may also be configured to generate a mode signal 464 that is provided to the mode controller 454. The mode signal 464 may indicate whether a vibration alert should be generated for the user of the mobile phone 420, whether a text alert should be generated for the user of the mobile phone 420, whether a voice alert should be generated for the user of the mobile phone 420, etc.

The audio zoom unit 432 may be configured to adjust the beamforming algorithm of a beamforming unit, such as the beamforming unit 138 of FIG. 1, based on the audio zoom angle 460. As a result, the audio zoom unit 432 may adjust the focus of the microphones 102, 104 to the sound of interest (e.g., the sound 182). Based on the noise reduction parameters 462, the noise cancellation unit 434 may be configured to generate a noise reduction signal 490 to attenuate sounds 186 from other directions. Beamformed audio signals 148 and the noise reduction signal 490 may be provided to the one or more speakers 436 for playback.

The system 400 of FIG. 4 enables detected sound events and corresponding direction-of-arrivals to be analyzed to improve a hearing sensation. Based on the context information 496, the system 400 can determine which sound is of particular interest to a user. For example, if the user is crossing a street, the system 400 can determine that the sound 182 of the vehicle is of more importance than the sound 186 of people talking. As a result, the system 400 can focus on the sound 182 of importance and suppress other sounds.

Although the headset 410 is described as providing focus on the sound 182 and suppression of other sounds, it should be noted that each of the focusing on the sound 182, provided by the audio zoom unit 432, and the suppression of other sounds, provided by the noise cancellation unit 434, provides enhanced awareness of the sound 182 to a user of the headset 410. For example, in an implementation in which the headset 410 includes the audio zoom unit 432 but omits (or bypasses operation of) the noise cancellation unit 434, the sound 182 is enhanced via the audio zoom operation even in the absence of the noise reduction signal 490. As another example, in an implementation in which the headset 410 includes the noise cancellation unit 434 but omits (or bypasses operation of) the audio zoom unit 432, the sound 182 is enhanced relative to other sounds via the noise reduction applied to the other sounds.

Figure 5:
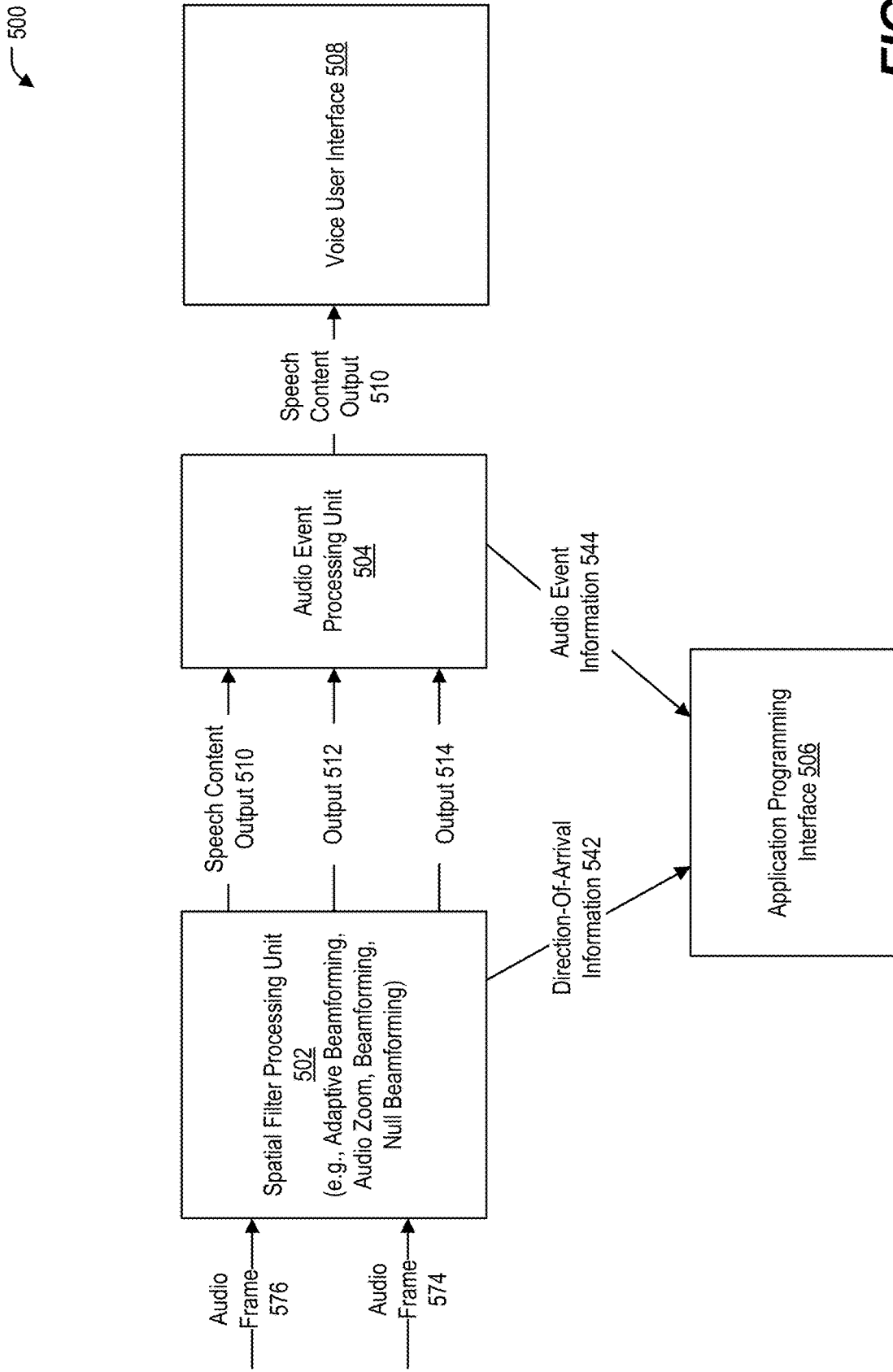
FIG. 5 is a block diagram of another particular illustrative aspect of a system configured to perform directional processing on one or more audio signals received from one or more microphones, in accordance with some examples of the present disclosure.

Referring to FIG. 5, another particular illustrative aspect of a system configured to perform directional processing on multiple audio signals received from multiple microphones is disclosed and generally designated 500. The system 500 includes a spatial filter processing unit 502, an audio event processing unit 504, an application programming interface 506, and a voice user interface 508. According to one implementation, the system 500 can be integrated into the device 110 or the device 120.

The spatial filter processing unit 502 can be configured to perform one or more spatial filtering operations on audio frames associated with the received audio signals, illustrated as audio frames 574 and 576. In some implementations, the audio frames 574 and 576 correspond to the audio frames 174 and 176, respectively. In another implementation, the audio frames 574 and 576 correspond to the audio frames 194 and 196, respectively. In a non-limiting example, the spatial filter processing unit 502 may perform adaptive beamforming on the audio frames 574, 576, an audio zoom operation on the audio frames 574, 576, a beamforming operation on the audio frames 574, 576, a null beamforming operation on the audio frames 574, 576, or a combination thereof.

Based on the spatial filtering operation, the spatial filter processing unit 502 may generate a plurality of outputs 510, 512, 514 and corresponding direction-of-arrival information 542 for each output 510, 512, 514. In the illustrative example of FIG. 5, the spatial filter processing unit 502 can generate a speech content output 510 from the audio frames 574, 576 and two other outputs 512, 514 (e.g., audio from two other detected audio sources). The outputs 510, 512, 514 are provided to the audio event processing unit 504, and the direction-of-arrival information 542 for each output 510, 512, 514 is provided to the application programming interface 506.

The audio event processing unit 504 is configured to process each output 510, 512, 514 to determine audio event information 544 associated with the outputs 510, 512, 514. For example, the audio event processing unit 504 can indicate that the output 510 is associated with speech content, the output 512 is associated with non-speech content, and the output 514 is associated with non-speech content. The audio event processing unit 504 provides the speech content output 510 to a voice user interface 508 for user playback and provides the audio event information 544 to the application programming interface 506.

The application programming interface 506 can be configured to provide the direction-of-arrival information 542 and the audio event information 544 to other applications or devices for further application-specific processing, as described with respect to FIGS. 1-4.

Figure 6:
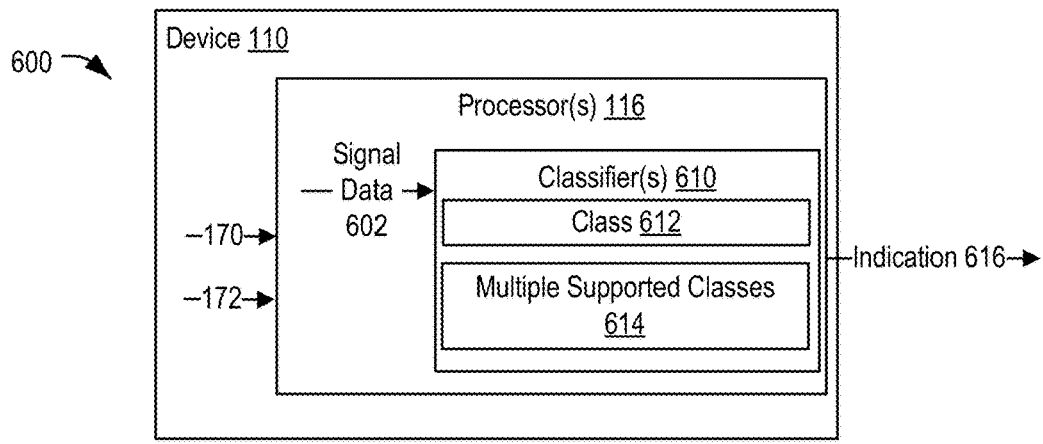
FIG. 6 is a block diagram of another particular illustrative aspect of a system configured to perform directional processing on one or more audio signals received from one or more microphones, in accordance with some examples of the present disclosure.

FIG. 6 depicts an implementation 600 of the device 110. The one or more processors 116 are configured to receive audio signals from multiple microphones, illustrated as the audio signals 170, 172. The one or more processors 116 are also configured to send, to a second device, data based on a class 612 for a sound represented in one or more of the audio signals 170, 172 and associated with an audio event. For example, the one or more processors 116 send an indication 616 of the class 612 to a second device (e.g., the device 120). In an illustrative example, the one or more processors 116 are integrated into a headset device, and the second device corresponds to a mobile phone. In another illustrative example, the one or more processors 116 are integrated in a vehicle.

The one or more processors 116 are configured to process signal data 602 at one or more classifiers 610 to determine the class 612 from among multiple supported classes 614 that are supported by the one or more classifiers 610. The signal data 602 corresponds to the audio signals 170, 172. For example, in some implementations, the one or more processors are configured to perform a beamforming operation (e.g., at the beamforming unit 138) on the audio signals 170, 172 to generate the signal data 602, which may correspond to the beamformed audio signal 148. Alternatively, or in addition, the one or more processors 116 are configured to determine one or more features of the audio signals 170, 172 to include in the signal data 602. Alternatively, or in addition, the signal data 602 includes the audio signals 170, 172.

According to some aspects, the one or more classifiers 610 include one or more neural networks configured to process the signal data 602 and to generate an output (e.g., a one-hot output) that indicates that the class 612 is more closely associated with the audio event than the rest of the multiple supported classes 614. The class 612 is sent to the second device via the indication 616. In some examples, the indication 616 includes a bit configuration, number, or other indicator of the class 612. In other examples, the indication 616 includes a textual name, label, or other descriptor that enables the class 612 to be identified by the second device. In some implementations, the one or more classifiers 610 correspond to (or are included in) the audio event processing unit 134 of FIG. 1, and the indication 616 corresponds to (or is included in) the audio event information 144.

Optionally, the one or more processors 116 are further configured to process image data at the one or more classifiers 610 to determine the class 612. For example, the device 110 can optionally include one or more cameras configured to generate the image data or can receive the image data from another device (e.g., via a modem). The class 612 can correspond to an object (e.g., a source of the sound) represented in the image data and associated with an audio event. For example, in some implementations, the one or more processors 116 can generate the direction-of-arrival information 142 based on the audio signals 170, 172 (or receive the direction-of-arrival information 143 from the second device) and use the direction-of-arrival information 142 or 143 to locate, in the image data, an object corresponding to the source of the sound. In implementations in which the one or more classifiers 610 process image data in addition to audio data, the image data can be included in the signal data 602 or provided as a separate input to the one or more classifiers 610.

In some implementations, the multiple supported classes 614 include an "unknown" class, which signifies that the audio event fails to correspond to any of the other supported classes 614 within a confidence threshold. In an example, the one or more classifiers 610 compute, for each of the multiple supported classes 614, a probability that the audio event corresponds to that particular class. If none of the computed probabilities exceed a threshold amount, the one or more classifiers 610 designate the class 612 as the "unknown" class.

In some implementations, the one or more processors 116 are configured to process the audio signals 170, 172 to generate direction-of-arrival information corresponding to one or more sources of sound represented in one or more of the audio signals, and the class 612 is associated with the direction-of-arrival information. For example, the direction-of-arrival information and the class 612 correspond to the same sound in the audio signals 170, 172. To illustrate, the one or more processors 116 can optionally include the direction-of-arrival processing unit 132 of FIG. 1. The one or more processors 116 can be configured to send data based on the direction-of-arrival information to the second device. In an example, the data based on the direction-of-arrival information includes a report indicating at least one detected event and a direction of the detected event.

According to various implementations, the device 110 can optionally include one or more additional components or aspects previously described with reference to FIG. 1. For example, the one or more processors can be configured to perform spatial processing on the audio signals based on the direction-of-arrival information to generate one or more beamformed audio signals and can send the one or more beamformed audio signals to the second device. To illustrate, the one or more processors 116 can optionally include the beamforming unit 138 of FIG. 1. In another example, the one or more processors 116 can be configured to generate environment data corresponding to a detected environment based on an acoustic environment detection operation. To illustrate, the one or more processors 116 can optionally include the acoustic environment processing unit 136 of FIG. 1.

In another example, the one or more processors 116 can be configured to send a representation of the audio signals 170, 172 to the second device. In some implementations, the representation of the audio signals 170, 172 corresponds to one or more beamformed audio signals, such as the beamformed audio signal 148. In another example, one or more processors 116 can be configured to receive, from the second device, directional information associated with the audio signals and perform an audio zoom operation based on the directional information, such as described with reference to FIG. 3 and FIG. 4.

By sending the indication 616 of the class 612 corresponding to a sound represented in the audio signals 170, 172, the device 110 provides information that can be used by the second device to increase the accuracy of the audio event processing at the second device, as described further with reference to FIG. 9.

Figure 7:
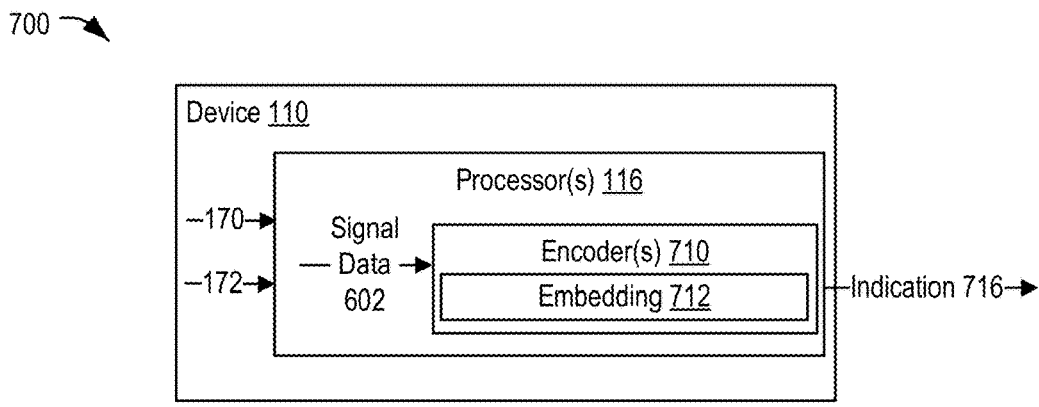
FIG. 7 is a block diagram of another particular illustrative aspect of a system configured to perform directional processing on one or more audio signals received from one or more microphones, in accordance with some examples of the present disclosure.

FIG. 7 depicts an implementation 700 of the device 110. As compared to the implementation 600, one or more encoders 710 are included in the implementation 700 and the one or more classifiers 610 are omitted. The signal data 602 is processed by the one or more encoders 710 to generate an embedding 712 corresponding to a sound that is represented in one or more of the audio signals 170, 172 and associated with an audio event. The one or more processors 116 are also configured to send data based on the embedding 712 to a second device. In an example, the one or more processors 116 send an indication 716 of the embedding 712 to the second device.

According to some aspects, the one or more encoders 710 include one or more neural networks configured to process the signal data 602 to generate the embedding 712 of the sound. The embedding 712 represents a "signature" of the sound that includes sufficient information about various characteristics of the sound to enable the sound to be detected in other audio signals, but may not include sufficient information to enable reproduction of the sound from the embedding 712 alone. According to some aspects, the embedding 712 can correspond to a user's speech, a particular sound from the environment, such as a barking dog, etc., and the embedding 712 can be used to detect and amplify or extract other instances of the sound that may occur in other audio data, as described further with reference to FIG. 11. In some implementations, the one or more encoders 710 correspond to (or are included in) the audio event processing unit 134 of FIG. 1, and the indication 716 corresponds to (or is included in) the audio event information 144.

In some implementations, the one or more processors 116 are configured to process the audio signals 170, 172 to generate direction-of-arrival information corresponding to one or more sources of sound represented in one or more of the audio signals, and the embedding 712 is associated with the direction-of-arrival information. In an example, the direction-of-arrival information and the embedding 712 correspond to the same sound in the audio signals 170, 172. To illustrate, the one or more processors 116 can optionally include the direction-of-arrival processing unit 132 of FIG. 1. The one or more processors 116 can be configured to send data based on the direction-of-arrival information to the second device.

Optionally, the one or more processors 116 are further configured to process image data at the one or more encoders 710 to generate the embedding 712. For example, the device 110 can optionally include one or more cameras configured to generate the image data or can receive the image data from another device (e.g., via a modem). The embedding 712 can correspond to an object (e.g., a source of the sound) represented in the image data and associated with an audio event. For example, in some implementations, the one or more processors 116 can generate the direction-of-arrival information 142 based on the audio signals 170, 172 (or receive the direction-of-arrival information 143 from the second device) and use the direction-of-arrival information 142 or 143 to locate, in the image data, an object corresponding to the source of the sound. In implementations in which the one or more encoders 710 process image data in addition to audio data, the image data can be included in the signal data 602 or provided as a separate input to the one or more encoders 710.

Figure 8:
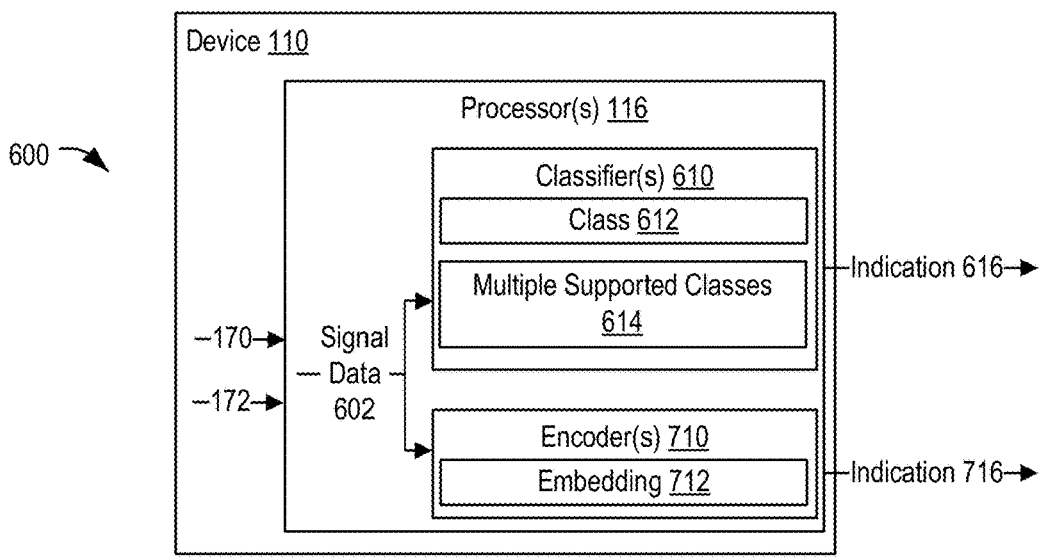
FIG. 8 is a block diagram of another particular illustrative aspect of a system configured to perform directional processing on one or more audio signals received from one or more microphones, in accordance with some examples of the present disclosure.

FIG. 8 depicts an implementation 800 of the device 110 that includes the one or more classifiers 610 of FIG. 6 and also includes the one or more encoders 710 of FIG. 7. The signal data 602 (or one or more portions of the signal data 602) is processed by the one or more classifiers 610 to determine the class 612, and the signal data 602 (or one or more portions of the signal data 602) is processed by the one or more encoders 710 to generate the embedding 712. The one or more processors 116 are also configured to send data based on the class 612, the embedding 712, or both, to a second device. For example, the indication 616 of the class 612, the indication 716 of the embedding 712, or both, can correspond to, or be included in, the audio event information 144 sent to the device 120 of FIG. 1.

FIG. 9 depicts an implementation 900 of the device 120 (e.g., a second device) that includes the one or more processors 126. The one or more processors 126 include the audio event processing unit 154 and are configured to receive, from a first device (e.g., the device 110), an indication 902 of an audio class corresponding to an audio event. In some examples, the indication 902 corresponds to the indication 616 of FIG. 6 or FIG. 8 that indicates the class 612 detected at the one or classifiers 610 of the device 110. In some implementations, the one or more processors 126 are coupled to a memory (e.g., the memory 124) and integrated into a mobile phone, and the first device corresponds to a headset device. In another implementation, the memory and the one or more processors 126 are integrated into a vehicle.

Optionally, the one or more processors 126 include one or more classifiers 920 that can correspond to, or be included in, the audio event processing unit 154. According to an aspect, the one or more classifiers 920 are more powerful and more accurate than the classifier(s) in the first device that generated the indication 902, such as described with reference to the audio event processing unit 154 of FIG. 1. The one or more processors 126 can be configured to also receive audio data 904 representing a sound associated with the audio event. In some implementations, the audio data 904 can correspond to the audio signals 170, 172 from the first device, the beamformed audio signals 148 from the first device, the audio signals 190, 192, or a combination thereof, as illustrative, non-limiting examples. The one or more processors 126 can be configured to process the audio data 904 at the one or more classifiers 920 to verify the indication 902 is correct, such as by comparing the indication 902 to a classification 922 that is determined by the one or more classifiers 920. The classification 922 can be selected as the audio class, from among multiple supported classes 924, that best corresponds to the audio event detected in the audio data 904.

In some implementations, verifying the indication 902, or verifying the class indicated by the indication 902, includes determining whether the class indicated by the indication 902 matches the class determined by the one or more classifiers 920 (e.g., the classification 922). Alternatively, or in addition, verifying the indication 902, or verifying the class indicated by the indication 902, includes determining that the class determined by the one or more classifiers 920 is a particular instance or sub-class of the class indicated by the indication 902. For example, an indication 902 corresponding to the class "vehicle event" may be verified by the one or more classifiers 920 determining that the classification 922 corresponds to "automobile engine," "motorcycle engine," "brakes screeching," "automobile horn," "motorcycle horn," "train horn," "vehicle collision," etc., which may be categorized as different types of vehicle events.

According to some aspects, accuracy of the one or more classifiers 920 is improved by providing other information related to the audio event to the one or more classifiers 920 in addition to the audio data 904. For example, the one or more processors 126 can be optionally configured to provide the audio data 904 and the indication 902 of the audio class as inputs to the one or more classifiers 920 to determine the classification 922 associated with the audio data 904. In the implementation 900, the audio data 904 includes one or more beamformed signal 910 (e.g., the beamformed audio signal 148) that is input to one or more classifiers 920. In another example, the one or more processors 126 can be optionally configured to receive, from the first device, direction data 912 (e.g., the direction-of-arrival information 142) corresponding to a source of the sound and to provide the audio data 904, the direction data 912, and the indication 902 of the audio class as inputs to the one or more classifiers 920 to determine the classification 922 associated with the audio data 904.

Optionally, the one or more processors 126 are configured to generate one or more outputs instead of the audio event information 145, in addition to the audio event information 145, or included in the audio event information 145, such as a notification 930, a control signal 932, a classifier output 934, or a combination thereof. For example, in an implementation in which the audio class (e.g., the classification 922) corresponds to a vehicle event (e.g., a collision), the one or more processors 126 can send the notification 930 of the vehicle event to one or more third devices based on a location of a first device (e.g., the device 110) and locations of the one or more third devices, such as described further with reference to FIG. 14 and FIG. 15. In another example, a user of the device 120 may be participating in an outdoor event such as a hiking along a trail, and the audio class (e.g., the classification 922) corresponds to a safety-related event such as an animal growl. In this example, the one or more processors 126 can send the notification 930 of the safety-related event to one or more third devices, such as phones or headsets of other hikers, that are determined to be nearby based on location data associated with the one or more third devices.

In another example, the control signal 932 is sent to the first device based on the classifier output 934. To illustrate, the classifier output 934 can include a bit pattern, numeric indicator, or textual label or description that indicates the classification 922 determined by the one or more classifiers 920. In an illustrative example, the control signal 932 instructs the first device to perform an audio zoom operation. In another example, the control signal 932 instructs the first device to perform spatial processing based on a direction of a source of the sound. In another example, the control signal 932 instructs the first device to change a mode of operation, such as to transition from a media playback mode (e.g., playing streaming audio to a user of the first device) to a transparency mode (e.g., to enable the user of the first device to hear environmental sounds).

Figure 16:
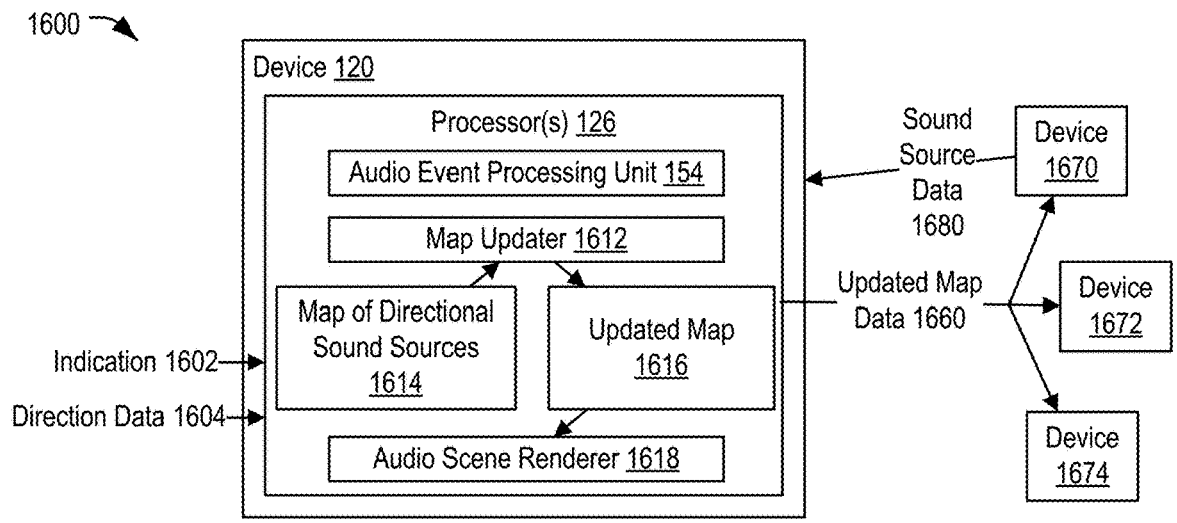
FIG. 16 is a block diagram of another particular illustrative aspect of a system configured to perform directional processing on one or more audio signals received from one or more microphones, in accordance with some examples of the present disclosure.

Optionally, the one or more processors 126 are configured to perform one or more operations associated with tracking sources of directional audio sounds in an audio scene, such as explained further with reference to FIG. 16. In an example, the one or more processors 126 can receive the direction data 912 corresponding to a sound source detected by the first device. Based on the audio event, the one or more processors 126 can update a map of directional sound sources in an audio scene to generate an updated map. The one or more processors 126 can send data corresponding to the updated map to one or more third devices that are geographically remote from the first device. The one or more third devices can use the updated map to notify users of the one or more third devices of sound sources detected in the proximity of the first device, or to provide a shared audio experience for the users participating in a shared virtual environment (e.g., in a virtual meeting room), as illustrative, non-limiting examples.

Figure 10:
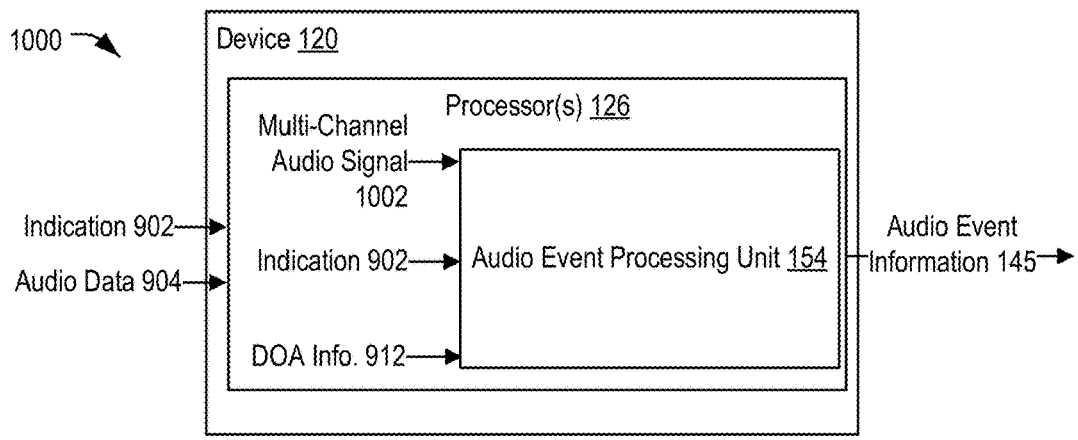
FIG. 10 is a block diagram of another particular illustrative aspect of a system configured to perform directional processing on one or more audio signals received from one or more microphones, in accordance with some examples of the present disclosure.

FIG. 10 depicts another implementation 1000 of the device 120. As compared to the implementation 900 of FIG. 9, the audio event processing unit 154 (e.g., the one or more classifiers 920) receives a multi-channel audio signal 1002 as an input instead of the beamformed signal 910. For example the multi-channel audio signal 1002 can include the audio signals 170, 172 that are received in the audio data 904, the audio signals 190, 192 that are received from microphones 106, 108, or a combination thereof. The multi-channel audio signal 1002 can be provided as input to the one or more classifiers 920 in conjunction with the indication 902, the direction data 912, or both.

To illustrate, in some circumstances beamformed data is not available, such as when an audio event is detected but a directionality of the audio event cannot be determined with sufficient accuracy (e.g., the sound is predominately diffuse or non-directional, or is masked by other sounds that interfere with beamforming). Examples of processing based on whether audio signals or beamformed signals are transmitted between the devices are described with reference to FIG. 12 and FIG. 13.

Figure 11:
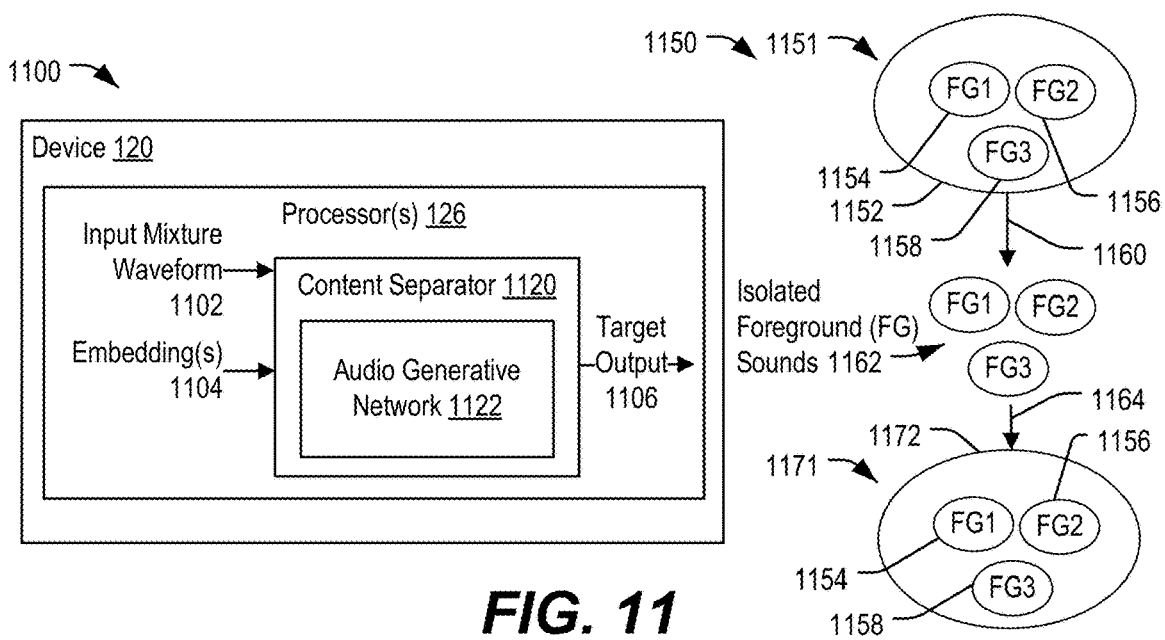
FIG. 11 is a block diagram of another particular illustrative aspect of a system configured to perform directional processing on one or more audio signals received from one or more microphones and includes a graphical depiction of audio content separation, in accordance with some examples of the present disclosure.

FIG. 11 depicts an implementation 1100 of the device 120 and a diagram 1150 representing audio processing that may be performed at the device 120. The one or more processors 126 include a content separator 1120 that is configured to separate foreground signals from background signals in audio content based on embeddings corresponding to audio signals.

The content separator 1120 can include an audio generative network 1122 that is configured to receive one or more embeddings 1104 corresponding to one or more signatures of particular sounds. For example, the one or more embeddings 1104 can correspond to or include the embedding 712 of FIG. 7. In some examples, the one or more embeddings 1104 can include signatures of one or more audio events, signatures of speech of particular people, etc. The audio generative network 1122 is also configured to receive audio data that can include both background and foreground sounds from various sound sources, illustrated as an input mixture waveform 1102. The audio generative network 1122 is configured to determine whether the input mixture waveform 1102 includes any sounds corresponding to the one or more embeddings 1104 and to extract, isolate, or remove those particular sounds.

A target output 1106 is generated by the content separator 1120. The target output 1106 can include an audio signal corresponding to the particular sounds. For example, the particular sounds corresponding to the one or more embeddings 1104 can be isolated from the remaining sounds in the input mixture waveform 1102 to generate the target output 1106. In an example, the particular sounds may correspond to foreground sounds in the input mixture waveform 1102, and the target output 1106 can include the foreground sounds with the background sounds removed or attenuated.

In another example, the target output 1106 corresponds to a modified version of the input mixture waveform 1102 and may include the sounds that are represented in the input mixture waveform 1102 and that remain after removal (or attenuation) of the particular sounds. For example, the particular sounds may correspond to foreground sounds in the input mixture waveform 1102, and the target output 1106 can include the background sounds remaining in the input mixture waveform 1102 after the foreground sounds are removed (or attenuated).

In another example, the target output 1106 can include an audio signal that includes the particular sounds as foreground sounds that have been removed from the background sounds of the input mixture waveform 1102 and added to a different set of background sounds.

In the diagram 1150, a first foreground sound (FG1) 1154, a second foreground sound (FG2) 1156, and a third foreground sound (FG3) 1158 are depicted in an audio scene 1151 that includes a first ambiance 1152 (e.g., background). A foreground extraction operation 1160 is performed by the content separator 1120 using a first embedding of the one or more embeddings 1104 for the first foreground sound 1154, a second embedding of the one or more embeddings 1104 for the second foreground sound 1156, and a third embedding of the one or more embeddings 1104 for the third foreground sound 1158 to isolate the foreground sounds 1154, 1156, 1158 from the first ambiance 1152, illustrated as isolated foreground sounds 1162. A scene generation operation 1164 adds the foreground sounds 1154, 1156, 1158 into an audio scene 1171 (e.g., an updated audio scene) with a second ambiance 1172. The scene generation operation 1164 may be performed by the audio generative network 1122, the content separator 1120, the one or more processors 1126, or a combination thereof.

In an example, the input mixture waveform 1102 represents audio data corresponding to the audio scene 1151, which is processed by the one or more processors 1126 to generate adjusted audio data (e.g., the target output 1106 including the isolated foreground sounds 1162), and the adjusted data is again adjusted by the one or more processors 1126 (e.g., the scene generation operation 1164) to generate an updated audio scene (e.g. the audio scene 1171). The audio scene 1171 can include directional information associated with various objects and audio events (e.g., audio and events associated with other participants in a shared audio scene), such as described further with reference to FIGS. 16-18.

The content separator 1120 including the audio generative network 1122 may enable any target sound to be separated from a background, and is not limited to separating speech from noise. In some implementations, the content separator 1120 using the audio generative network 1122 enables single microphone target separation of specific audio events, speech, etc., and can overcome limitations associated with conventional techniques that are unable to differentiate between audio sources.

Figure 12:
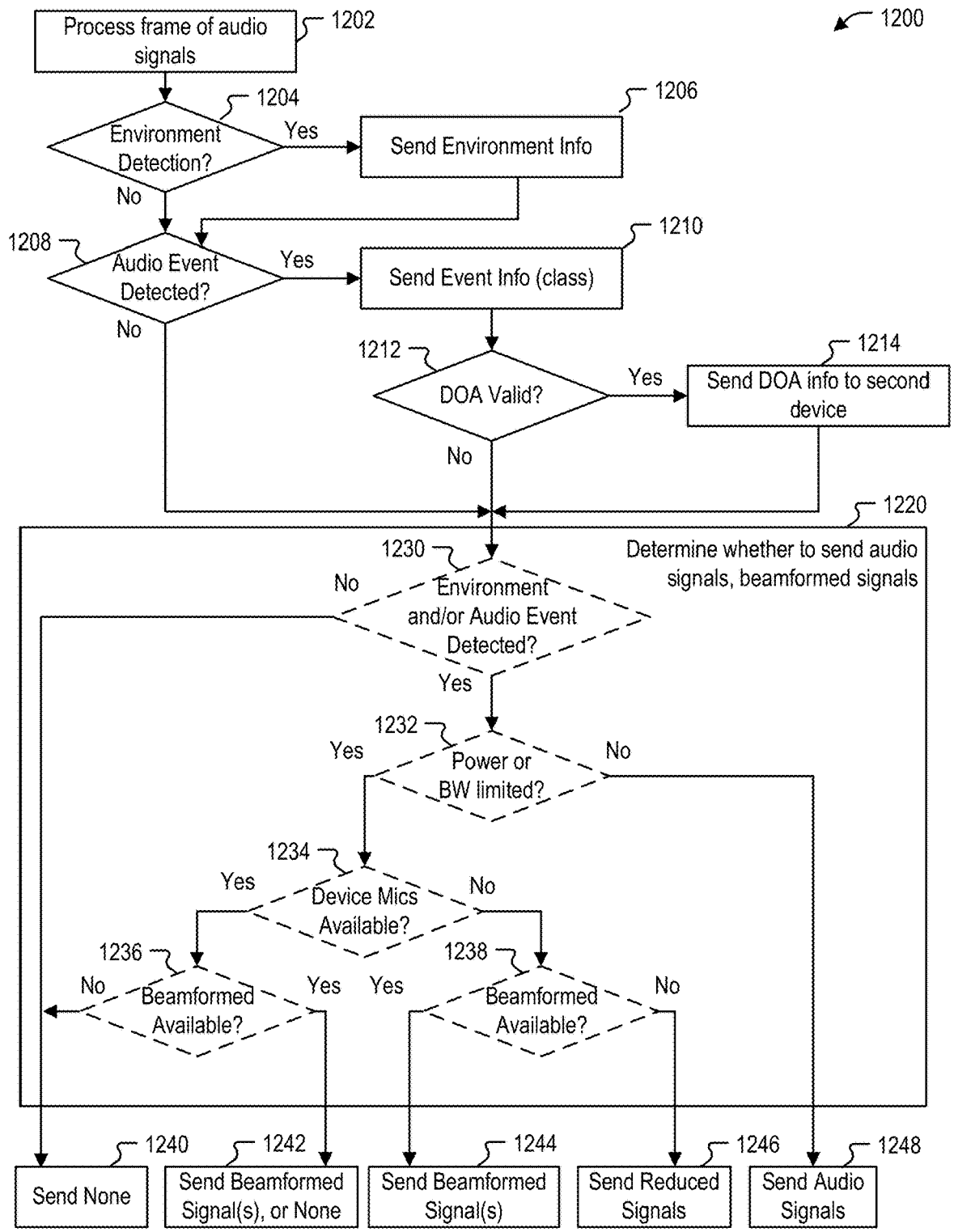
FIG. 12 is a diagram of a particular implementation of operations that may be performed in an audio processing device, in accordance with some examples of the present disclosure.

FIG. 12 depicts a flowchart corresponding to a method 1200 that may be performed by a first device, such as the device 110 (e.g., the one or more processors 116), with respect to sending information to a second device, such as the device 120.

The method 1200 includes processing one or more frames of audio signals, at block 1202. For example, the audio data 178 (e.g., a frame of the audio signals 170, 172) may be processed at the direction-of-arrival processing unit 132, the audio event processing unit 134, the acoustic environment processing unit 136, the unit 138, or a combination thereof, as described in FIG. 1.

The method 1200 includes determining whether the processing of the one or more frames of audio signals resulted in an environment detection, at block 1204. In some examples, an environment detection can include determining that a change of environment has been detected. In response to determining that an environment detection has occurred, the method 1200 includes sending environment information to the second device, at block 1206. For example, the device 110 sends the environmental information 146 to the device 120.

In response to determining that no environment detection occurred, at block 1204, or after sending the environment information, at block 1206, the method 1200 includes determining whether the processing of the one or more frames of audio signals resulted in an audio event being detected, at 1208. In response to determining that an audio event is detected, the method 1200 includes sending audio event information to the second device, at block 1210. For example, the device 110 sends the audio event information 144 to the device 120.

Also in response to determining that an audio event was detected, the method 1200 includes determining whether valid direction-of-arrival information is available, at block 1212. For example, valid direction of arrival information can correspond to detection of a source of sound having a direction-of-arrival determined at a confidence level above a confidence threshold to distinguish between discrete sound sources and diffuse sounds that have no distinguishable source. In a particular implementation, valid direction-of-arrival information being available for a sound represented in one or more audio signals indicates that the sound is from an identifiable direction (e.g., from a discrete sound source), and valid direction-of-arrival information not being available for the sound indicates that the sound is not from an identifiable direction. In response to determining that valid direction-of-arrival information is available, at 1212, the method 1200 includes sending the direction-of-arrival information to the second device, at block 1214. For example, the device 110 sends the direction-of-arrival information 142 to the device 120.

In response to determining that no audio event is detected, at block 1208, determining that no valid direction-of-arrival information is available, at block 1212, or after sending the direction-of-arrival information to the second device, at block 1214, the method 1200 proceeds to determining whether to send one or more audio signals (e.g., the audio signals 170, 172), one or more beamformed signals (e.g., the beamformed audio signals 148), or no audio signals, to the second device, at block 1220.

FIG. 12 illustrates several optional decision operations that may be used, in some implementations, to determine whether to send one or more audio signals, one or more beamformed signals, or no audio signals to the second device, at block 1220.

A determination is made as to whether at least one environment detection or audio event detection occurred, at block 1230. In response to determining that an environment detection did not occur and that an audio event was not detected, the method 1200 determines that no audio is to be sent to the second device, at block 1240. Thus, in this example, when there is no environment detection and no audio event, the first device (e.g., the device 110) does not transfer audio information to the second device (e.g., the device 120) for additional processing.

Otherwise, in response to determining that at least one of an environment detection or audio event detection occurred, the method 1200 includes determining whether an amount of power or bandwidth available for transmission to the second device is limited, at block 1232. For example, if the first device has an amount of available battery power below a power threshold, or if available amount of transmission bandwidth to send audio data to the second device is below a transmission threshold, the first device may determine that resources associated with transmission of audio data to the second device are to be conserved. Otherwise, the first device may proceed in a default (e.g., non-conservation) mode.

In response to determining, at block 1232, that neither power nor transmission bandwidth is limited, the method 1200 includes sending audio signals to the second device, at block 1248. For example, the device 110 can send the audio signal 170, 172 to the device 120.

Otherwise, in response to determining, at block 1232, that at least one of power or transmission bandwidth is limited, the method 1200 includes determining, at block 1234, whether microphones at the second device are available for use in capturing audio data. For example, in the event that the microphones at the second device (e.g., the microphones 106, 108) are occluded or blocked, such as in a user's pocket or bag, or are located too far away to be able to capture substantially the same audio information as the microphones at the first device, the microphones at the second device can be considered not available.

In response to determining that the microphones at the second device are available for use, at block 1234, the method 1200 includes determining whether beamformed audio signals are available, at block 1236. For example, when an environmental detection has occurred based on diffuse ambient sound rather than sound from specific sources whose direction can be located, no beamforming operation may be performed at the first device. As another example, when an audio event is detected but a direction of a source of the sound corresponding to the audio event cannot be determined with a confidence greater than a threshold confidence, no valid beamforming signal is generated at the first device.

In response to determining, at block 1236, that no beamformed audio signal is available, the method 1200 determines that no audio data is to be sent to the second device, at block 1240. Otherwise, when it is determined that a beamformed audio signal is available, at block 1236, the method 1200 advances to block 1242, where either beamformed signals or no signals are sent to the second device. For example, because power or transmission resources are limited, but microphones are available at the second device for audio capture and analysis, the first device may determine that no audio is to be sent to the second device, and instead the second device may capture audio to be used for analysis at the second device. Otherwise, although power or transmission resources are limited and the microphones are available for audio capture at the second device, the first device may determine to send the beamformed audio signal to the second device. In a particular implementation, the decision of whether to send the beamformed signal or no signals, at block 1242, may be at least partially based on an amount of power or bandwidth that is available for transmission of the beamformed signals (e.g., a comparison to one or more bandwidth thresholds or power thresholds may be performed to determine whether or not to send the one or more beamformed audio signals).

Returning to block 1234, in response to determining that the microphones of the second device are not available, the method 1200 determines whether one or more beamformed audio signals are available, at block 1238. In response to one or more beamformed audio signals being available, the method 1200 includes sending the one or more beamformed audio signals, at block 1244. Otherwise, in response to determining that one or more beamformed audio signals are not available, at block 1238, the method 1200 includes sending reduced signals to the second device, at block 1246. For example, sending the reduced signals may include sending audio corresponding to a reduced number of microphone channels (e.g., sending a single one of the audio signals 170 or 172), sending a reduced-resolution version of one or more of the microphone channels (e.g., a lower-resolution version of one or more of the audio signals 170, 172), sending extracted audio feature data (e.g., feature data extracted from one or both of audio signals 170, 172, such as spectral information) which may provide useful information to the second device at a reduced power and bandwidth usage as compared to sending the full audio signals 170, 172.

Figure 13:
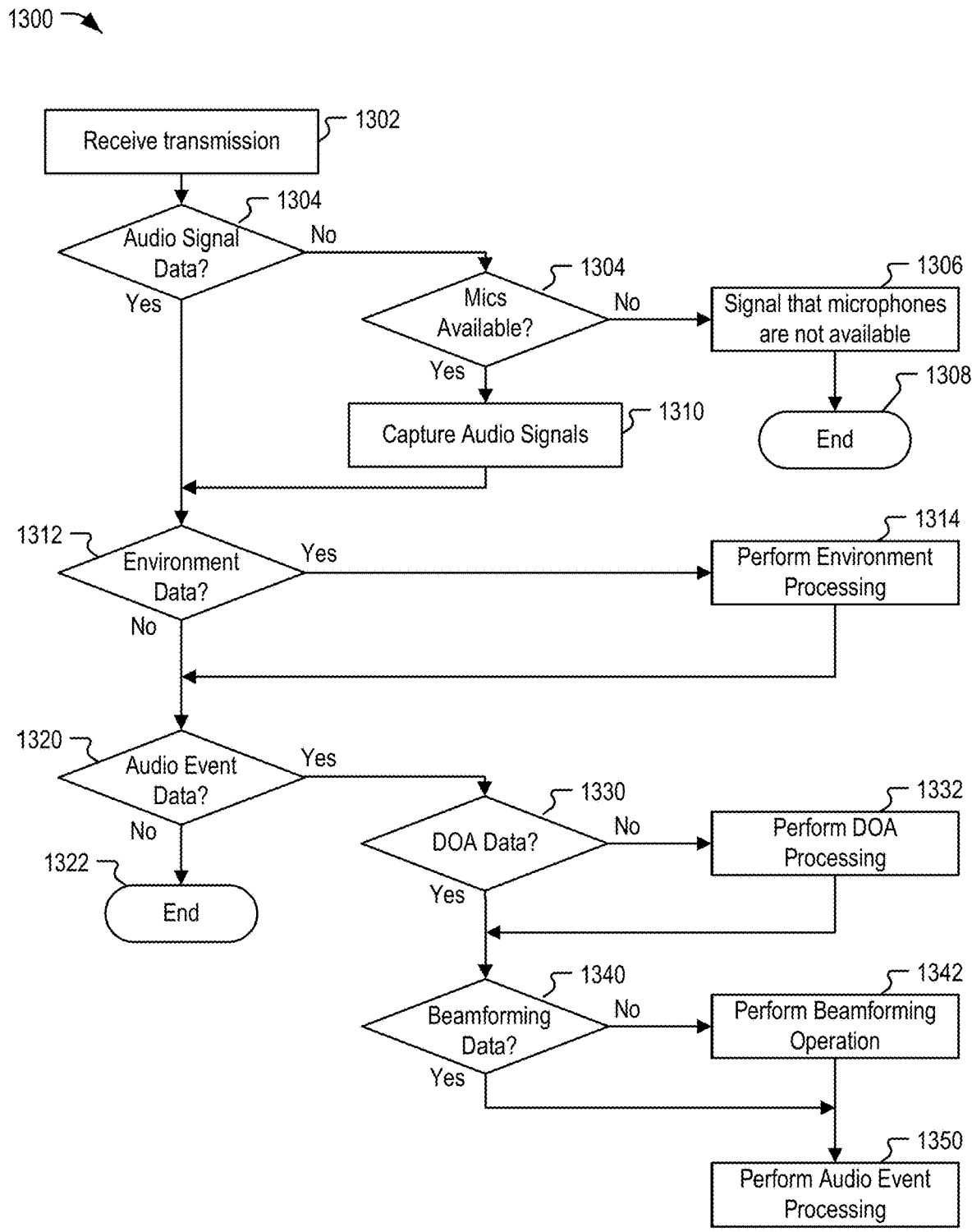
FIG. 13 is a diagram of another particular implementation of operations that may be performed in an audio processing device, in accordance with some examples of the present disclosure.

FIG. 13 depicts a flowchart corresponding to a method 1300 that may be performed by a second device, such as the device 120 (e.g., the one or more processors 126) with respect to receiving information from a first device, such as the device 110.

The method 1300 includes receiving a transmission of data from the first device, at block 1302. The method 1300 includes determining whether the transmission includes audio signal data, at block 1304. As an example, the second device can parse the received data to determine whether one or more audio signals (e.g., the audio signals 170, 172, the one or more beamformed signals 148, or a combination thereof) was received.

If the transmission does not include audio signal data, the method 1300 optionally includes determining whether one or more microphones of the second device are available for audio capture, at block 1304. For example, in the event that the microphones of the second device (e.g., the microphones 106, 108) are occluded or blocked, such as in a user's pocket or bag, or are located too far away to be able to capture substantially the same audio information as the microphones at the first device, the microphones at the second device can be considered not available.

In response to determining, at block 1304, that the one or more microphones are not available, the method 1300 optionally includes sending a signal, to the first device, that microphones are not available, at 1306, and the method ends, at 1308. Otherwise, when one or more microphones are available, the method 1300 optionally includes performing a data capture operation at the second device to capture audio signals, at block 1310.

The method 1300 optionally includes determining whether the transmission includes environment data, at block 1312. As an example, the device 120 can parse the received data to determine whether the environmental information 146 was received. In response to the transmission including environment data, the method 1300 optionally includes performing environment processing, at 1314. For example, the device 120 can process the audio signals 170, 172, 190, 192, or a combination thereof, at the acoustic environment processing unit 156 to generate the environmental information 147.

The method 1300 includes determining whether the transmission includes audio event data, at block 1320. As an example, the device 120 can parse the received data to determine whether the audio event information 144 was received. If the transmission does not include audio event data, processing of the data received in the transmission ends, at 1322. In response to the transmission including audio event data, the method 1300 optionally includes determining whether the transmission includes direction-of-arrival data, at block 1330. As an example, the device 120 can parse the received data to determine whether the direction-of-arrival information 142 was received. In response to the transmission not including direction-of-arrival data, the method 1300 optionally includes performing direction-of-arrival processing, at 1332, to generate direction-of-arrival data. For example, the device 120 can process the audio signals 170, 172, 190, 192, or a combination thereof, at the direction-of-arrival processing unit 152 to generate the direction-of-arrival information 143. However, if the transmission includes direction-of-arrival data, the direction-of-arrival processing of block 1332 is bypassed. Thus, the second device can selectively bypass direction-of-arrival processing on received audio data corresponding to the audio event based on whether direction-of-arrival information is received from the first device.

When the transmission includes direction-of-arrival information, at block 1330, or after generating the direction-of-arrival information, at block 1332, the method 1300 optionally includes determining whether the transmission includes beamforming data, at block 1340. As an example, the device 120 can parse the received data to determine whether the beamformed audio signal 148 was received. In response to the transmission not including beamforming data, the method 1300 optionally includes performing a beamforming operation, at 1342, to generate beamforming data. For example, the device 120 can process the audio signals 170, 172, 190, 192, or a combination thereof, at the beamforming unit 158 to generate the beamformed audio signal 149. However, if the transmission includes beamforming data, performance of the beamforming operation of block 1342 is bypassed. Thus, the second device can selectively bypass the beamforming operation based on whether received audio data corresponds to multi-channel microphone signals from the first device or corresponds to beamformed signals from the first device.

When the transmission includes beamforming data, at block 1340, or after generating the beamforming data, at block 1342, the method 1300 includes performing audio event processing, at block 1350. For example, the device 120 can process the audio signals 170, 172, 190, 192, or a combination thereof, at the audio event processing unit 154 to generate the audio event information 145.

By selectively bypassing one or more operations, such as direction-of-arrival processing or a beamforming operation, the method 1300 enables reduced power consumption, reduced latency, or both, associated with processing audio event data received from the first device.

Figure 14:
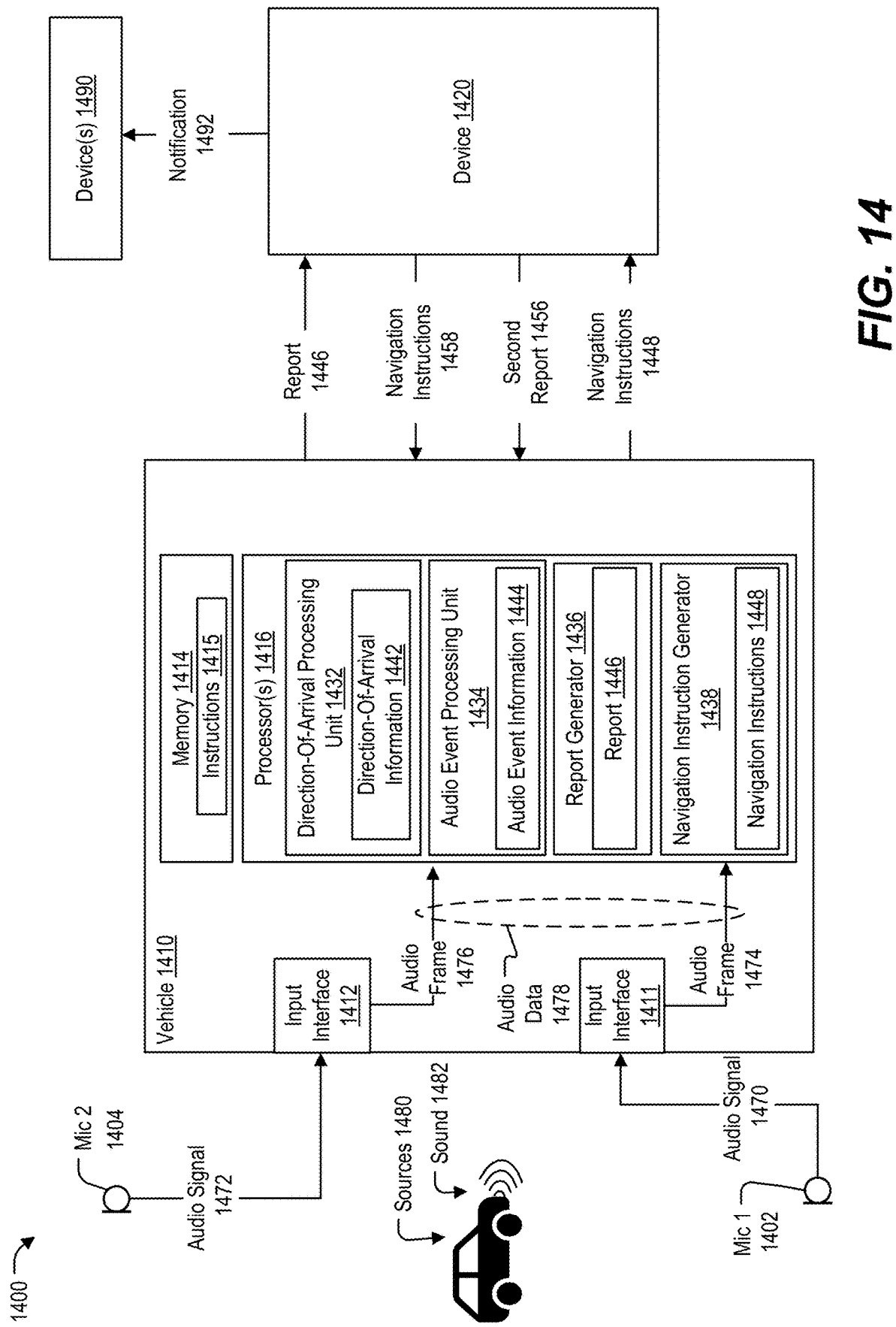
FIG. 14 is a block diagram of another particular illustrative aspect of a system configured to perform directional processing on one or more audio signals received from one or more microphones, in accordance with some examples of the present disclosure.

Referring to FIG. 14, a particular illustrative aspect of a system configured to perform directional processing on multiple audio signals received from multiple microphones is disclosed and generally designated 1400. The system 1400 includes a vehicle 1410 that is coupled to a first microphone 1402 and a second microphone 1404. Although two microphones 1402, 1404 are illustrated, in other implementations, additional microphones can be coupled to the vehicle 1410. As a non-limiting example, eight (8) microphones can be coupled to the vehicle 1410. In some implementations, the microphones 1402, 1404 are directional microphones. In other implementations, one or both of the microphones 1402, 1404 are omni-directional microphones.

According to some implementations, the vehicle 1410 can be an autonomous vehicle. That is, the vehicle 1410 may navigate without user interaction. According to other implementations, the vehicle 1410 can include one or more user-assisted modes (e.g., obstacle detection, obstacle avoidance, lane maintenance, speed control, etc.) and in some examples can switch between a user-assisted mode and an autonomous mode. The system 1400 also includes a device 1420. According to one implementation, the device 1420 includes a second vehicle. According to another implementation, the device 1420 includes a server. As described below, the vehicle 1410 can wirelessly communicate with the device 1420 to perform one or more operations, such as autonomous navigation, based on sounds detected at the vehicle 1410. In a particular implementation, the vehicle 1410 corresponds to the device 110 and the device 1420 corresponds to the device 120.

The first microphone 1402 is configured to capture sound 1482 from one or more sources 1480. In the illustrative example of FIG. 14, the source 1480 corresponds to another vehicle, such as a car. However, it should be understood that the vehicle is merely a non-limiting example of a sound source and that the techniques described herein can be implemented with other sound sources. Upon capturing the sound 1482 from the source 1480, the first microphone 1402 is configured to generate an audio signal 1470 that is representative of the captured sound 1482. In a similar manner, the second microphone 1404 is configured to capture the sound 1482 from the one or more sources 1480. Upon capturing the sound 1482 from the source 1480, the second microphone 1404 is configured to generate an audio signal 1472 that is representative of the captured sound 1482.

The first microphone 1402 and the second microphone 1404 can have different locations, different orientations, or both, on the vehicle 1410. As a result, the microphones 1402, 1404 may capture the sound 1482 at different times, with different received phases, or both. To illustrate, if the first microphone 1402 is closer to the source 1480 than the second microphone 1404 is to the source 1480, the first microphone 1402 may capture the sound 1482 prior to the second microphone 1404 capturing the sound 1482. As described below, if the location and orientation of the microphones 1402, 1404 are known, the audio signals 1470, 1472 generated by the microphones 1402, 1404, respectively, can be used to perform directional processing. That is, the audio signals 1470, 1472 can be used, by the vehicle 1410, to determine a relative location of the source 1480, to determine a direction-of-arrival of the sound 1482, etc.

The vehicle 1410 includes a first input interface 1411, a second input interface 1412, a memory 1414, and one or more processors 1416. The first input interface 1411 is coupled to the one or more processors 1416 and is configured to be coupled to the first microphone 1402. The first input interface 1411 is configured to receive the audio signal 1470 (e.g., a first microphone output) from the first microphone 1402 and may provide the audio signal 1470 to the processor 1416 as an audio frame 1474. The second input interface 1412 is coupled to the one or more processors 1416 and is configured to be coupled to the second microphone 1404. The second input interface 1412 is configured to receive the audio signal 1472 (e.g., a second microphone output) from the second microphone 1404 and may provide the audio signal 1472 to the processor 1416 as an audio frame 1476. The audio signals 1470, 1472, the audio frames 1474, 1476, or both, may also be referred to herein as audio data 1478.

The one or more processors 1416 include a direction-of-arrival processing unit 1432 and optionally includes an audio event processing unit 1434, a report generator 1436, a navigation instruction generator 1438, or a combination thereof. According to one implementation, one or more of the components of the one or more processors 1416 can be implemented using dedicated circuitry. As non-limiting examples, one or more of the components of the one or more processors 1416 can be implemented using a FPGA, an ASIC, etc. According to another implementation, one or more of the components of the one or more processors 1416 can be implemented by executing instructions 1415 stored in the memory 1414. For example, the memory 1414 can be a non-transitory computer-readable medium that stores instructions 1415 executable by the one or more processors 1416 to perform the operations described herein.

The direction-of-arrival processing unit 1432 can be configured to process the multiple audio signals 1470, 1472 to generate direction-of-arrival information 1442 corresponding to the sources 1480 of the sound 1482 represented in the audio signals 1470, 1472. In some implementations, the direction-of-arrival processing unit 1432 is configured to operate in a similar manner as the direction-of-arrival processing unit 132 of FIG. 1. In an illustrative, non-limiting example, the direction-of-arrival processing unit 1432 can select audio frames 1474, 1476 generated from each microphone 1402, 1404 that represent a similar sound, such as the sound 1482 from the source 1480. For example, the direction-of-arrival processing unit 1432 can process the audio frames 1474, 1476 to compare sound characteristics and ensure that the audio frames 1474, 1476 represent the same instance of the sound 1482. In response to determining that the audio frames 1474, 1476 represent the same instance of the sound 1482, the direction-of-arrival processing unit 1432 can compare time stamps of each audio frame 1474, 1476 to determine which microphone 1402, 1404 captured the corresponding instance of the sound 1482 first. If the audio frame 1474 has an earlier time stamp than the audio frame 1476, the direction-of-arrival processing unit 1432 can generate direction-of-arrival information 1442 indicating that the source 1480 is closer in proximity to the first microphone 1402. If the audio frame 1476 has an earlier time stamp than the audio frame 1474, the direction-of-arrival processing unit 1432 can generate direction-of-arrival information 1442 indicating that the source 1480 is closer in proximity to the second microphone 1404. Thus, based on timestamps of similar audio frames 1474, 1476, the direction-of-arrival processing unit 1432 can localize the sound 1482 and the corresponding source 1480. Time stamps from audio frames from additional microphones can be used to improve localization in a similar manner as described above.

In some implementations, one or more other techniques to determine the direction-of-arrival information 1442 can be used instead of, or in addition to, time differences as described above, such as measuring phase differences of the sound 1482 received at each microphone in a microphone array of the vehicle 1410 (e.g., the microphones 1402 and 1404). In some implementations, the microphones 1402,

1404 may be operated as, or included in, a microphone array and the direction-of-arrival information 1442 is generated based on characteristics, such as time of arrival or phase, of the sound from each of the microphones in the microphone array and based on relative positions and orientations of the microphones in the microphone array. In such implementations, information regarding sound characteristics, or the captured audio data, may be transmitted between the vehicle 1410 and the device 1420 for direction-of-arrival detection.

The audio event processing unit 1434 can be configured to process the multiple audio signals 1470, 1472 to perform audio event detection in a similar manner as the audio event processing unit 134. To illustrate, the audio event processing unit 1434 can process sound characteristics of the audio frames 1474, 1476 and compare the sound characteristics to a plurality of audio event models to determine whether an audio event has occurred. For example, the audio event processing unit 1434 may access a database (not shown) that includes models for different audio events, such as a car horn, a train horn, a pedestrian talking, etc. In response to the sound characteristics matching (or substantially matching) a particular model, the audio event processing unit 1434 can generate audio event information 1444 indicating that the sound 1482 represents an audio event associated with the particular model. As a non-limiting example, the audio event may correspond to a sound of an approaching vehicle (e.g., the source 1480).

The report generator 1436 can be configured to generate a report 1446 based on the direction-of-arrival information 1442 and the audio event information 1444. Thus, the report 1446 can indicate at least one detected event and a direction of the detected event. In scenarios where multiple sounds are captured by the microphones 1402, 1404 from various directions, the report 1446 can indicate a list of detected events and directional information of the detected events over a time period.

The processors 1416 can be configured to send the report 1446 to the device 1420. According to an implementation, based on the report 1446, the device 1420 can send navigation instructions 1458 to the vehicle 1410. Upon receiving the navigation instructions 1458 from the device 1420, the processor 1416 may navigate (e.g., autonomously navigate) the vehicle 1410 based on the navigation instructions 1458. Alternatively, or in addition, the navigation instructions 1458 may be provided to an operator of the vehicle 1410, such as a visible or audible alert or instruction to adjust operation of the vehicle 1410. In some examples, the navigation instructions 1458 indicate a path to be taken by the vehicle 1410 (e.g., stop on the side when safely possible to let an emergency vehicle pass). In some examples, the navigation instructions 1458 inform the vehicle 1410 of a path of one or more other vehicles (e.g., a vehicle in front detected an accident and is about to slow down). The processor 1416 may autonomously navigate the vehicle 1410 to change a path (e.g., re-route or change speed) to account for the path of the one or more other vehicles.

According to another implementation, based on the report 1446 or independently of the report 1446, the device 1420 can send a second report 1456 to the vehicle 1410. In response to receiving the second report 1456, according to an implementation, the processor 1416 may navigate (e.g., autonomously navigate) the vehicle 1410 based on the report 1446 and the second report 1456. According to another implementation, in response to receiving the second report 1456, the navigation instruction generator 1438 can be configured to generate navigation instructions 1448 to be used by the processor 1416 to navigate the vehicle 1410. In some examples, the second report 1456 indicates an event detected by another vehicle (e.g., a vehicle in front detected sounds indicating an accident). The navigation instruction generator 1438 may generate the navigation instructions 1448 to autonomously navigate the vehicle 1410 to change a travel path to avoid the location of the event or to change speed (e.g., slow down). The processor 1416 can also send the navigation instructions 1448 to the device 1420 to inform the device 1420 of the path of the vehicle 1410. In some examples, the navigation instructions 1448 indicate a path (e.g., a route or a speed) recommended to be taken by one or more other vehicles. For example, the navigation instructions 1448 indicate that the vehicle 1410 is slowing down and any vehicles within 20 feet of the vehicle 1410 are recommended to slow down or re-route.

Optionally, the device 1420 can send a notification 1492 of the audio event (e.g., a vehicle collision) to one or more other devices 1490 based on a location of the vehicle 1410 and locations of the one or more other devices 1490. In an example, the notification 1492 corresponds to the notification 930 of FIG. 9. The one or more devices 1490 may include, or be incorporated in, one or more other vehicles that may be determined to be in the vicinity of the vehicle 1410 or approaching the location of the vehicle 1410, to inform the vehicles of one or more detected audio events (e.g., a siren, a collision, etc.) in the vicinity of the vehicle 1410, as an illustrative, non-limiting example.

The system 1400 of FIG. 14 enables the vehicle 1410 to detect external sounds, such as sirens, and navigate accordingly. It should be appreciated that using multiple microphones enables determining the location and relative distance to the siren sounds (e.g., the source 1480) and the location and relative distance can be displayed as the detected siren sounds are approaching or getting further away.

Figure 15:
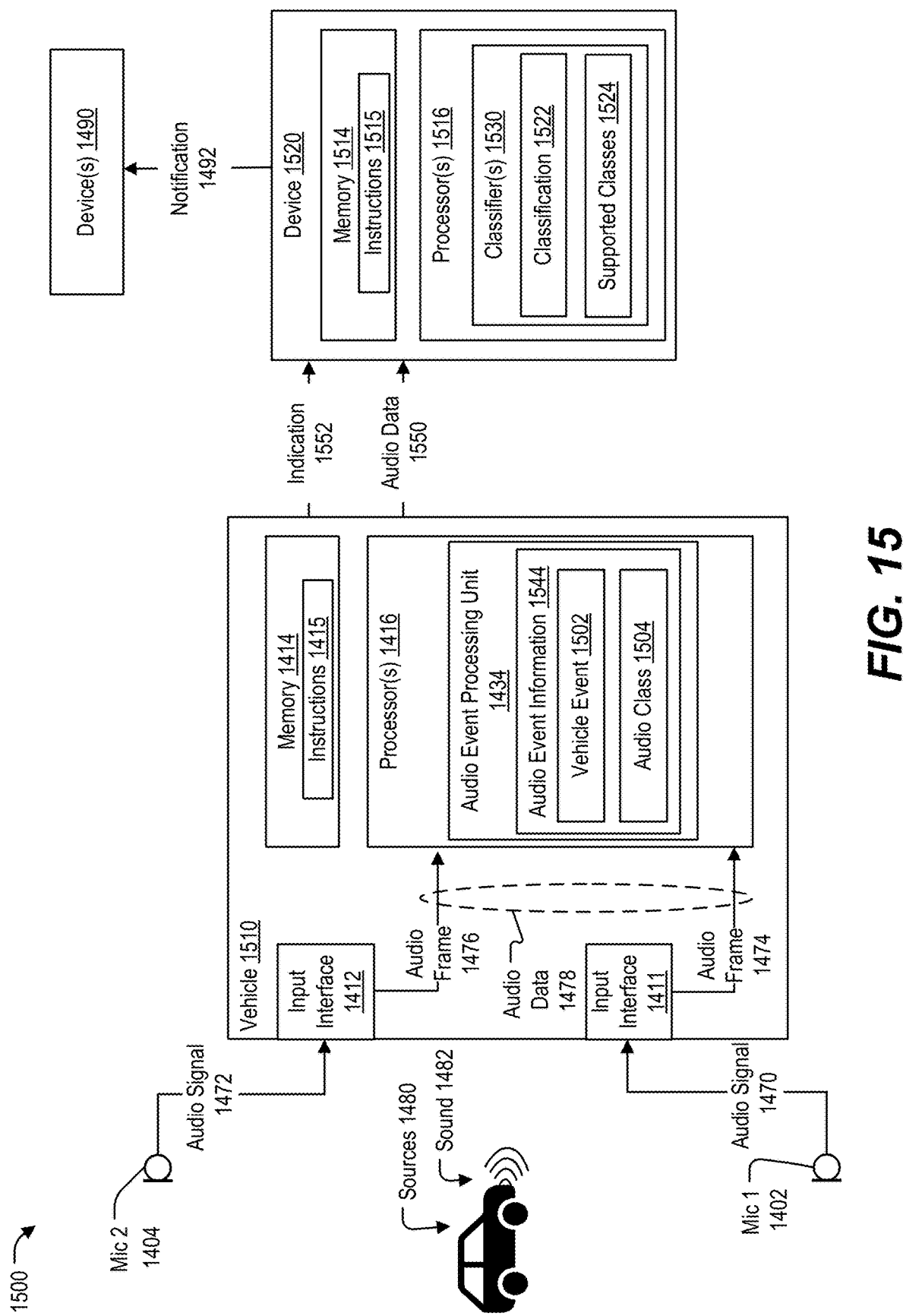
FIG. 15 is a block diagram of another particular illustrative aspect of a system configured to perform directional processing on one or more audio signals received from one or more microphones, in accordance with some examples of the present disclosure.

FIG. 15 depicts a particular illustrative aspect of a system 1500 that includes a vehicle 1510 (e.g., a first device) in communication with a device 1520 (e.g., a second device). The vehicle 1510 includes the input interfaces 1412, 1411, the memory 1414, and the one or more processors 1416 of FIG. 14. In a particular implementation, the vehicle 1510 corresponds to the device 110 and the device 1520 corresponds to the device 120.

The one or more processors 1416 include an implementation of the audio event processing unit 1434 in which the generated audio event information 1444 indicates that a detected audio event corresponds to a vehicle event 1502, and an audio class 1504 associated with the vehicle event 1502. For example, the audio event processing unit 1434 can include one or more classifiers, such as the one or more classifiers 610 of FIG. 6, that are configured to process the audio data 1478 to determine the audio class 1504 corresponding to the sound 1482 that is represented in the audio data 1478 and that is associated with the vehicle event 1502.

The one or more processors 1416 are configured to send, to the device 1520, audio data 1550 representing a sound associated with the vehicle event 1502. For example, the audio data 1550 can include the audio data 1478, the audio signals 1470, 1472, one or more beamformed audio signals directed to a source 1480 of the sound 1482, or a combination thereof. The one or more processors 1416 are also configured to send, to the device 1520, an indication 1552 that the audio data 1550 corresponds to the audio class 1504 associated with the vehicle event 1502. For example, the indication 1552 can correspond to the indication 616 of FIG. 6 or FIG. 8.

The device 1520 includes a memory 1514 configured to store instructions 1515 and also includes one or more processors 1516 coupled to the memory 1514. The one or more processors 1516 are configured to receive, from the vehicle 1510 (e.g., a first device), the audio data 1550 representing the sound 1482 and the indication 1552 that the audio data 1554 corresponds to the audio class 1504 associated with the vehicle event 1502. In a particular implementation, the device 1520 corresponds to another vehicle, a server, or a distributed computing (e.g., cloud-based) system, as non-limiting examples.

The one or more processors 1516 are also configured to process the audio data 1550 at one or more classifiers 1530 to verify that the sound 1482 represented in the audio data 1550 corresponds to the vehicle event 1502. For example, in a particular implementation, the one or more classifiers 1530 correspond to the one or more classifiers 920 of FIG. 9. The one or more processors 1516 are configured to send the notification 1492 of the vehicle event 1502 to the one or more devices 1490 based on a location of the vehicle 1510 (e.g., a first device) and locations of the one or more devices 1490 (e.g., one or more third devices).

FIG. 16 depicts a particular implementation of the device 120 (e.g., a second device) in which the one or more processors 126 are configured to update a map 1614 of directional sound sources based on audio events detected by a first device (e.g., the device 110).

The one or more processors 126 include the audio event processing unit 154, a map updater 1612, and an audio scene renderer 1618. The one or more processors 126 are configured to perform one or more operations associated with tracking sources of directional audio sounds in an audio scene. In an example, the one or more processors 126 can receive, from the first device, an indication 1602 of an audio class corresponding to an audio event, such as the indication 616 of FIG. 6, and direction data 1604 corresponding to a source of a sound associated with the audio event, such as the direction-of-arrival information 142.

The one or more processors 126 can update, based on the audio event, the map 1614 of directional sound sources in an audio scene to generate an updated map 1616. For example, when the audio event corresponds to a newly detected audio event, the map updater 1612 is configured to insert information corresponding to the audio event into the map 1614 to generate the updated map 1616. The inserted information can include information such as a location of the source of the sound associated with the audio event, an indication of the type of the audio event (e.g., the audio class corresponding to the audio event), and audio (e.g., a link to audio signal data representing the sound) associated with the audio event.

Optionally, the one or more processors 126 can send data 1660 corresponding to the updated map 1616 to one or more third devices, illustrated as devices 1670, 1672, and 1674, that are geographically remote from the first device. The data 1660 enables the devices 1670, 1672, and 1674 to each update that device's local copy of the map 1614 to enable a user of the device 1670, 1672, or 1674 to be informed of, to have access to, or to experience the sound associated with the audio event.

In some implementations, the map 1614 (and the updated map 1616) corresponds to a database of audio events and locations that are distributed over a geographical region, such as a "crowdsourced" database to inform vehicles when a collision is detected nearby or to update vehicle navigation instructions to avoid particular audio events, such as described in FIGS. 14 and 15. In other implementations, the map 1614 (and the updated map 1616) can be used for other applications, such as to provide a map of sound events detected in a neighborhood, a town, a city, etc. For example, a map of audio events associated with crime (e.g., gunshots, shouting, sirens, glass breaking, etc.), can be used by law enforcement for planning resource allocation or for detecting events warranting investigation. As another example, a map of audio events can be associated with nature. To illustrate, bird enthusiasts can use a map of various types of birds that have been located based on detection and classification of their particular bird calls.

In some implementations, the audio scene renderer 1618 is configured to generate sound data corresponding to a three-dimensional sound scene based on the updated map 1616 for playback to a user of the first device. For example, the first device can correspond to an audio headset worn by a user, such as described with reference to FIG. 21, or a virtual reality, augmented reality, or mixed reality headset, such as described with reference to FIG. 25.

Figure 17:
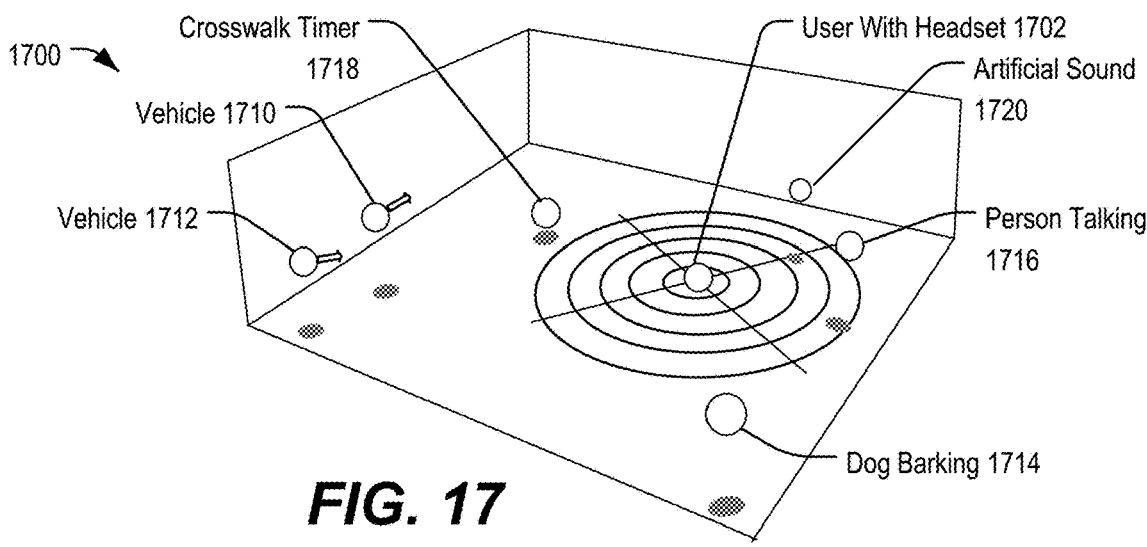
FIG. 17 illustrates an example of an audio scene that includes multiple directional sound sources that can be determined via directional processing on one or more audio signals received from one or more microphones, in accordance with some examples of the present disclosure.

FIG. 17 depicts a graphical example of a 3D audio map 1700 of an audio scene surrounding a user 1702 wearing a headset. The 3D audio map 1700 can correspond to the map 1614 (or the updated map 1616) of FIG. 16. The 3D audio map 1700 includes a first vehicle 1710 that is moving in a direction generally toward the user 1702 and a second vehicle 1712 that is also moving in a direction generally toward the user. (Movement direction of moving audio sources is indicated by arrows). Other sound sources include a barking dog 1714, a talking person 1716, a crosswalk timer 1718 counting down a remaining time to cross a street, and an artificial sound 1720 that has been edited into the 3D audio map 1700. For example, the sound sources 1710-1718 may be real-world sound sources detected via microphones of the headset worn by the user 1702, and the artificial sound 1720 may be added at a particular location in the sound scene by an augmented reality engine (or game engine), such as a sound effect (e.g., a commercial jingle) associated with a store or restaurant at that location.

Figure 18:
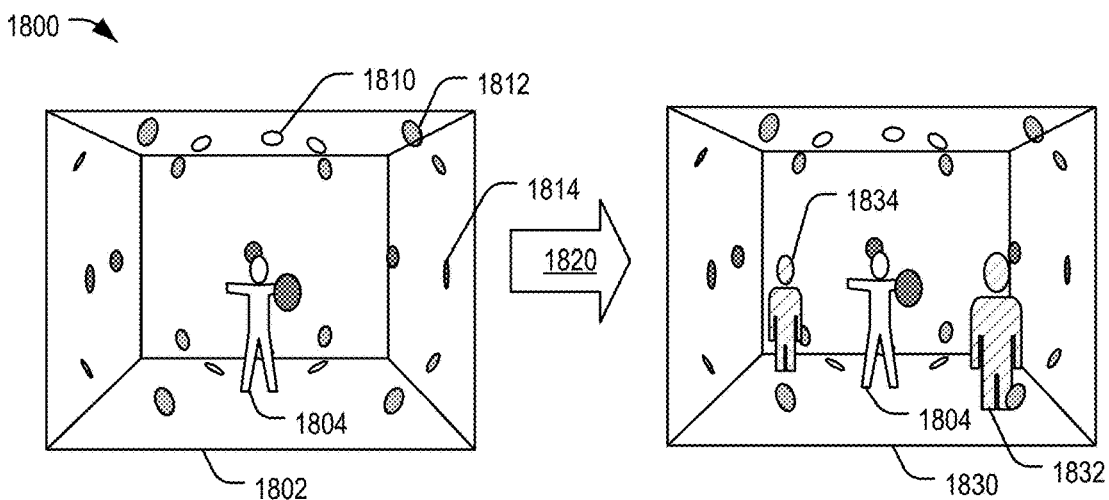
FIG. 18 illustrates an example of a shared audio scene that includes multiple directional sound sources, in accordance with some examples of the present disclosure.

FIG. 18 depicts an example of a directional audio scene 1802 captured with sound event and environment class detection, such as based on the map 1614 (or the updated map 1616) of FIG. 16. A user 1804 is in the center of the directional audio scene 1802, and multiple sets of virtual (or actual) speakers associated with sound fields of the directional audio scene 1802 are illustrated, including a first representative speaker 1810 of a first set of speakers positioned substantially above and below the user 1804, a second representative speaker 1812 of a second set of speakers positioned along an upper and lower periphery of the directional audio scene 1802, and a third representative speaker 1814 of a third set of speakers positioned at approximately head height around the user 1804.

In a particular implementation, an operation 1820 (e.g., an update of the map 1614 to add or remove sound events based on type, direction, etc.) results in an updated directional audio scene 1830 that includes multiple virtual participants 1832, 1834 in addition to the user 1804. For example, the virtual participants 1832, 1834 can correspond to remote users sharing information regarding their respective local sound fields, which can be combined with the directional audio scene 1802 to generate an immersive shared virtual experience for the user 1804 and the various participants 1832, 1834. Such shared virtual experiences can be used for applications such as a live travel channel guide or a live conference, party, or events immersion, for people who cannot attend in person due to social, health, or other constraints.

Figure 19:
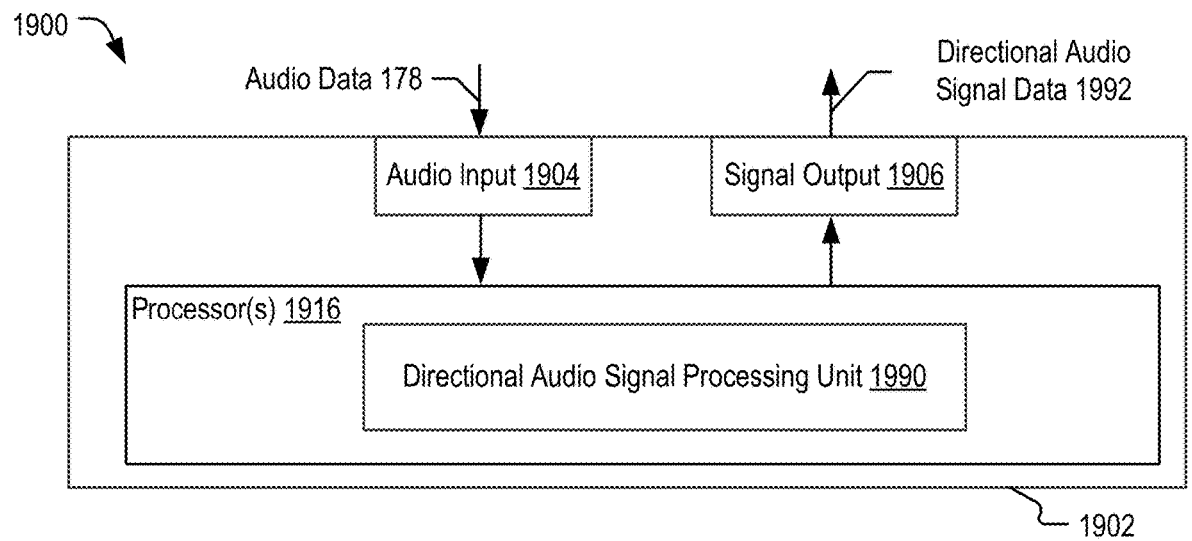
FIG. 19 illustrates an example of an integrated circuit that includes a directional audio signal processing unit for generating directional audio signal data, in accordance with some examples of the present disclosure.

FIG. 19 depicts an implementation 1900 of at least one of the device 110, 120 as an integrated circuit 1902 that includes directional audio signal processing circuitry. For example, the integrated circuit 1902 includes one or more processors 1916. The one or more processors 1916 can correspond to the one or more processors 116, the one or more processors 126, the one or more processors 202 of FIG. 2, processing circuitry described with respect to FIGS. 3-5, the one or more processors 1416, the one or more processors 1516, or a combination thereof. The one or more processors 1916 include a directional audio signal processing unit 1990. The directional audio signal processing unit 1990 can include at least one component of the processor 116, at least one component of the processor 126, at least one component of the processor 202, at least one component of the headset 310, at least one component of the headset 410, at least one component of the mobile phone 420, at least one component of the system 500, at least one component of the processor 1416, at least one component of the processor 1516, or a combination thereof.

The integrated circuit 1902 also includes an audio input 1904, such as one or more bus interfaces, to enable the audio data 178 to be received for processing. The integrated circuit 1902 also includes a signal output 1906, such as a bus interface, to enable sending of directional audio signal data 1992. The directional audio signal data 1992 may correspond to at least one of the direction-of-arrival information 142, 143, the audio event information 144, 145, the environmental information 146, 147, the beamformed audio signals 148, 149, the directional information 250, the first sound information 440, the second sound information 442, the context information 496, the audio zoom angle 460, the noise reduction parameters 462, the direction-of-arrival information 542, the audio event information 544, the indication 616, the indication 716, the notification 930, the control signal 932, the classifier output 934, the target output 1106, the reports 1446, 1456, the navigation instructions 1448, 1458, the notification 1492, the indication 1552, the audio data 1550, the data 1660, or a combination thereof.

Figure 20:
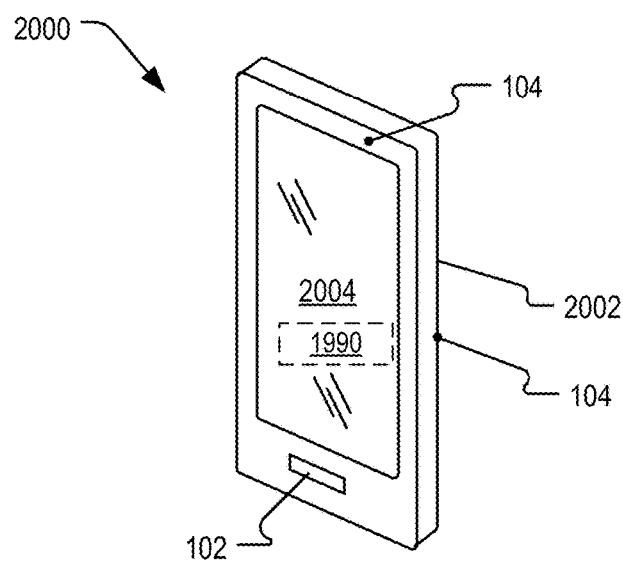
FIG. 20 is a diagram of a mobile device that includes a directional audio signal processing unit for generating directional audio signal data, in accordance with some examples of the present disclosure.
Figure 21:
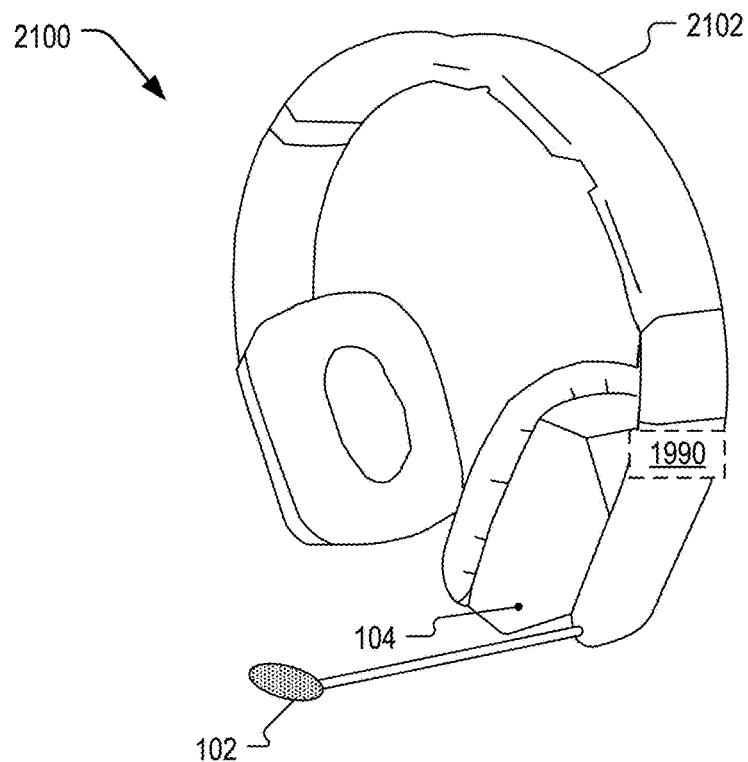
FIG. 21 is a diagram of a headset that includes a directional audio signal processing unit for generating directional audio signal data, in accordance with some examples of the present disclosure.
Figure 22:
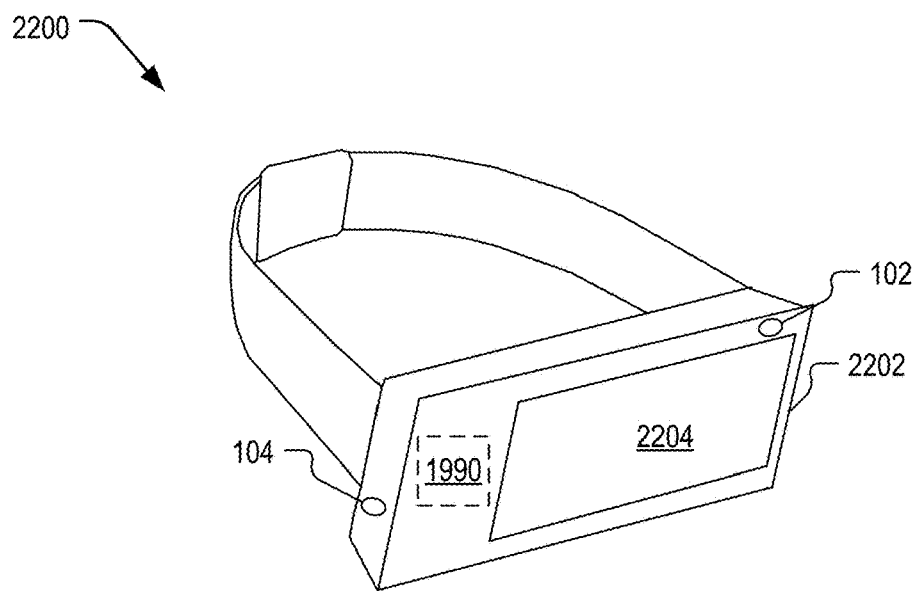
FIG. 22 is a diagram of a wearable electronic device that includes a directional audio signal processing unit for generating directional audio signal data, in accordance with some examples of the present disclosure.
Figure 23:
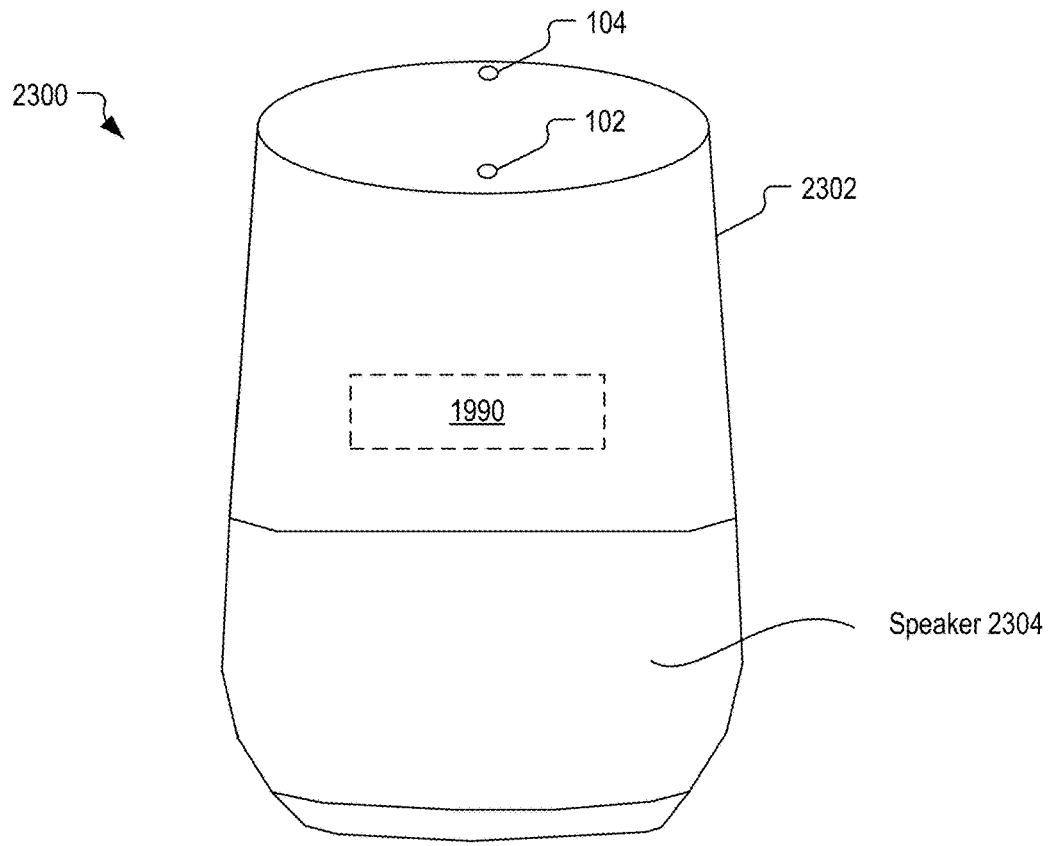
FIG. 23 is a diagram of a voice-controlled speaker system that includes a directional audio signal processing unit for generating directional audio signal data, in accordance with some examples of the present disclosure.
Figure 24:
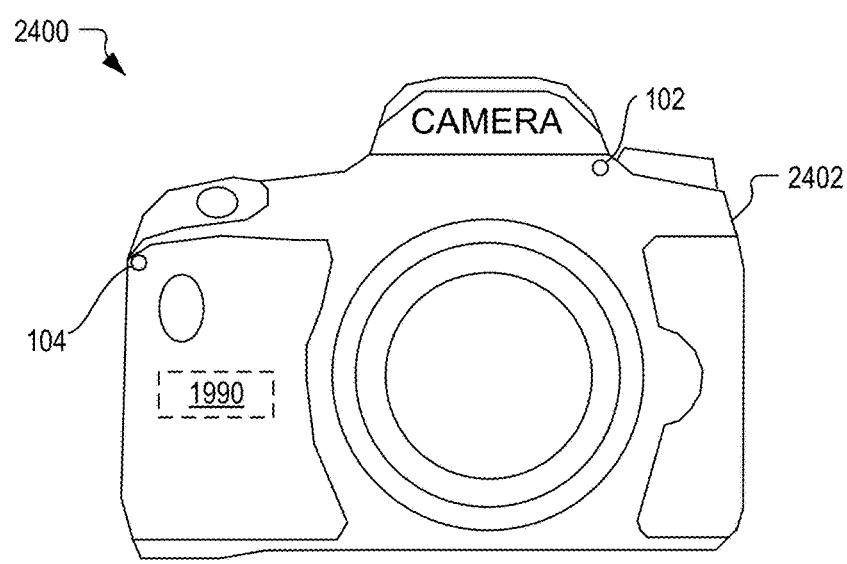
FIG. 24 is a diagram of a camera that includes a directional audio signal processing unit for generating directional audio signal data, in accordance with some examples of the present disclosure.
Figure 27:
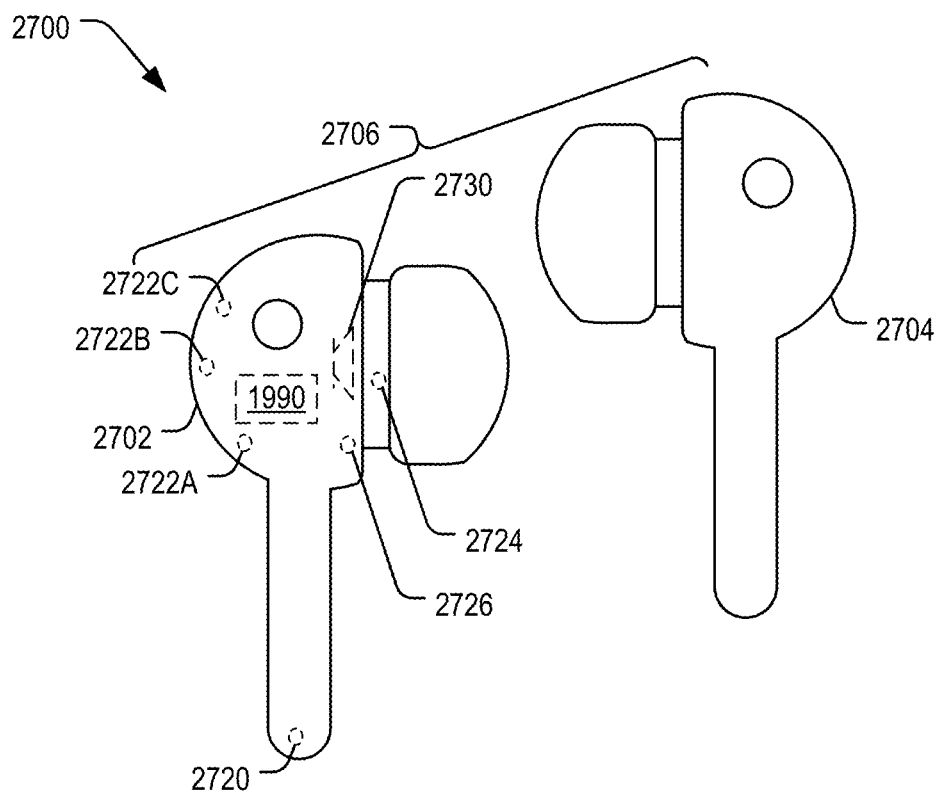
FIG. 27 is a diagram of earbuds that include a directional audio signal processing unit for generating directional audio signal data, in accordance with some examples of the present disclosure.
Figure 28:
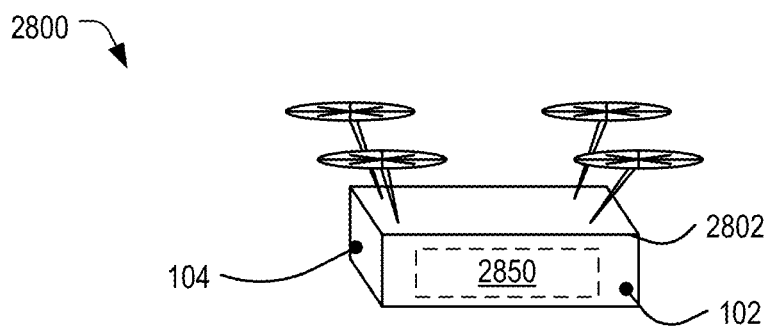
FIG. 28 is a diagram of a first example of a vehicle that includes a directional audio signal processing unit for navigating the vehicle, in accordance with some examples of the present disclosure.
Figure 29:
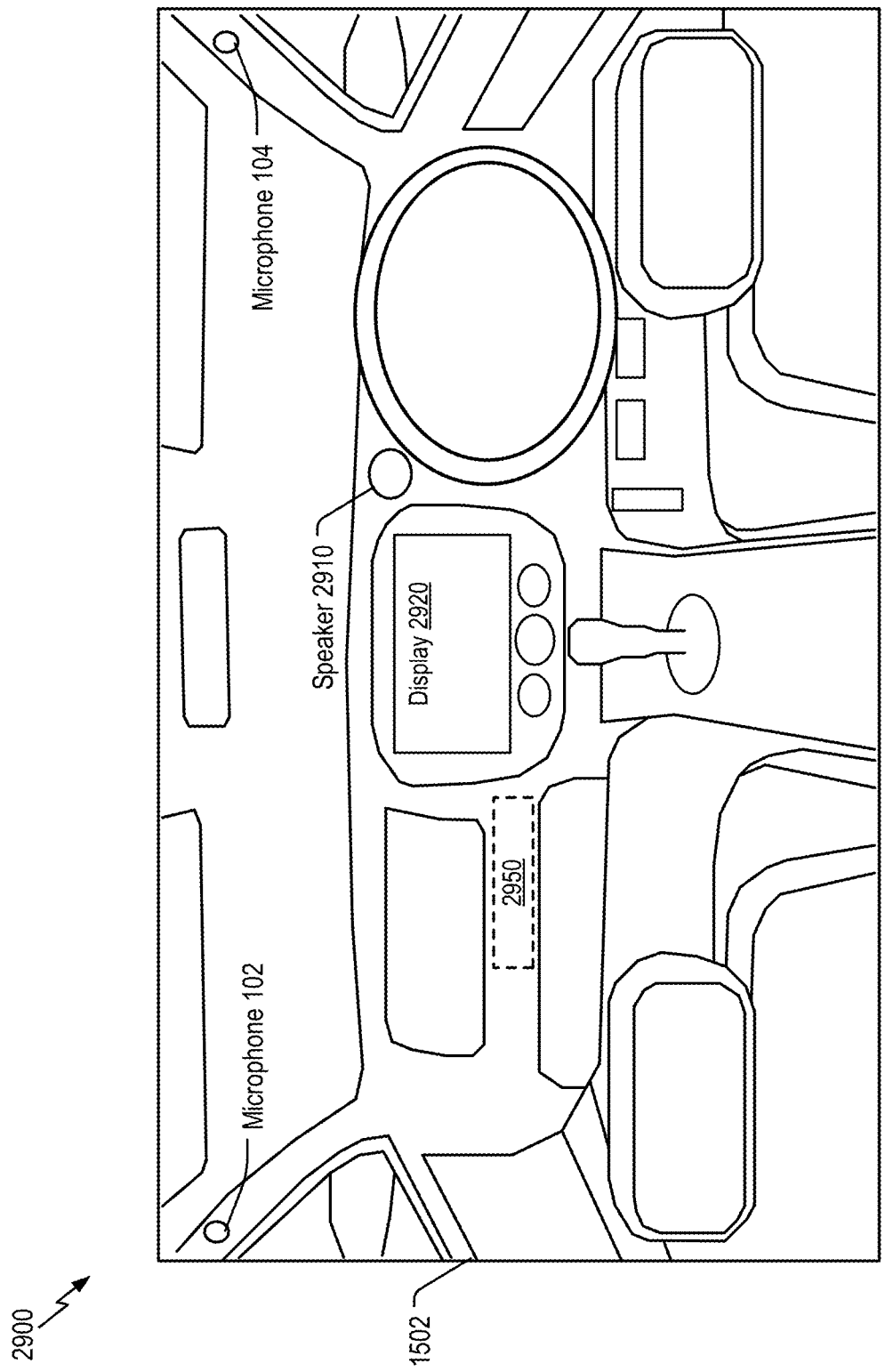
FIG. 29 is a diagram of a second example of a vehicle that includes a directional audio signal processing unit for navigating the vehicle, in accordance with some examples of the present disclosure.

The integrated circuit 1902 enables directional audio signal processing as a component in a system that includes microphones, such as a mobile phone or tablet as depicted in FIG. 20, a headset as depicted in FIG. 21, a wearable electronic device as depicted in FIG. 22, a voice-controlled speaker system as depicted in FIG. 23, a camera as depicted in FIG. 24, a virtual reality headset, mixed reality headset, or an augmented reality headset as depicted in FIG. 25, augmented reality glasses or mixed reality glasses as depicted in FIG. 26, a set of in-ear devices, as depicted in FIG. 27, or a vehicle as depicted in FIG. 28 or FIG. 29.

FIG. 20 depicts an implementation 2000 in which the device 120 is a mobile device 2002, such as a phone or tablet, as illustrative, non-limiting examples. The mobile device 2002 includes the third microphone 106 positioned to primarily capture speech of a user, one or more fourth microphones 108 positioned to primarily capture environmental sounds, and a display screen 2004. The directional audio signal processing unit 1990 is integrated in the mobile device 2002 and is illustrated using dashed lines to indicate internal components that are not generally visible to a user of the mobile device 2002. In a particular example, the directional audio signal processing unit 1990 may function to generate the directional audio signal data 1992, which is then processed to perform one or more operations at the mobile device 2002, such as to launch a graphical user interface or otherwise display other information associated with a detected audio event at the display screen 2004 (e.g., via an integrated "smart assistant" application).

FIG. 21 depicts an implementation 2100 in which the device 110 is a headset device 2102. The headset device 2102 includes the first microphone 102 positioned to primarily capture speech of a user and one or more second microphones 104 positioned to primarily capture environmental sounds. The directional audio signal processing unit 1990 is integrated in the headset device 2102. In a particular example, the directional audio signal processing unit 1990 may function to generate the directional audio signal data 1992, which may cause the headset device 2102 to perform one or more operations at the headset device 2102, to transmit the directional audio signal data 1992 to a second device (not shown) for further processing, or a combination thereof. The headset device 2102 may be configured to provide an audible notification to a wearer of the headset device 2102 of a detected audio event or environment, such as based on the audio event information 144, the audio event information 145, the environmental information 146, the environmental information 147, or a combination thereof.

FIG. 22 depicts an implementation 2200 in which the at least one of the device 110, 120 is a wearable electronic device 2202, illustrated as a "smart watch." The directional audio signal processing unit 1990, the first microphone 102, and one or more second microphones 104 are integrated into the wearable electronic device 2202. In a particular example, the directional audio signal processing unit 1990 may function to generate the directional audio signal data 1992, which is then processed to perform one or more operations at the wearable electronic device 2202, such as to launch a graphical user interface or otherwise display other information associated with a detected audio event at a display screen 2204 of the wearable electronic device 2202. To illustrate, the display screen 2204 of the wearable electronic device 2202 may be configured to display a notification based on speech detected by the wearable electronic device 2202. In a particular example, the wearable electronic device 2202 includes a haptic device that provides a haptic notification (e.g., vibrates) in response to detection of an audio event. For example, the haptic notification can cause a user to look at the wearable electronic device 2202 to see a displayed notification of a detected audio event or environment, such as based on the audio event information 144, the audio event information 145, the environmental information 146, the environmental information 147, or a combination thereof. The wearable electronic device 2202 can thus alert a user with a hearing impairment or a user wearing a headset that a particular audio activity is detected.

FIG. 23 is an implementation 2300 in which at least one of the devices 110, 120 is a wireless speaker and voice activated device 2302. The wireless speaker and voice activated device 2302 can have wireless network connectivity and is configured to execute an assistant operation. The directional audio signal processing unit 1990, the first microphone 102, one or more second microphones 104, the third microphone 106, the fourth microphone 108, or a combination thereof, are included in the wireless speaker and voice activated device 2302. The wireless speaker and voice activated device 2302 also includes a speaker 2304. In a particular aspect, the speaker 2304 corresponds to the speaker 336 of FIG. 3, the speaker 436 of FIG. 4, or both. During operation, the directional audio signal processing unit 1990 may function to generate the directional audio signal data 1992 and determine whether a keyword was uttered. In response to a determination that a keyword was uttered, the wireless speaker and voice activated device 2302 can execute assistant operations, such as via execution of an integrated assistant application. The assistant operations can include adjusting a temperature, playing music, turning on lights, etc. For example, the assistant operations are performed responsive to receiving a command after a keyword or key phrase (e.g., "hello assistant").

FIG. 24 depicts an implementation 2400 in which at least one of the devices 110, 120 is a portable electronic device that corresponds to a camera device 2402. The directional audio signal processing unit 1990, the first microphone 102, one or more second microphones 104, or a combination thereof, are included in the camera device 2402. During operation, the directional audio signal processing unit 1990 may function to generate the directional audio signal data 1992 and determine whether a keyword was uttered. In response to a determination that a keyword was uttered, the camera device 2402 can execute operations responsive to spoken user commands, such as to adjust image or video capture settings, image or video playback settings, or image or video capture instructions, as illustrative examples.

FIG. 25 depicts an implementation 2500 in which the device 110 includes a portable electronic device that corresponds to an extended reality ("XR") headset 2502, such as a virtual reality ("VR"), augmented reality ("AR"), or mixed reality ("MR") headset device. The directional audio signal processing unit 1990, the first microphone 102, one or more second microphones 104, or a combination thereof, are integrated into the headset 2502. In a particular aspect, the headset 2502 includes the first microphone 102 positioned to primarily capture speech of a user and the second microphone 104 positioned to primarily capture environmental sounds. The directional audio signal processing unit 1990 may function to generate the directional audio signal data 1992 based on audio signals received from the first microphone 102 and the second microphone 104 of the headset 2502. A visual interface device is positioned in front of the user's eyes to enable display of augmented reality or virtual reality images or scenes to the user while the headset 2502 is worn. In a particular example, the visual interface device is configured to display a notification indicating user speech detected in the audio signal. In a particular example, the visual interface device is configured to display a notification indicating a detected audio event superimposed on the displayed content (e.g., in a virtual reality application) or superimposed on the user's field of view (e.g., in an augmented reality application) to visually indicate to the user the location of the source of the sound associated with the audio event. To illustrate, the visual interface device may be configured to display a notification of a detected audio event or environment, such as based on the audio event information 144, the audio event information 145, the environmental information 146, the environmental information 147, or a combination thereof.

FIG. 26 depicts an implementation 2600 in which the device 110 includes a portable electronic device that corresponds to augmented reality or mixed reality glasses 2602. The glasses 2602 include a holographic projection unit 2604 configured to project visual data onto a surface of a lens 2606 or to reflect the visual data off of a surface of the lens 2606 and onto the wearer's retina. The directional audio signal processing unit 1990, the first microphone 102, one or more second microphones 104, or a combination thereof, are integrated into the glasses 2602. The directional audio signal processing unit 1990 may function to generate the directional audio signal data 1992 based on audio signals received from the first microphone 102 and the second microphone 104. In a particular example, the holographic projection unit 2604 is configured to display a notification indicating user speech detected in the audio signal. In a particular example, the holographic projection unit 2604 is configured to display a notification indicating a detected audio event. For example, the notification can be superimposed on the user's field of view at a particular position that coincides with the location of the source of the sound associated with the audio event. To illustrate, the sound may be perceived by the user as emanating from the direction of the notification. In an illustrative implementation, the holographic projection unit 2604 is configured to display a notification of a detected audio event or environment, such as based on the audio event information 144, the audio event information 145, the environmental information 146, the environmental information 147, or a combination thereof.

FIG. 27 depicts an implementation 2700 in which the device 110 includes a portable electronic device that corresponds to a pair of earbuds 2706 that includes a first earbud 2702 and a second earbud 2704. Although earbuds are described, it should be understood that the present technology can be applied to other in-ear or over-ear playback devices.

The first earbud 2702 includes a first microphone 2720, such as a high signal-to-noise microphone positioned to capture the voice of a wearer of the first earbud 2702, an array of one or more other microphones configured to detect ambient sounds and spatially distributed to support beamforming, illustrated as microphones 2722A, 2722B, and 2722C, an "inner" microphone 2724 proximate to the wearer's ear canal (e.g., to assist with active noise cancelling), and a self-speech microphone 2726, such as a bone conduction microphone configured to convert sound vibrations of the wearer's ear bone or skull into an audio signal.

In a particular implementation, the first microphone 2720 corresponds to the microphone 102 and the microphones 2722A, 2722B, and 2722C correspond to multiple instances of the microphone 104, and audio signals generated by the microphones 2720 and 2722A, 2722B, and 2722C are provided to the directional audio signal processing unit 1990. The directional audio signal processing unit 1990 may function to generate the directional audio signal data 1992 based on the audio signals. In some implementations, the directional audio signal processing unit 1990 may further be configured to process audio signals from one or more other microphones of the first earbud 2702, such as the inner microphone 2724, the self-speech microphone 2726, or both.

The second earbud 2704 can be configured in a substantially similar manner as the first earbud 2702. In some implementations, the directional audio signal processing unit 1990 of the first earbud 2702 is also configured to receive one or more audio signals generated by one or more microphones of the second earbud 2704, such as via wireless transmission between the earbuds 2702, 2704, or via wired transmission in implementations in which the earbuds 2702, 2704 are coupled via a transmission line. In other implementations, the second earbud 2704 also includes a directional audio signal processing unit 1990, enabling techniques described herein to be performed by a user wearing a single one of either of the earbuds 2702, 2704.

In some implementations, the earbuds 2702, 2704 are configured to automatically switch between various operating modes, such as a passthrough mode in which ambient sound is played via a speaker 2730, a playback mode in which non-ambient sound (e.g., streaming audio corresponding to a phone conversation, media playback, video game, etc.) is played back through the speaker 2730, and an audio zoom mode or beamforming mode in which one or more ambient sounds are emphasized and/or other ambient sounds are suppressed for playback at the speaker 2730. In other implementations, the earbuds 2702, 2704 may support fewer modes or may support one or more other modes in place of, or in addition to, the described modes.

In an illustrative example, the earbuds 2702, 2704 can automatically transition from the playback mode to the passthrough mode in response to detecting the wearer's voice, and may automatically transition back to the playback mode after the wearer has ceased speaking. In some examples, the earbuds 2702, 2704 can operate in two or more of the modes concurrently, such as by performing audio zoom on a particular ambient sound (e.g., a dog barking) and playing out the audio zoomed sound superimposed on the sound being played out while the wearer is listening to music (which can be reduced in volume while the audio zoomed sound is being played). In this example, the wearer can be alerted to the ambient sound associated with the audio event without halting playback of the music.

FIG. 28 depicts an implementation 2800 in which disclosed techniques are implemented in a vehicle 2802, illustrated as a manned or unmanned aerial device (e.g., a package delivery drone). A directional audio signal processing unit 2850 is integrated into the vehicle 2802. The directional audio signal processing unit 2850 includes or corresponds to the directional audio signal processing unit 1990, and can further be configured for autonomously navigating the vehicle 2802. The directional audio signal processing unit 2850 can include, for example, the one or more processors 1416 of FIG. 14, and the vehicle 2802 can correspond to the vehicle 1410. The directional audio signal processing unit 2850 may generate and execute navigational instructions based on audio signals received from the first microphone 102 and the second microphone 104 of the vehicle 2802, such as for delivery instructions from an authorized user of the vehicle 2802.

FIG. 29 depicts another implementation 2900 in which the vehicle 1410 or the vehicle 1510 corresponds to a vehicle 2902, illustrated as a car. The vehicle 2902 includes a directional audio signal processing unit 2950. The directional audio signal processing unit 2950 includes or corresponds to the directional audio signal processing unit 1990 and can further be configured for autonomously navigating the vehicle 2902. The vehicle 2902 also includes the first microphone 102 and the second microphone 104. In some examples, one or more of the first microphone 102 and the second microphone 104 are positioned external to the vehicle 2902 to capture surrounding sounds, such as siren sounds and sounds of other vehicles. In some implementations, tasks can be performed based on audio signals received from external microphones (e.g., the first microphone 102 and the second microphone 104), such as detection of environment information and audio sound events, autonomous navigation of the vehicle 2902, etc.

In some examples, one or more of the first microphone 102 and the second microphone 104 are positioned internal to the vehicle 2902 to capture sounds within the vehicle, such as voice commands or sounds indicating a medical emergency. In some implementations, tasks can be performed based on audio signals received from internal microphones (e.g., the first microphone 102 and the second microphone 104), such as autonomous navigation of the vehicle 2902. One or more operations of the vehicle 2902 may be initiated based on one or more keywords (e.g., "unlock," "start engine," "play music," "display weather forecast," or another voice command) detected, such as by providing feedback or information via a display 2920 or one or more speakers (e.g., a speaker 2910).

Figure 30:
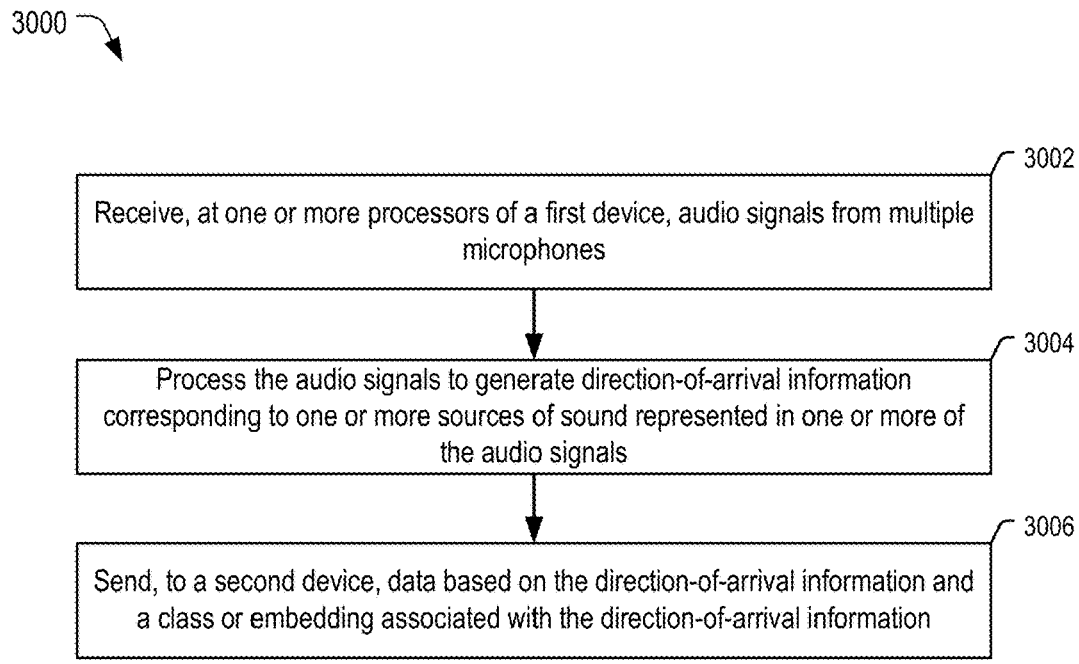
FIG. 30 is a diagram of a particular implementation of a method of processing audio, in accordance with some examples of the present disclosure.

Referring to FIG. 30, a particular implementation of a method 3000 of processing audio is shown. In a particular aspect, one or more operations of the method 3000 are performed by the device 110, the system 200, the headset 310, the headset 410, the system 500, the vehicle 1410, the vehicle 1510, or a combination thereof.

The method 3000 includes receiving, at one or more processors of a first device, audio signals from multiple microphones, at block 3002. For example, referring to FIG. 1, the processor 130 may receive audio frames 174, 176 of the audio signals 170, 172 from the microphones 102, 104, respectively.

The method 3000 also includes processing the audio signals to generate direction-of-arrival information corresponding to one or more sources of sound represented in one or more of the audio signals, at block 3004. For example, referring to FIG. 1, the direction-of-arrival processing unit 132 may process the audio frames 174, 176 to generate the direction-of-arrival information 142 corresponding to the source 180 of the sound 182 represented in the audio signals 170, 172.

The method 3000 also includes sending, to a second device, data based on the direction-of-arrival information and a class or embedding associated with the direction-of-arrival information, at block 3006. For example, the modem 118 may send the direction-of-arrival information 142 and one or both of the indication 616 or the indication 716 to the device 120. The class may correspond to a category for a particular sound represented in the audio signals and associated with a particular audio event, and the embedding may include a signature or information that corresponds to the particular sound or the particular audio event and may be configured to enable detection, via processing of other audio signals, of the particular sound or the particular audio event in the other audio signals. In some implementations, the method 3000 also includes sending a representation of the audio signals to the second device. For example, the representation of the audio signals can include one or more portions of the audio signals 170, 172, one or more portions of the beamformed audio signal 148, or a combination thereof. According to one implementation of the method 3000, sending the data to the device 120 may trigger activation of the one or more sensors 129.

In some implementations, the method 3000 includes processing signal data corresponding to the audio signals to determine the class or embedding. In an example, the method 3000 includes performing a beamforming operation (e.g., at the beamforming unit 138) on the audio signals to generate the signal data. In an example, the signal data is processed at one or more classifiers, such as the one or more classifiers 610, to determine the class from among multiple classes supported by the one or more classifiers, for a sound represented in one or more of the audio signals and associated with an audio event. The class is sent to the second device (e.g., the device 120), such as via the indication 616.

In some implementations, the signal data is processed at one or more encoders, such as the one or more encoders 710, to generate the embedding. The embedding corresponds to a sound represented in one or more of the audio signals and associated with an audio event. The embedding is sent to the second device (e.g., the device 120), such as via the indication 716.

In some implementations, the method 3000 includes receiving, at one or more processors of the second device, the data based on the direction-of-arrival information and the class. For example, the modem 128 of the device 120 may receive the data and provide the direction-of-arrival information 142 and the indication 616 to the one or more processors 126. The method 3000 may include obtaining, at the one or more processors of the second device, audio data representing a sound associated with the direction-of-arrival information and the class. For example, the one or more processors 126 obtain one or more of the audio signals 170, 172 from the first device, obtain one or more of the audio signals 190, 192 from local microphones (e.g., microphones 106, 108) obtain the beamformed audio signals 148 from the first device, or a combination thereof. The method 3000 may also include verifying the class, at the one or more processors of the second device, based on at least the audio data and the direction-of-arrival information, such as at the audio event processing unit 154 or as described with reference to the one or more classifiers 610.

In some implementations, the method 3000 includes receiving, at one or more processors of the second device, the data based on the direction-of-arrival information and the embedding. For example, the modem 128 of the device 120 may receive the data and provide the direction-of-arrival information 142 and the indication 716 to the one or more processors 126. The method 3000 may also include processing, at the one or more processors of the second device, audio data representing a sound scene based on the direction-of-arrival information and the embedding to generate modified audio data corresponding to an updated sound scene. For example, the one or more processors 126 can process the input mixture waveform 1102 representing the audio scene 1151 in conjunction with the one or more embeddings 1104 and the direction information 912 to generate the updated audio scene 1171.

The method 3000 enables performance of directional context aware processing based on audio signals generated by multiple microphones. As a result, context detection for various use cases and determination of characteristics associated with a surrounding environment are enabled.

Figure 31:
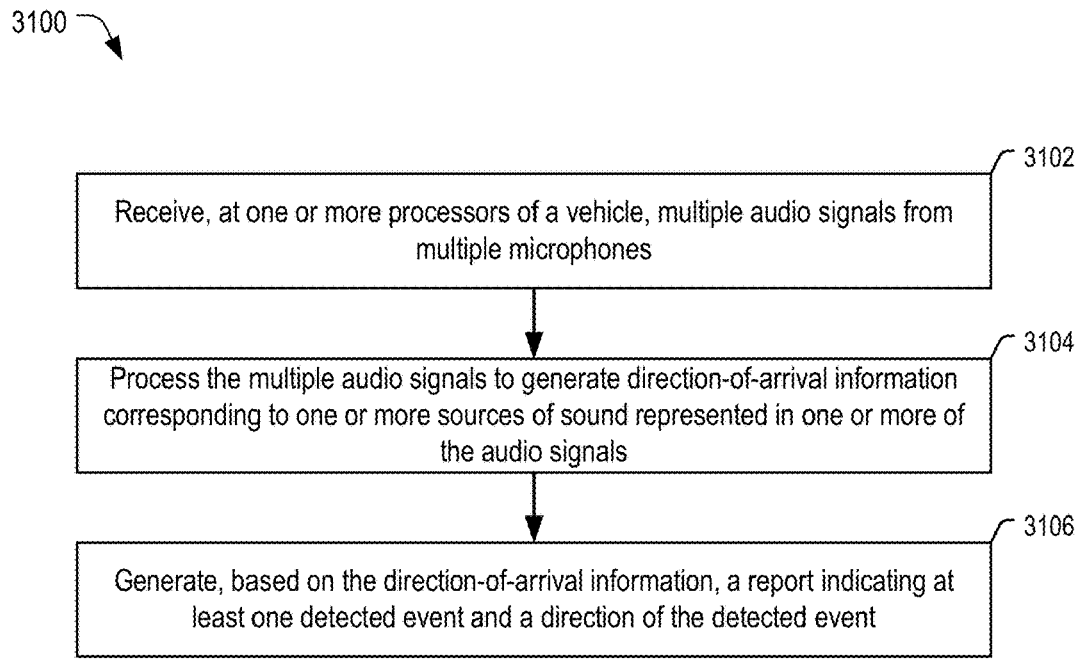
FIG. 31 is a diagram of another particular implementation of a method of processing audio, in accordance with some examples of the present disclosure.

Referring to FIG. 31, a particular implementation of a method 3100 of processing audio is shown. In a particular aspect, one or more operations of the method 3100 are performed by the vehicle 1410 of FIG. 14.

The method 3100 includes receiving, at one or more processors of a vehicle, multiple audio signals from multiple microphones, at block 3102. For example, referring to FIG. 14, the processor 1416 may receive audio frames 1474, 1476 of the audio signals 1470, 1472 from the microphones 1402, 1404, respectively.

The method 3100 also includes processing the multiple audio signals to generate direction-of-arrival information corresponding to one or more sources of sound represented in one or more of the audio signals, at block 3104. For example, referring to FIG. 14, the direction-of-arrival processing unit 1432 may process the audio frames 1474, 1476 to generate the direction-of-arrival information 1442 corresponding to the source 1480 of the sound 1482 represented in the audio signals 1470, 1472.

The method 3100 also includes generating, based on the direction-of-arrival information, a report indicating at least one detected event and a direction of the detected event, at block 3106. For example, referring to FIG. 14, the report generator 1436 may generate the report 1446 indicating at least one detected event (from the audio event information 1444) and a direction of the detected event (from the direction-of-arrival information 1442).

According to one implementation, the method 3100 may include sending the report to a second device (e.g., a second vehicle or a server) and receiving navigation instructions or a second report from the second device. Based on the second report, the processor can generate navigation instructions to autonomously navigate the vehicle. If the second device sends the navigation instructions, the processor can use the sent navigation instructions to autonomously navigate the vehicle.

The method 3100 enables the vehicle 1410 to detect external sounds, such as sirens, and navigate accordingly. It should be appreciated that using multiple microphones enables determining the location and relative distance to the siren sounds (e.g., the source 1480) and the location and relative distance can be displayed as the detected siren sounds are approaching or getting further away.

Figure 32:
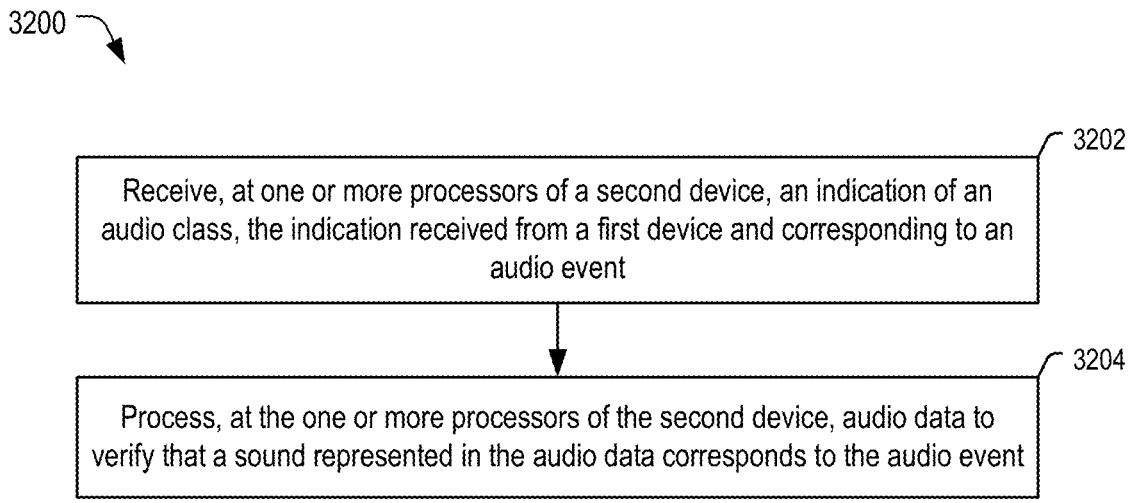
FIG. 32 is a diagram of another particular implementation of a method of processing audio, in accordance with some examples of the present disclosure.

Referring to FIG. 32, a particular implementation of a method 3200 of processing audio is shown. In a particular aspect, one or more operations of the method 3200 are performed by the device 120, such as at the one or more processors 126.

The method 3200 includes receiving, at one or more processors of a second device, an indication of an audio class, the indication received from a first device and corresponding to an audio event, at block 3202. For example, the one or more processors 126 of the device 120 of FIG. 9 receive the indication 902 (e.g., the indication 616) from the device 110 of FIG. 6.

The method 3200 includes processing, at the one or more processors of the second device, audio data to verify that a sound represented in the audio data corresponds to the audio event, at block 3204. For example, the one or more processors 126 of the device 120 of FIG. 2 process the audio data 904 to generate the classification 922 to verify that a sound represented in the audio data 904 corresponds to the audio event. In an example, the one or more processors 126 compare the classification 922 to the audio class indicated by the indication 902.

Optionally, the method 3200 includes receiving the audio data from the first device (e.g., the device 110), and the processing of the audio data optionally includes providing the audio data as an input to one or more classifiers to determine a classification associated with the audio data. For example, in some implementations the audio data 904 includes one or more portions of the audio signals 170, 172, one or more portions of the beamformed audio signal 148, or a combination thereof, and the audio data 904 is input to the one or more classifiers 920. In some implementations, the processing of the audio data further includes providing the indication of the audio class (e.g., the indication 902) as a second input to the one or more classifiers to determine the classification associated with the audio data.

Optionally, the method 3200 includes sending a control signal, such as the control signal 932, to the first device (e.g., the device 110) based on an output of the one or more classifiers. In some implementations, the control signal includes an audio zoom instruction. In some implementations, the control signal includes an instruction to perform spatial processing based on a direction of a source of the sound.

In some implementations, the audio class corresponds to a vehicle event, and the method 3200 optionally includes sending a notification of the vehicle event to one or more third devices based on a location of the first device and locations of the one or more third devices. For example, the notification 1492 is sent to the one or more devices 1490, as described with reference to FIG. 14 and FIG. 15.

Optionally, the method 3200 includes receiving, from the first device (e.g., the device 110), direction data corresponding to a source of a sound associated with the audio event, such as the direction data 912. The method 3200 can include updating, based on the audio event, a map of directional sound sources in an audio scene to generate an updated map, such as described with reference to the map updater 1612, and sending data corresponding to the updated map to one or more third devices that are geographically remote from the first device. For example the device 120 sends the data 1660 to one or more of the devices 1670, 1672, and 1674.

Optionally, the method 3200 includes selectively bypassing direction-of-arrival processing on received audio data corresponding to the audio event based on whether direction-of-arrival information is received from the first device (e.g., the device 110). For example, the one or more processors 126 can selectively bypass performing the direction-of-arrival processing illustrated at block 1332 of FIG. 13 based on a determination, at block 1330 of FIG. 13, that direction-of-arrival information is received in a transmission from the first device.

Optionally, the method 3200 includes selectively bypassing a beamforming operation based on whether received audio data corresponds to multi-channel microphone signals from the first device (e.g., the device 110) or corresponds to beamformed signals from the first device. For example, the one or more processors 126 can selectively bypass performing the beamforming operation illustrated at block 1342 of FIG. 13 based on a determination, at block 1340 of FIG. 13, that the transmission includes beamforming data, such as the beamformed audio signal 148.

By receiving an indication of an audio class corresponding to an audio event and processing audio data to verify that a sound represented in the audio data corresponds to the audio event, the method 3200 enables distributed audio event detection to be performed such that a first stage, such as at a headset, can identify audio events with relatively high sensitivity and relatively low accuracy (e.g., due to power, memory, or computational constraints) as compared to the second stage, such as at a mobile phone. The second stage can verify the audio events using higher-powered, more accurate audio event detection and can communicate detection results, control signals, etc., based on the detected audio events. As a result, accurate audio event detection can be provided to a user of a wearable electronic device, such as a headset, without requiring the wearable electronic device to support the computational load, memory footprint, and power consumption associated with full-power audio event detection.

Figure 33:
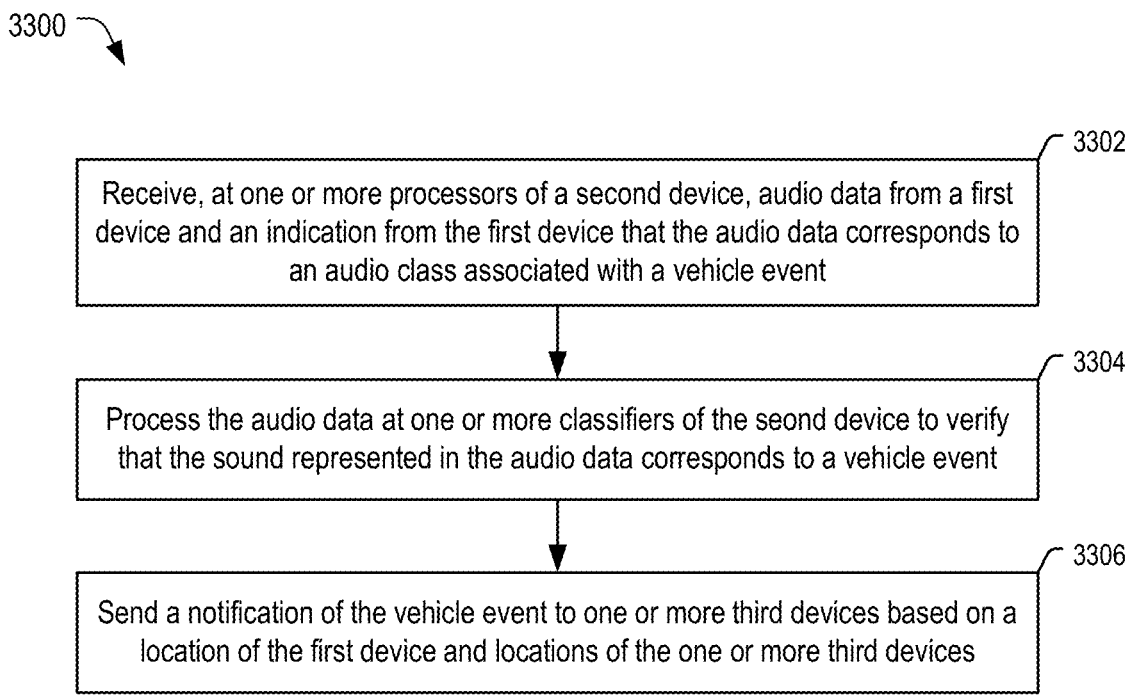
FIG. 33 is a diagram of another particular implementation of a method of processing audio, in accordance with some examples of the present disclosure.

Referring to FIG. 33, a particular implementation of a method 3300 of processing audio is shown. In a particular aspect, one or more operations of the method 3300 are performed by the device 120, such as at the one or more processors 126. In another particular aspect, one or more operations of the method 3300 are performed by the device 1520, such as at the one or more processors 1526.

The method 3300 includes receiving, at one or more processors of a second device, audio data from a first device and an indication from the first device that the audio data corresponds to an audio class associated with a vehicle event, at block 3302. For example, the device 1520 receives the audio data 1550 and the indication 1552 from the vehicle 1510.

The method 3300 includes processing the audio data at one or more classifiers of the second device (e.g., the device 1520) to verify that the sound represented in the audio data corresponds to a vehicle event, at block 3304. For example, the audio data 1550 is processed at the one or more classifiers 1530 to determine the classification 1522.

The method 3300 includes sending a notification of the vehicle event to one or more third devices based on a location of the first device (e.g., the vehicle 1510) and locations of the one or more third devices, at block 3306. For example, the device 1520 sends the notification 1592 to the one or more devices 1490 based on a location of the vehicle 1510 and the locations of the one or more device 1490.

Figure 34:
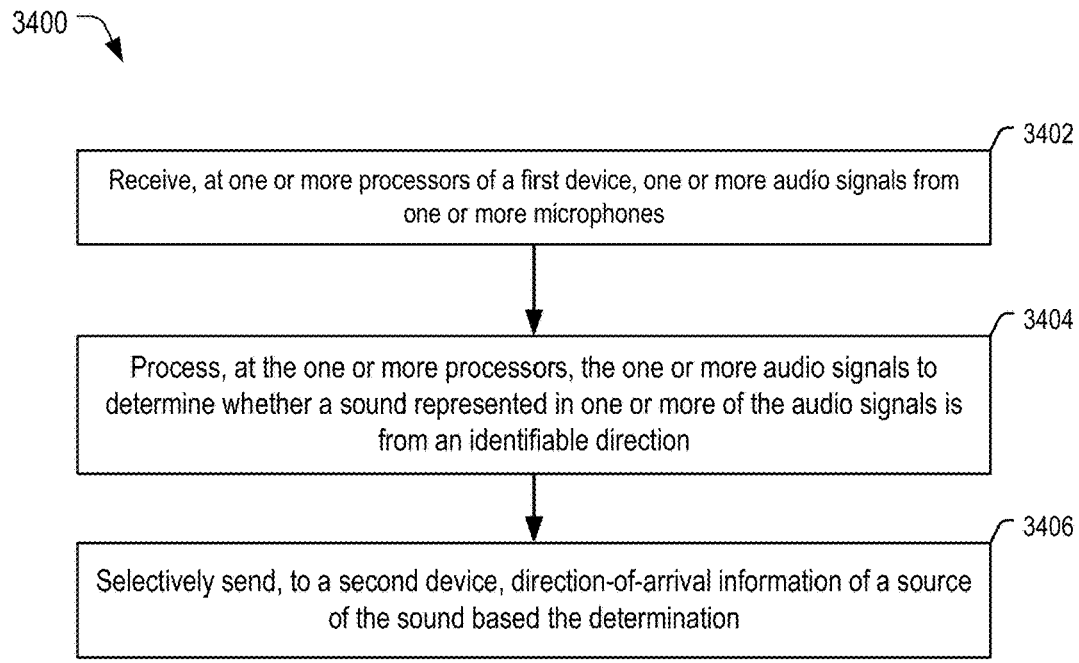
FIG. 34 is a diagram of another particular implementation of a method of processing audio, in accordance with some examples of the present disclosure.

Referring to FIG. 34, a particular implementation of a method 3400 of processing audio is shown. In a particular aspect, one or more operations of the method 3400 are performed by the device 110, such as at the one or more processors 116.

The method 3400 includes receiving, at one or more processors of a first device, one or more audio signals from one or more microphones, at block 3402. For example, the device 110 receives the audio signals 170, 172 from the microphones 102, 104, respectively.

The method 3400 includes processing, at the one or more processors, the one or more audio signals to determine whether a sound represented in one or more of the audio signals is from an identifiable direction, at block 3404. For example, the device 110 determines, at block 1212 of FIG. 12, whether the processing of the audio signals at block 1202 of FIG. 12 generated valid direction-of-arrival information regarding a source of an audio event.

The method 3400 includes selectively sending, to a second device, direction-of-arrival information of a source of the sound based on the determination, at block 3406. For example, the device 110 selects whether to send direction-of-arrival information to a second device based on the determination of whether valid direction-of-arrival information is available, such as described in conjunction with block 1212 and block 1214 of FIG. 12.

By selectively sending direction-of-arrival information based on whether a sound represented in one or more of the audio signals is from an identifiable direction, the method 3400 can conserve power consumption and transmission resources that would otherwise be consumed by transmitting invalid or unreliable direction-of-arrival information to the second device.

Figure 35:
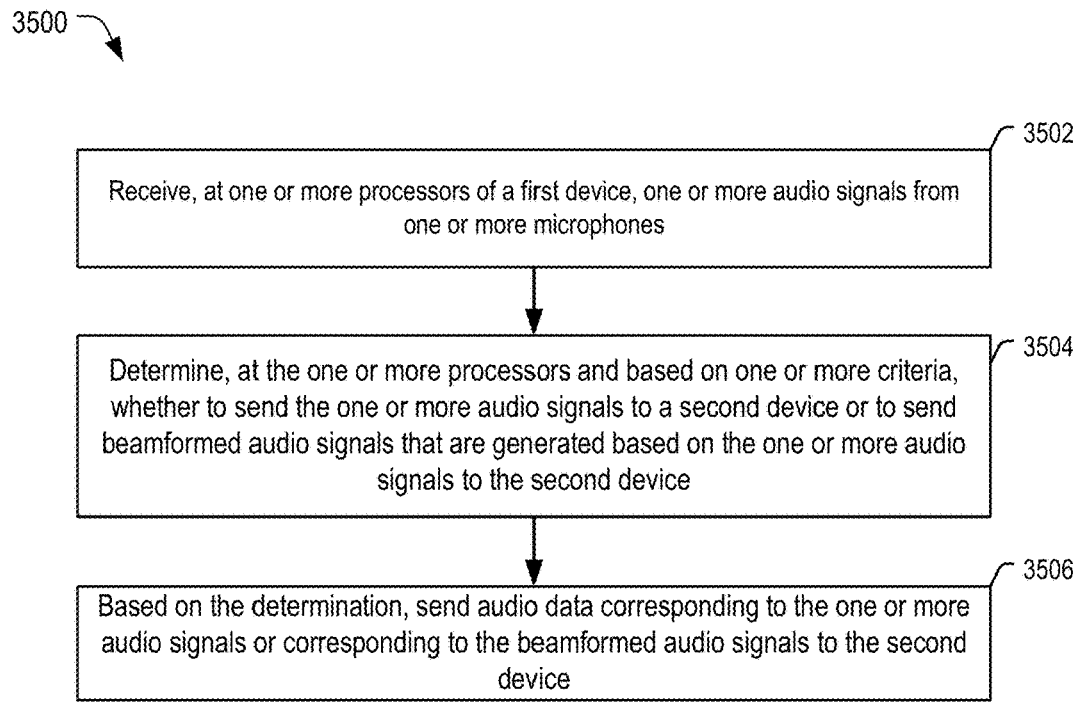
FIG. 35 is a diagram of another particular implementation of a method of processing audio, in accordance with some examples of the present disclosure.

Referring to FIG. 35, a particular implementation of a method 3500 of processing audio is shown. In a particular aspect, one or more operations of the method 3500 are performed by the device 110, such as at the one or more processors 116.

The method 3500 includes receiving, at one or more processors of a first device, one or more audio signals from one or more microphones, at block 3502. For example, the device 110 receives the audio signals 170, 172 from the microphones 102, 104, respectively.

The method 3500 includes determining, at the one or more processors and based on one or more criteria, whether to send the one or more audio signals to a second device or to send beamformed audio signals that are generated based on the one or more audio signals to the second device, at block 3504. For example, if the beamformed audio signals are available at the device 110, the device 110 can determine, based on criteria such as an amount of available power and bandwidth resources, whether to send the one or more audio signals or whether to send the beamformed audio signal, as described with reference to block 1220 of FIG. 12. In an illustrative, non-limiting example in which no microphones are available at the second device, if available power or bandwidth for transmission to the second device exceeds a threshold, as described in conjunction with block 1232 of FIG. 12, a determination is made to send the audio signals (e.g., via the "No" path from block 1232); otherwise, a determination is made to send the beamformed signals (e.g., via the "Yes" path from block 1232, the "No" path from block 1234, and the "Yes" path from block 1238).

The method 3500 includes, based on the determination, sending audio data corresponding to the one or more audio signals or corresponding to the beamformed audio signals to the second device, at block 3506. Continuing the above example, the device 110 can either send the audio signals to the device 120, at block 1248 of FIG. 12, or send the beamformed signals to the device 120, at block 1244 of FIG. 12.

By selecting whether to send the audio signals or the beamformed signals based on one or more criteria such as power availability or transmission resources, the method 3400 enables a sending device to make a situationally appropriate determination as to whether to provide full audio resolution to a receiving device (e.g., by transmitting data corresponding to a full set of microphone channels that include a sound of interest) or whether to provide more finely targeted audio (e.g., by transmitting data corresponding to a single beamformed channel aimed at the source of the sound of interest).

Figure 36:
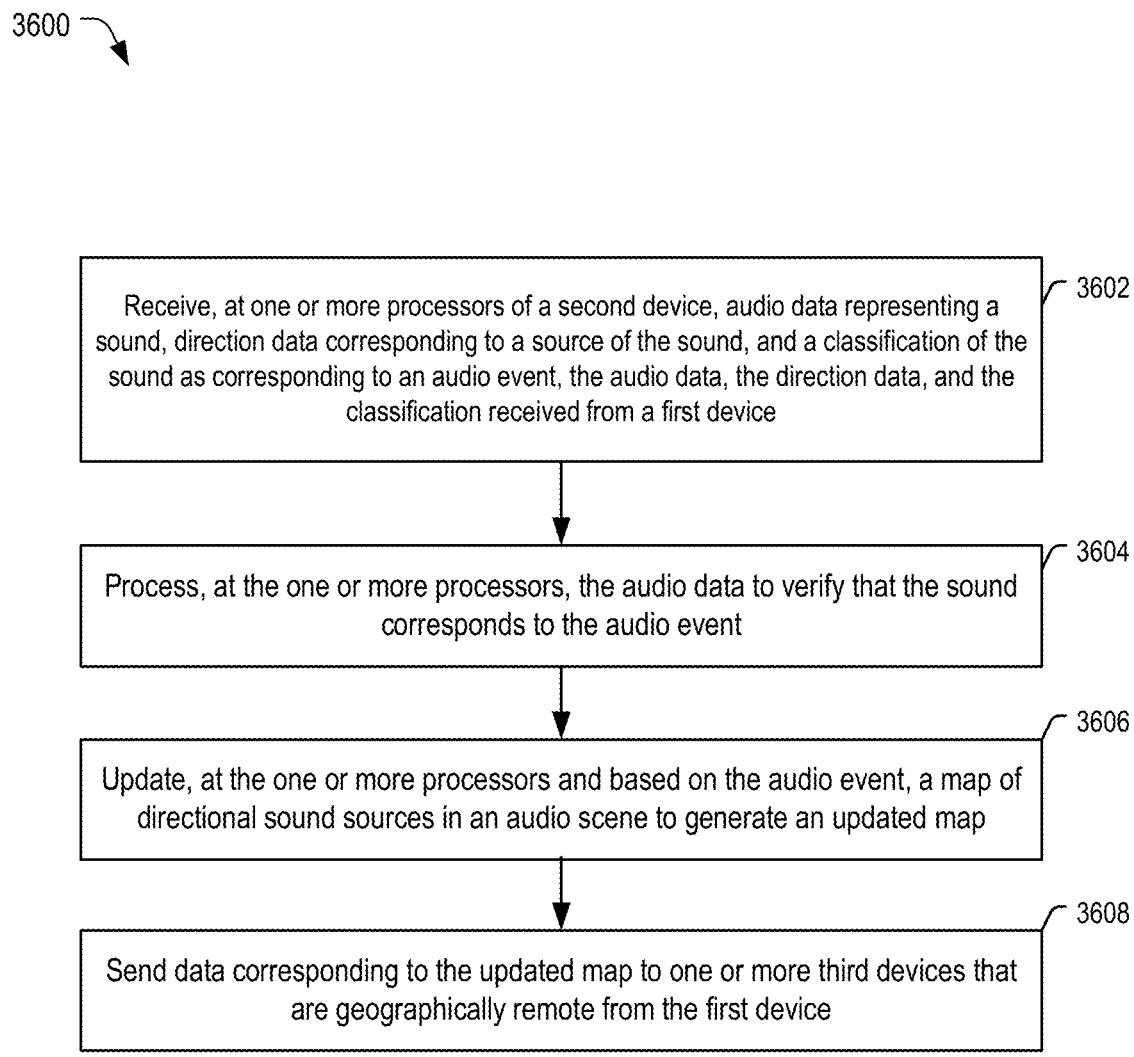
FIG. 36 is a diagram of another particular implementation of a method of processing audio, in accordance with some examples of the present disclosure.

Referring to FIG. 36, a particular implementation of a method 3600 of processing audio is shown. In a particular aspect, one or more operations of the method 3600 are performed by the device 120, such as at the one or more processors 126.

The method 3600 includes receiving, at one or more processors of a second device, audio data representing a sound, direction data corresponding to a source of the sound, and a classification of the sound as corresponding to an audio event, where the audio data, the direction data, and the classification are received from a first device, at block 3602. For example, the one or more processors 126 of the device 120 can receive, from the device 110, the audio data 904 of FIG. 9 or FIG. 10, the indication 1602, and the direction data 1604 of FIG. 16.

The method 3600 includes processing, at the one or more processors, the audio data to verify that the sound corresponds to the audio event, at block 3604. For example, the audio event processing unit 154 processes the audio data to verify the audio class indicated by the indication 1602.

The method 3600 includes updating, at the one or more processors and based on the audio event, a map of directional sound sources in an audio scene to generate an updated map, at block 3606. For example, the map updater 1612 updates the map 1614 to generate the updated map 1616.

The method 3600 includes sending data corresponding to the updated map to one or more third devices that are geographically remote from the first device, at block 3608. For example, the updated map data 1660 is sent to the devices 1670, 1672, and 1674 that are geographically remote from the device 110.

By updating the map of directional sound sources in an audio scene and sending updated map data to geographically remote devices, the method 3600 enables applications such as a virtual environment where multiple participants are immersed in a shared sound scene, such as described with reference to FIG. 18.

The methods of FIG. 12, FIG. 13, and FIGS. 30-36 may be implemented by a field-programmable gate array (FPGA) device, an application-specific integrated circuit (ASIC), a processing unit such as a central processing unit (CPU), a digital signal processing unit (DSP), a controller, another hardware device, firmware device, or any combination thereof. As an example, the methods of FIG. 12, FIG. 13, and FIGS. 30-36 may be performed by a processor that executes instructions, such as described with reference to FIG. 37.

Figure 37:
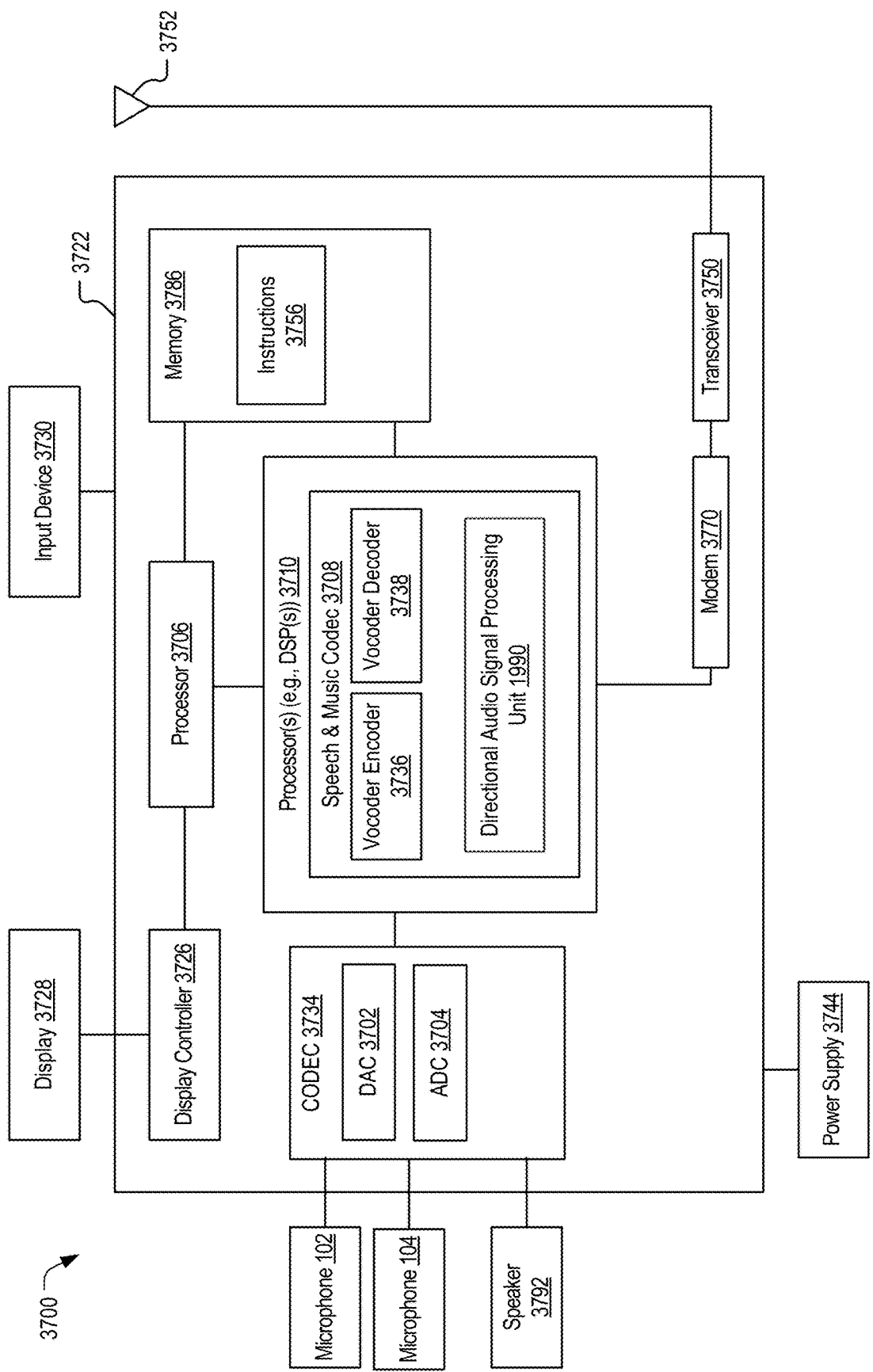
FIG. 37 is a block diagram of a particular illustrative example of a device that is operable to perform directional processing on one or more audio signals received from one or more microphones, in accordance with some examples of the present disclosure.

Referring to FIG. 37, a block diagram of a particular illustrative implementation of a device is depicted and generally designated 3700. In various implementations, the device 3700 may have more or fewer components than illustrated in FIG. 37. In an illustrative implementation, the device 3700 may correspond to the device 110, the device 120, the vehicle 1410, the device 1420, the vehicle 1510, or the device 1520. In an illustrative implementation, the device 3700 may perform one or more operations described with reference to FIGS. 1-36.

In a particular implementation, the device 3700 includes a processor 3706 (e.g., a CPU). The device 3700 may include one or more additional processors 3710 (e.g., one or more DSPs). In a particular aspect, the processor(s) 116, 126 of FIG. 1 or the processor(s) 1416 of FIG. 14 corresponds to the processor 3706, the processors 3710, or a combination thereof. The processors 3710 may include a speech and music coder-decoder (CODEC) 3708 that includes a voice coder ("vocoder") encoder 3736, a vocoder decoder 3738, the directional audio signal processing unit 1990, or a combination thereof.

The device 3700 may include a memory 3786 and a CODEC 3734. The memory 3786 may include instructions 3756, that are executable by the one or more additional processors 3710 (or the processor 3706) to implement the functionality described with reference to the directional audio signal processing unit 1990. In a particular aspect, the memory 3786 corresponds to the memory 114, the memory 124 of FIG. 1, the memory 1414 of FIG. 14, or a combination thereof. In a particular aspect, the instructions 3756 include the instructions 115, the instructions 125 of FIG. 1, the instructions 1415 of FIG. 14, or a combination thereof. The device 3700 may include a modem 3770 coupled, via a transceiver 3750, to an antenna 3752. The modem 3770 may be configured to transmit a signal to a second device (not shown). According to a particular implementation, the modem 3770 may correspond to the modem 128 of FIG. 1.

The device 3700 may include a display 3728 coupled to a display controller 3726. A speaker 3792, the first microphone 102, and the second microphone 104 may be coupled to the CODEC 3734. The CODEC 3734 may include a digital-to-analog converter (DAC) 3702, an analog-to-digital converter (ADC) 3704, or both. In a particular implementation, the CODEC 3734 may receive analog signals from the first microphone 102 and the second microphone 104, convert the analog signals to digital signals using the analog-to-digital converter 3704, and provide the digital signals to the speech and music codec 3708. The speech and music codec 3708 may process the digital signals, and the digital signals may further be processed by the directional audio signal processing unit 1990. In a particular implementation, the speech and music codec 3708 may provide digital signals to the CODEC 3734. The CODEC 3734 may convert the digital signals to analog signals using the digital-to-analog converter 3702 and may provide the analog signals to the speaker 3792.

In a particular implementation, the device 3700 may be included in a system-in-package or system-on-chip device 3722. In a particular implementation, the memory 3786, the processor 3706, the processors 3710, the display controller 3726, the CODEC 3734, and the modem 3770 are included in a system-in-package or system-on-chip device 3722. In a particular implementation, an input device 3730 and a power supply 3744 are coupled to the system-on-chip device 3722.

Moreover, in a particular implementation, as illustrated in FIG. 37, the display 3728, the input device 3730, the speaker 3792, the first microphone 102, the second microphone 104, the antenna 3752, and the power supply 3744 are external to the system-on-chip device 3722. In a particular implementation, each of the display 3728, the input device 3730, the speaker 3792, the first microphone 102, the second microphone 104, the antenna 3752, and the power supply 3744 may be coupled to a component of the system-on-chip device 3722, such as an interface (e.g., the input interface 121 or the input interface 122) or a controller.

The device 3700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described implementations, an apparatus includes means for receiving audio signals from multiple microphones. For example, the means for receiving the audio signals can correspond to the input interface 112, the input interface 111, the processor 116 or the components thereof, the input interface 121, the input interface 122, the processor 126 or the components thereof, the first processing domain 210 or the components thereof, the second processing domain 220 or the components thereof, the headset 310 or the components thereof, the headset 410 or the components thereof, the spatial filter processing unit 502, the audio input 1904, the one or more processors 1916, the directional audio signal processing unit 1990, the one or more processors 3710, one or more other circuits or components configured to receive audio signals from multiple microphones, or any combination thereof.

The apparatus also includes means for processing the audio signals to generate direction-of-arrival information corresponding to one or more sources of sound represented in one or more of the audio signals. For example, the means for processing can correspond to the processor(s) 116 or the components thereof, the processor(s) 126 or the components thereof, the first processing domain 210 or the components thereof, the second processing domain 220 or the components thereof, the headset 310 or the components thereof, the headset 410 or the components thereof, the spatial filter processing unit 502, the audio event processing unit 504, the directional audio signal processing unit 1990, the one or more processors 1916, the one or more processors 3710, one or more other circuits or components configured to process the audio signals, or any combination thereof.

The apparatus further includes means for sending, to a second device, data based on the direction-of-arrival information and a class or embedding associated with the direction-of-arrival information. For example, the means for sending can correspond to the modem 118, the modem 128, the signal output 1906, the directional audio signal processing unit 1990, the one or more processors 1916, the modem 3770, the transceiver 3750, the antenna 3752, one or more other circuits or components configured to send the data and the class or embedding, or any combination thereof.

In conjunction with the described implementations, an apparatus includes means for receiving multiple audio signals from multiple microphones. For example, the means for receiving the multiple audio signals can correspond to the input interface 1412, the input interface 1411, the one or more processors 1416 or the components thereof, the directional audio signal processing unit 2850, the directional audio signal processing unit 2950, the one or more processors 3710, one or more other circuits or components configured to receive multiple audio signals from multiple microphones, or any combination thereof.

The apparatus also includes means for processing the multiple audio signals to generate direction-of-arrival information corresponding to one or more sources of sound represented in one or more of the audio signals. For example, the means for processing includes the one or more processors 1416 or the components thereof, the directional audio signal processing unit 2850, the directional audio signal processing unit 2950, the one or more processors 3710, one or more other circuits or components configured to process the multiple audio signals, or any combination thereof.

The apparatus also includes means for generating, based on the direction-of-arrival information, a report indicating at least one detected event and a direction of the detected event. For example, the means for generating includes the one or more processors 1416 or the components thereof, the directional audio signal processing unit 2850, the directional audio signal processing unit 2950, the one or more processors 3710, one or more other circuits or components configured to generate the report, or any combination thereof.

In conjunction with the described implementations, an apparatus includes means for receiving an indication of an audio class, the indication received from a remote device and corresponding to an audio event. For example, the means for receiving the indication can correspond to the modem 128, the one or more processors 126, the one or more processors 1516, the audio input 1904, the one or more processors 1916, the antenna 3752, the transceiver 3750, the modem 3770, the processor 3706, the one or more processors 3710, one or more other circuits or components configured to receive the indication, or any combination thereof.

The apparatus also includes means for processing audio data to verify that a sound represented in the audio data corresponds to the audio event. For example, the means for processing the audio data can correspond to the one or more processors 126, the one or more processors 1516, the one or more processors 1916, the processor 3706, the one or more processors 3710, one or more other circuits or components configured to process the audio data to verify that a sound represented in the audio data corresponds to the audio event, or any combination thereof.

In some implementations, a non-transitory computer-readable medium (e.g., a computer-readable storage device, such as the memory 114 or the memory 3786) includes instructions (e.g., the instructions 115 or the instructions 3756) that, when executed by one or more processors (e.g., the one or more processors 116, the one or more processors 3710 or the processor 3706), cause the one or more processors to receive audio signals (e.g., the audio signals 170, 172) from multiple microphones (e.g., the microphones 102, 104). The instructions, when executed by the one or more processors, also cause the one or more processors to process the audio signals to generate direction-of-arrival information (e.g., the direction-of-arrival information 142) corresponding to one or more sources (e.g., the one or more sources 180) of sound (e.g., the sound 182) in one or more of the audio signals. The instructions, when executed by the one or more processors, further cause the one or more processors to send, to a second device (e.g., the device 120), data based on the direction-of-arrival information and a class or embedding associated with the direction-of-arrival information.

In some implementations, a non-transitory computer-readable medium (e.g., a computer-readable storage device, such as the memory 3786) includes instructions (e.g., the instructions 3756) that, when executed by one or more processors (e.g., the one or more processors 3710 or the processor 3706) of a vehicle (e.g., the vehicle 1410), cause the one or more processors to receive multiple audio signals (e.g., the audio signals 1470, 1472) from multiple microphones (e.g., the microphones 1402, 1404). The instructions, when executed by the one or more processors, also cause the one or more processors to process the multiple audio signals to generate direction-of-arrival information (e.g., the direction-of-arrival information 1442) corresponding to one or more sources (e.g., the one or more sources 1480) of sound (e.g., the sound 1482) in one or more of the audio signals. The instructions, when executed by the one or more processors, further cause the one or more processors to generate, based on the direction-of-arrival information, a report (e.g., the report 1446) indicating at least one detected event and a direction of the detected event.

In some implementations, a non-transitory computer-readable medium (e.g., a computer-readable storage device, such as the memory 124, the memory 1514, or the memory 3786) includes instructions (e.g., the instructions 125, the instructions 1515, or the instructions 3756) that, when executed by one or more processors (e.g., the one or more processors 126, the one or more processors 1516, the one or more processors 3710 or the processor 3706), cause the one or more processors to receive, from a first device, an indication of an audio class corresponding to an audio event (e.g., the indication 902, the indication 1552, or the indication 1602).

This disclosure includes the following first set of examples.

Example 1 includes a first device comprising: a memory configured to store instructions; and one or more processors configured to: receive multiple audio signals from multiple microphones; process the multiple audio signals to generate direction-of-arrival information corresponding to one or more sources of sound represented in one or more of the audio signals; and send, to a second device, data based on the direction-of-arrival information.

Example 2 includes the first device of example 1, wherein the memory and the one or more processors are integrated into a headset device and wherein the second device corresponds to a mobile phone.

Example 3 includes the first device of example 1, wherein the memory and the one or more processors are integrated into a mobile phone and wherein the second device corresponds to a headset device.

Example 4 includes the first device of any of examples 1 to 3, wherein the data sent to the second device triggers activation of one or more sensors at the second device.

Example 5 includes the first device of any of examples 1 to 4, wherein at least one of the one or more sensors comprises a non-audio sensor.

Example 6 includes the first device of any of examples 1 to 5, wherein the non-audio sensor comprises a 360-degree camera.

Example 7 includes the first device of any of examples 1 to 6, wherein the non-audio sensor comprises a lidar sensor.

Example 8 includes the first device of any of examples 1 to 7, wherein the one or more processors comprise a first processing domain operating in a low-power state.

Example 9 includes the first device of any of examples 1 to 8, wherein the one or more processors further comprise a second processing domain operating in a high-power state, the second power domain configured to process the multiple audio signals to generate the direction-of-arrival information.

Example 10 includes the first device of any of examples 1 to 9, wherein the one or more processors are further configured to: process the multiple audio signals to perform audio event detection; and send, to the second device, data corresponding to a detected audio event.

Example 11 includes the first device of any of examples 1 to 9, wherein the one or more processors are further configured to: generate event data corresponding to a detected audio event based on an audio event detection operation; and send the event data to the second device.

Example 12 includes the first device of any of examples 1 to 11, wherein the one or more processors are further configured to: process the multiple audio signals to perform acoustic environment detection; and send, to the second device, data corresponding to a detected environment.

Example 13 includes the first device of any of examples 1 to 11, wherein the one or more processors are further configured to generate environment data corresponding to a detected environment based on an acoustic environment detection operation.

Example 14 includes the first device of any of examples 1 to 13, wherein the one or more processors are further configured to: perform spatial processing on the multiple audio signals based on the direction-of-arrival information to generate beamformed audio signals; and send the beamformed audio signals to the second device.

Example 15 includes the first device of any of examples 1 to 14, wherein the one or more processors are further configured to adjust a focus of at least one microphone of the multiple microphones based on the direction-of-arrival information.

Example 16 includes the first device of any of examples 1 to 15, further comprising a modem, wherein the data is sent to the second device via the modem.

Example 17 includes the first device of any of examples 1 to 16, wherein the one or more processors are further configured to send a representation of the multiple audio signals to the second device.

Example 18 includes the first device of example 17, wherein the representation of the multiple audio signals corresponds to one or more beamformed audio signals.

Example 19 includes the first device of any of examples 1 to 18, wherein the one or more processors are further configured to generate a user interface output indicative of at least one of an environmental event or an acoustic event.

Example 20 includes the first device of any of examples 1 to 19, wherein the one or more processors are further configured to receive, from the second device, data indicative of an acoustic event.

Example 21 includes the first device of any of examples 1 to 20, wherein the one or more processors are further configured to receive, from the second device, data indicative of an environmental event.

Example 22 includes the first device of any of examples 1 to 21, wherein the one or more processors are further configured to receive, from the second device, data indicative of a beamformed audio signal.

Example 23 includes the first device of any of examples 1 to 22, wherein the one or more processors are further configured to: receive, from the second device, directional information associated with the multiple audio signals; and perform an audio zoom operation based on the directional information.

Example 24 includes the first device of any of examples 1 to 23, wherein the one or more processors are further configured to: receive, from the second device, directional information associated with the multiple audio signals; and perform a noise cancellation operation based on the directional information.

Example 25 includes the first device of any of examples 1 to 24, further comprising the multiple microphones.

Example 26 includes the first device of any of examples 1 to 25, further comprising at least one speaker configured to output a sound associated with at least one audio signal of the multiple audio signals.

Example 37 includes a device comprising: a memory configured to store instructions; and a processor configured to execute the instructions to perform the method of any of Examples 29 to 36.

Example 38 includes a device comprising a non-transitory computer-readable medium comprising instructions that, when executed by one or more processors of a first device, cause the one or more processors to perform the method of any of Examples 29 to 36.

Example 39 includes an apparatus comprising means for carrying out the method of any of Examples 29 to 36.

Example 30 includes the method of example 29, further comprising: processing the multiple audio signals to perform audio event detection; and sending, to the second device, data corresponding to a detected audio event.

Example 31 includes the method of example 30, wherein the audio event detection includes processing one or more of the multiple audio signals at one or more classifiers to determine a class, from among multiple classes supported by the one or more classifiers, for a sound represented in one or more of the audio signals, wherein the data corresponding to the detected audio event includes an indication of the class.

Example 32 includes the method of any of examples 29 to 31, further comprising: processing the multiple audio signals to perform acoustic environment detection; and sending, to the second device, data corresponding to a detected environment.

Example 33 includes the method of any of examples 29 to 32, wherein the data is sent to the second device via a modem.

Example 34 includes the method of any of examples 29 to 33, further comprising sending a representation of the multiple audio signals to the second device.

Example 35 includes the method of any of examples 29 to 34, wherein the data based on the direction-of-arrival information sent to the second device triggers activation of one or more sensors at the second device.

Example 36 includes the method of any of examples 29 to 35, wherein at least one of the one or more sensors comprises a non-audio sensor.

Example 37 includes a device comprising: a memory configured to store instructions; and a processor configured to execute the instructions to perform the method of any of claim 29 to 36.

Example 38 includes a device comprising a non-transitory computer-readable medium comprising instructions that, when executed by one or more processors of a first device, cause the one or more processors to perform the method of any of claim 29 to 36.

Example 39 includes an apparatus comprising means for carrying out the method of any of claim 29 to 36.

Example 40 includes a non-transitory computer-readable medium comprising instructions that, when executed by one or more processors of a first device, cause the one or more processors to: receive multiple audio signals from multiple microphones; process the multiple audio signals to generate direction-of-arrival information corresponding to one or more sources of sound represented in one or more of the audio signals; and send, to a second device, data based on the direction-of-arrival information.

Example 41 includes the non-transitory computer-readable medium of example 40, wherein the data sent to the second device triggers activation of one or more sensors at the second device.

Example 42 includes the non-transitory computer-readable medium of example 41 or 42, wherein at least one of the one or more sensors comprises a non-audio sensor.

Example 43 includes the non-transitory computer-readable medium of any of example 40 to 42, wherein the instructions are executable to further cause the one or more processors to send a representation of the multiple audio signals to the second device.

Example 44 includes the non-transitory computer-readable medium of example 43, wherein the representation of the multiple audio signals corresponds to one or more beamformed audio signals.

Example 45 includes a first device comprising: means for receiving multiple audio signals from multiple microphones; means for processing the multiple audio signals to generate direction-of-arrival information corresponding to one or more sources of sound represented in one or more of the audio signals; and means for sending, to a second device, data based on the direction-of-arrival information.

Example 46 includes a vehicle comprising: a memory configured to store instructions; and one or more processors configured to execute the instructions to: receive multiple audio signals from multiple microphones; process the multiple audio signals to generate direction-of-arrival information corresponding to one or more sources of sound represented in one or more of the audio signals; and generate, based on the direction-of-arrival information, a report indicating at least one detected event and a direction of the detected event.

Example 47 includes the vehicle of example 46, wherein the one or more processors are further configured to send the report to a second device.

Example 48 includes the vehicle of any of examples 46 to 47, wherein the second device comprises a second vehicle.

Example 49 includes the vehicle of any of examples 46 to 48, wherein the second device comprises a server.

Example 50 includes the vehicle of any of examples 46 to 49, wherein the one or more processors are further configured to: receive navigation instructions from the second device; and navigate based on the navigation instructions.

Example 51 includes the vehicle of any of examples 46 to 50, wherein the one or more processors are further configured to: receive a second report from the second device; and navigate based on the report and the second report.

Example 52 includes the vehicle of any of examples 46 to 51, wherein the one or more processors are further configured to: receive a second report from the second device; generate navigation instructions based on the second report; and send the navigation instructions to the second device.

Example 53 includes the vehicle of any of examples 46 to 52, wherein the report indicates a list of detected events and directional information of the detected events over a time period.

Example 54 includes a method of processing audio, the method comprising: receiving, at one or more processors of a vehicle, multiple audio signals from multiple microphones; processing the multiple audio signals to generate direction-of-arrival information corresponding to one or more sources of sound represented in one or more of the audio signals; and generating, based on the direction-of-arrival information, a report indicating at least one detected event and a direction of the detected event.

Example 55 includes the method of example 54, further comprising sending the report to a second device.

Example 56 includes the method of any of examples 54 to 55, wherein the second device comprises a second vehicle.

Example 57 includes the method of any of examples 54 to 56, wherein the second device comprises a server.

Example 58 includes the method of any of examples 54 to 57, further comprising: receiving navigation instructions from the second device; and navigating based on the navigation instructions.

Example 59 includes the method of any of examples 54 to 58, further comprising: receiving a second report from the second device; and navigating based on the report and the second report.

Example 60 includes the method of any of examples 54 to 59, further comprising: receiving a second report from the second device; generating navigation instructions based on the second report; and sending the navigation instructions to the second device.

Example 61 includes the method of any of examples 54 to 60, wherein the report indicates a list of detected events and directional information of the detected events over a time period.

Example 62 includes a non-transitory computer-readable medium comprising instructions that, when executed by one or more processors of a vehicle, cause the one or more processors to: receive multiple audio signals from the multiple microphones; process the multiple audio signals to generate direction-of-arrival information corresponding to one or more sources of sound represented in one or more of the audio signals; and generate, based on the direction-of-arrival information, a report indicating at least one detected event and a direction of the detected event.

Example 63 includes the non-transitory computer-readable medium of example 62, wherein the instructions, when executed by the one or more processors, further cause the one or more processors to send the report to a second device.

Example 64 includes the non-transitory computer-readable medium of any of examples 62 to 63, wherein the second device comprises a second vehicle.

Example 65 includes the non-transitory computer-readable medium of any of examples 62 to 64, wherein the second device comprises a server.

Example 66 includes the non-transitory computer-readable medium of any of examples 62 to 65, wherein the instructions, when executed by the one or more processors, further cause the one or more processors to: receive navigation instructions from the second device; and navigate based on the navigation instructions.

Example 67 includes the non-transitory computer-readable medium of any of examples 62 to 66, wherein the instructions, when executed by the one or more processors, further cause the one or more processors to: receive a second report from the second device; and navigate based on the report and the second report.

Example 68 includes the non-transitory computer-readable medium of any of examples 62 to 67, wherein the instructions, when executed by the one or more processors, further cause the one or more processors to: receive a second report from the second device; generate navigation instructions based on the second report; and send the navigation instructions to the second device.

Example 69 includes the non-transitory computer-readable medium of any of examples 62 to 68, wherein the report indicates a list of detected events and directional information of the detected events over a time period.

Example 70 includes a vehicle comprising: means for receiving multiple audio signals from multiple microphones; means for processing the multiple audio signals to generate direction-of-arrival information corresponding to one or more sources of sound represented in one or more of the audio signals; and means for generating, based on the direction-of-arrival information, a report indicating at least one detected event and a direction of the detected event.

Example 71 includes the vehicle of example 70, further comprising means for sending the report to a second device.

Example 72 includes the vehicle of any of examples 70 to 71, wherein the second device comprises a second vehicle.

Example 73 includes the vehicle of any of examples 70 to 72, wherein the second device comprises a server.

Example 74 includes the vehicle of any of examples 70 to 73, wherein the report indicates a list of detected events and directional information of the detected events over a time period.

Example 75 includes the vehicle of any of examples 70 to 74, further comprising means to perform autonomous navigation based on the report.

This disclosure includes the following second set of examples.

According to Example 1, a first device includes: a memory configured to store instructions; and one or more processors configured to: receive audio signals from multiple microphones; process the audio signals to generate direction-of-arrival information corresponding to one or more sources of sound represented in one or more of the audio signals; and send, to a second device, data based on the direction-of-arrival information and a class or embedding associated with the direction-of-arrival information.

Example 2 includes the first device of Example 1, wherein the one or more processors are further configured to process signal data corresponding to the audio signals to determine the class or embedding.

Example 3 includes the first device of Example 2, wherein the one or more processors are further configured to perform a beamforming operation on the audio signals to generate the signal data.

Example 4 includes the first device of Example 2 or Example 3, wherein the one or more processors are further configured to process the signal data at one or more classifiers to determine the class from among multiple classes supported by the one or more classifiers, for a sound represented in one or more of the audio signals and associated with an audio event, and wherein the class is sent to the second device.

Example 5 includes the first device of any of Examples 2 to 4, wherein the one or more processors are further configured to process the signal data at one or more encoders to generate the embedding, the embedding corresponding to a sound represented in one or more of the audio signals and associated with an audio event, and wherein the embedding is sent to the second device.

Example 6 includes the first device of any of Examples 1 to 5, wherein one or more processors are further configured to process image data at one or more encoders to generate the embedding, the embedding corresponding to an object represented in the image data and associated with an audio event, and wherein the embedding is sent to the second device.

Example 7 includes the first device of Example 6, further including one or more cameras configured to generate the image data.

Example 8 includes the first device of any of Examples 1 to 7, wherein the one or more processors are further configured to generate environment data corresponding to a detected environment based on an acoustic environment detection operation.

Example 9 includes the first device of any of Examples 1 to 8, wherein the one or more processors are further configured to: perform spatial processing on the audio signals based on the direction-of-arrival information to generate one or more beamformed audio signals; and send the one or more beamformed audio signals to the second device.

Example 10 includes the first device of any of Examples 1 to 9, wherein the memory and the one or more processors are integrated into a headset device, and wherein the second device corresponds to a mobile phone.

Example 11 includes the first device of any of Examples 1 to 9, wherein the one or more processors are integrated in a vehicle.

Example 12 includes the first device of any of Examples 1 to 11, further including a modem, wherein the data is sent to the second device via the modem.

Example 13 includes the first device of any of Examples 1 to 12, wherein the one or more processors are further configured to send a representation of the audio signals to the second device.

Example 14 includes the first device of Example 13, wherein the representation of the audio signals corresponds to one or more beamformed audio signals.

Example 15 includes the first device of any of Examples 1 to 14, wherein the one or more processors are further configured to generate a user interface output indicative of at least one of an environmental event or an acoustic event.

Example 16 includes the first device of any of Examples 1 to 15, wherein the one or more processors are further configured to receive, from the second device, data indicative of an acoustic event.

Example 17 includes the first device of any of Examples 1 to 16, wherein the one or more processors are further configured to: receive, from the second device, directional information associated with the audio signals; and perform an audio zoom operation based on the directional information.

Example 18 includes the first device of any of Examples 1 to 17, wherein the data based on the direction-of-arrival information includes a report indicating at least one detected event and a direction of the detected event.

Example 19 includes the first device of any of Examples 1 to 18, further including the multiple microphones.

Example 20 includes the first device of any of Examples 1 to 19, further including at least one speaker configured to output a sound associated with at least one of the audio signals.

Example 21 includes the first device of any of Example 1 to 20, wherein: the class corresponds to a category for a particular sound represented in the audio signals and associated with a particular audio event; and the embedding includes a signature or information that corresponds to the particular sound or the particular audio event and is configured to enable detection, via processing of other audio signals, of the particular sound or the particular audio event in the other audio signals.

According to Example 22, a system includes: the first device of any of Examples 1 to 21; and the second device. The second device includes one or more processors configured to: receive the data; and process the data to verify the class, to modify audio data representing a sound scene based on the direction-of-arrival information and the embedding to generate modified audio data corresponding to an updated sound scene, or both.

According to Example 23, a system includes: a first device including: a memory configured to store instructions; and one or more processors configured to: receive audio signals from multiple microphones; process the audio signals to generate direction-of-arrival information corresponding to one or more sources of sound represented in one or more of the audio signals; and send data based on the direction-of-arrival information and a class associated with the direction-of-arrival information; and a second device including one or more processors configured to: receive the data based on the direction-of-arrival information and the class; obtain audio data representing a sound associated with the direction-of-arrival information and the class; and verify the class based on at least the audio data and the direction-of-arrival information.

According to Example 24, a system includes: a first device including: a memory configured to store instructions; and one or more processors configured to: receive audio signals from multiple microphones; process the audio signals to generate direction-of-arrival information corresponding to one or more sources of sound represented in one or more of the audio signals; and send data based on the direction-of-arrival information and an embedding associated with the direction-of-arrival information; and a second device including one or more processors configured to: receive the data based on the direction-of-arrival information and the embedding; and process audio data representing a sound scene based on the direction-of-arrival information and the embedding to generate modified audio data corresponding to an updated sound scene.

According to Example 25, a method of processing audio includes: receiving, at one or more processors of a first device, audio signals from multiple microphones; processing the audio signals to generate direction-of-arrival information corresponding to one or more sources of sound represented in one or more of the audio signals; and sending, to a second device, data based on the direction-of-arrival information and a class or embedding associated with the direction-of-arrival information.

Example 26 includes the method of Example 25, further including processing signal data corresponding to the audio signals to determine the class or embedding.

Example 27 includes the method of Example 26, further including performing a beamforming operation on the audio signals to generate the signal data.

Example 28 includes the method of Example 26 or Example 27, wherein the signal data is processed at one or more classifiers to determine the class from among multiple classes supported by the one or more classifiers, for a sound represented in one or more of the audio signals and associated with an audio event, and wherein the class is sent to the second device.

Example 29 includes the method of any of Examples 26 to 28, wherein the signal data is processed at one or more encoders to generate the embedding, the embedding corresponding to a sound represented in one or more of the audio signals and associated with an audio event, and wherein the embedding is sent to the second device.

Example 30 includes the method of any of Examples 25 to 29, further including sending a representation of the audio signals to the second device.

Example 31 includes the method of any of Examples 25 to 30, further including: receiving, at one or more processors of the second device, the data based on the direction-of-arrival information and the class; obtaining, at the one or more processors of the second device, audio data representing a sound associated with the direction-of-arrival information and the class; and verifying the class, at the one or more processors of the second device, based on at least the audio data and the direction-of-arrival information.

Example 32 includes the method of any of Examples 25 to 31, further including: receiving, at one or more processors of the second device, the data based on the direction-of-arrival information and the embedding; and processing, at the one or more processors of the second device, audio data representing a sound scene based on the direction-of-arrival information and the embedding to generate modified audio data corresponding to an updated sound scene.

According to Example 33, a device comprises: a memory configured to store instructions; and a processor configured to execute the instructions to perform the method of any of Examples 25 to 30.

According to Example 34, a non-transitory computer-readable medium includes instructions that, when executed by one or more processors, cause the one or more processors to perform the method of any of Examples 25 to 30.

According to Example 35, an apparatus comprises means for carrying out the method of any of Examples 25 to 30.

According to an Example 36, a non-transitory computer-readable medium includes instructions that, when executed by one or more processors of a first device, cause the one or more processors to: receive audio signals from multiple microphones; process the audio signals to generate direction-of-arrival information corresponding to one or more sources of sound represented in one or more of the audio signals; and send, to a second device, data based on the direction-of-arrival information and a class or embedding associated with the direction-of-arrival information.

Example 37 includes the non-transitory computer-readable medium of Example 36, wherein the instructions are executable to further cause the one or more processors to send a representation of the audio signals to the second device.

Example 38 includes the non-transitory computer-readable medium of Example 37, wherein the representation of the audio signals corresponds to one or more beamformed audio signals.

According to Example 39, a first device includes: means for receiving audio signals from multiple microphones; means for processing the audio signals to generate direction-of-arrival information corresponding to one or more sources of sound represented in one or more of the audio signals; and means for sending, to a second device, data based on the direction-of-arrival information and a class or embedding associated with the direction-of-arrival information.

This disclosure includes the following third set of examples.

According to Example 1, a second device includes: a memory configured to store instructions; and one or more processors configured to: receive, from a first device, an indication of an audio class corresponding to an audio event.

Example 2 includes the second device of Example 1, wherein the one or more processors are further configured to: receive, from the first device, audio data representing a sound associated with the audio event; and process the audio data at one or more classifiers to verify that the sound corresponds to the audio event.

Example 3 includes the second device of Example 2, wherein the one or more processors are configured to provide the audio data and the indication of the audio class as inputs to the one or more classifiers to determine a classification associated with the audio data.

Example 4 includes the second device of Example 2 or Example 3, wherein the audio class corresponds to a vehicle event, and wherein the one or more processors are further configured to send a notification of the vehicle event to one or more third devices based on a location of the first device and locations of the one or more third devices.

Example 5 includes the second device of any of Examples 2 to 4, wherein the one or more processors are further configured to send a control signal to the first device based on an output of the one or more classifiers.

Example 6 includes the second device of Example 5, wherein the control signal instructs the first device to perform an audio zoom operation.

Example 7 includes the second device of Example 5 or Example 6, wherein the control signal instructs the first device to perform spatial processing based on a direction of a source of the sound.

Example 8 includes the second device of any of Examples 2 to 7, wherein the one or more processors are further configured to: receive, from the first device, direction data corresponding to a source of the sound; and provide the audio data, the direction data, and the indication of the audio class as inputs to the one or more classifiers to determine a classification associated with the audio data.

Example 9 includes the second device of any of Examples 2 to 8, wherein the audio data includes one or more beamformed signal.

Example 10 includes the second device of any of Examples 1 to 9, wherein the one or more processors are further configured to: receive, from the first device, direction data corresponding to a source of a sound associated with the audio event; update, based on the audio event, a map of directional sound sources in an audio scene to generate an updated map; and send data corresponding to the updated map to one or more third devices that are geographically remote from the first device.

Example 11 includes the second device of any of Examples 1 to 10, wherein the memory and the one or more processors are integrated into a mobile phone, and wherein the first device corresponds to a headset device.

Example 12 includes the second device of any of Examples 1 to 10, wherein the memory and the one or more processors are integrated into a vehicle.

Example 13 includes the second device of any of Examples 1 to 12, further including a modem, wherein the indication of the audio class is received via the modem.

Example 14 includes the second device of any of Examples 1 to 13, wherein the one or more processors are configured to selectively bypass direction-of-arrival processing on received audio data corresponding to the audio event based on whether direction-of-arrival information is received from the first device.

Example 15 includes the second device of any of Examples 1 to 14, wherein the one or more processors are configured to selectively bypass a beamforming operation based on whether received audio data corresponds to multi-channel microphone signals from the first device or corresponds to beamformed signals from the first device.

Example 16 includes the second device of any of Example 1 to 15, wherein: the audio class corresponds to a category for a particular sound represented in the audio signals and associated with the audio event.

According to Example 17, a system includes: the second device of any of Examples 1 to 16; and the first device. The first device includes one or more processors configured to: receive audio signals from one or more microphones; process the audio signals to determine the audio class; and send the indication of the audio class to the second device.

According to Example 18, a system includes: a first device including: one or more processors configured to: receive audio signals from one or more microphones; process the audio signals to determine an audio class corresponding to an audio event; and send the indication of the audio class; and a second device including one or more processors configured to: receive the indication of the audio class corresponding to the audio event.

According to Example 19, a method includes: receiving, at one or more processors of a second device, an indication of an audio class, the indication received from a first device and corresponding to an audio event; and processing, at the one or more processors of the second device, audio data to verify that a sound represented in the audio data corresponds to the audio event.

Example 20 includes the method of Example 19, further including receiving the audio data from the first device, and wherein the processing of the audio data includes providing the audio data as an input to one or more classifiers to determine a classification associated with the audio data.

Example 21 includes the method of Example 20, wherein the processing of the audio data further includes providing the indication of the audio class as a second input to the one or more classifiers to determine the classification associated with the audio data.

Example 22 includes the method of Example 20 or Example 21, further including sending a control signal to the first device based on an output of the one or more classifiers.

Example 23 includes the method of Example 22, wherein the control signal includes an audio zoom instruction.

Example 24 includes the method of Example 22 or Example 23, wherein the control signal includes an instruction to perform spatial processing based on a direction of a source of the sound.

Example 25 includes the method of any of Examples 19 to 24, wherein the audio class corresponds to a vehicle event, and the method further including sending a notification of the vehicle event to one or more third devices based on a location of the first device and locations of the one or more third devices.

Example 26 includes the method of any of Examples 19 to 25, further including: receiving, from the first device, direction data corresponding to a source of a sound associated with the audio event; updating, based on the audio event, a map of directional sound sources in an audio scene to generate an updated map; and sending data corresponding to the updated map to one or more third devices that are geographically remote from the first device.

Example 27 includes the method of any of Examples 19 to 26, further including selectively bypassing direction-of-arrival processing on received audio data corresponding to the audio event based on whether direction-of-arrival information is received from the first device.

Example 28 includes the method of any of Examples 19 to 27, further including selectively bypassing a beamforming operation based on whether received audio data corresponds to multi-channel microphone signals from the first device or corresponds to beamformed signals from the first device.

Example 29 includes the method of any of Examples 19 to 28, further including: receiving, at one or more processors of the first device, audio signals from one or more microphones; processing, at the one or more processors of the first device, the audio signals to determine the audio class; and sending the indication of the audio class from the first device to the second device.

According to Example 30, a device comprises: a memory configured to store instructions; and a processor configured to execute the instructions to perform the method of any of Examples 16 to 28.

According to Example 31, a non-transitory computer-readable medium includes instructions that, when executed by one or more processors, cause the one or more processors to perform the method of any of Examples 16 to 29.

According to Example 32, an apparatus comprises means for carrying out the method of any of Examples 16 to 28.

According to Example 33, a non-transitory computer-readable medium includes instructions that, when executed by one or more processors of a second device, cause the one or more processors to receive, from a first device, an indication of an audio class corresponding to an audio event.

Example 34 includes the non-transitory computer-readable medium of Example 33, wherein the instructions are executable to further cause the one or more processors to: receive, from the first device, audio data representing a sound associated with the audio event; and process the audio data at one or more classifiers to verify that the sound corresponds to the audio event.

Example 35 includes the non-transitory computer-readable medium of Example 34, wherein the instructions are executable to further cause the one or more processors to provide the audio data and the indication of the audio class as inputs to the one or more classifiers to determine a classification associated with the audio data.

Example 36 includes the non-transitory computer-readable medium of Example 34 or Example 35, wherein the instructions are executable to further cause the one or more processors to: receive, from the first device, direction data corresponding to a source of the sound; and provide the audio data, the direction data, and the indication of the audio class as inputs to the one or more classifiers to determine a classification associated with the audio data.

According to Example 37, an apparatus includes means for receiving an indication of an audio class, the indication received from a remote device and corresponding to an audio event; and means for processing audio data to verify that a sound represented in the audio data corresponds to the audio event.

According to Example 38, a second device includes: a memory configured to store instructions; and one or more processors configured to: receive, from a first device: audio data representing a sound; and an indication that the audio data corresponds to an audio class associated with a vehicle event; process the audio data at one or more classifiers to verify that the sound represented in the audio data corresponds to a vehicle event; and send a notification of the vehicle event to one or more third devices based on a location of the first device and locations of the one or more third devices.

According to Example 39, a method includes: receiving, at one or more processors of a second device, audio data from a first device and an indication from the first device that the audio data corresponds to an audio class associated with a vehicle event; processing the audio data at one or more classifiers of the second device to verify that the sound represented in the audio data corresponds to a vehicle event; and sending a notification of the vehicle event to one or more third devices based on a location of the first device and locations of the one or more third devices.

According to Example 40, a device comprises: a memory configured to store instructions; and a processor configured to execute the instructions to perform the method of Example 39.

According to Example 41, a non-transitory computer-readable medium includes instructions that, when executed by one or more processors of a second device, cause the one or more processors to perform the method of Example 39.

According to Example 42, an apparatus comprises means for carrying out the method of Example 39.

According to Example 43, a first device includes: a memory configured to store instructions; and one or more processors configured to: receive one or more audio signals from one or more microphones; process the one or more audio signals to determine whether a sound represented in one or more of the audio signals is from an identifiable direction; and selectively send, to a second device, direction-of-arrival information of a source of the sound based on the determination.

According to Example 44, a method includes: receiving, at one or more processors of a first device, one or more audio signals from one or more microphones; processing, at the one or more processors, the one or more audio signals to determine whether a sound represented in one or more of the audio signals is from an identifiable direction; and selectively sending, to a second device, direction-of-arrival information of a source of the sound based on the determination.

According to Example 45, a device comprises: a memory configured to store instructions; and a processor configured to execute the instructions to perform the method of Example 44.

According to Example 46, a non-transitory computer-readable medium includes instructions that, when executed by one or more processors of a first device, cause the one or more processors to perform the method of Example 44.

According to Example 47, an apparatus comprises means for carrying out the method of Example 44.

According to Example 48, a first device includes: a memory configured to store instructions; and one or more processors configured to: receive one or more audio signals from one or more microphones; determine, based on one or more criteria, whether to send the one or more audio signals to a second device or to send beamformed audio signals that are generated based on the one or more audio signals to the second device; and based on the determination, send audio data corresponding to the one or more audio signals or corresponding to the beamformed audio signals to the second device.

According to Example 49, a method includes: receiving, at one or more processors of a first device, one or more audio signals from one or more microphones; determining, at the one or more processors and based on one or more criteria, whether to send the one or more audio signals to a second device or to send beamformed audio signals that are generated based on the one or more audio signals to the second device; and based on the determination, send audio data corresponding to the one or more audio signals or corresponding to the beamformed audio signals to the second device.

According to Example 50, a device comprises: a memory configured to store instructions; and a processor configured to execute the instructions to perform the method of Example 49.

According to Example 51, a non-transitory computer-readable medium includes instructions that, when executed by one or more processors of a first device, cause the one or more processors to perform the method of Example 49.

According to Example 52, an apparatus comprises means for carrying out the method of Example 49.

According to Example 53, a second device includes: a memory configured to store instructions; and one or more processors configured to: receive, from a first device: audio data representing a sound; direction data corresponding to a source of the sound; and a classification of the sound as corresponding to an audio event; process the audio data to verify that the sound corresponds to the audio event; update, based on the audio event, a map of directional sound sources in an audio scene to generate an updated map; and send data corresponding to the updated map to one or more third devices that are geographically remote from the first device.

According to Example 54, a method includes: receiving, at one or more processors of a second device, audio data representing a sound, direction data corresponding to a source of the sound, and a classification of the sound as corresponding to an audio event, the audio data, the direction data, and the classification received from a first device; processing, at the one or more processors, the audio data to verify that the sound corresponds to the audio event; updating, at the one or more processors and based on the audio event, a map of directional sound sources in an audio scene to generate an updated map; and sending data corresponding to the updated map to one or more third devices that are geographically remote from the first device.

According to Example 55, a device comprises: a memory configured to store instructions; and a processor configured to execute the instructions to perform the method of Example 54.

According to Example 56, a non-transitory computer-readable medium includes instructions that, when executed by one or more processors of a second device, cause the one or more processors to perform the method of Example 54.

According to Example 57, an apparatus comprises means for carrying out the method of Example 54.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A first device comprising:
   a memory configured to store data; and
   one or more processors, coupled to the memory, wherein the one or more processors are configured to:
      receive audio signals from multiple microphones;
      process the audio signals to generate direction-of-arrival information corresponding to one or more sources of sound represented in one or more of the audio signals;
      send, to a second device, the data that is based on the direction-of-arrival information and a class or embedding associated with the direction-of-arrival information; and
      selectively send, based on an amount of available power at the first device, a representation of the audio signals to the second device.

2. The first device of claim 1, wherein the one or more processors are further configured to process signal data corresponding to the audio signals to determine the class or embedding.

3. The first device of claim 2, wherein the one or more processors are further configured to perform a beamforming operation on the audio signals to generate the signal data.

4. The first device of claim 2, wherein the one or more processors are further configured to process the signal data at one or more classifiers to determine the class from among multiple classes supported by the one or more classifiers, for a sound represented in one or more of the audio signals and associated with an audio event, and wherein the class is sent to the second device.

5. The first device of claim 2, wherein the one or more processors are further configured to process the signal data at one or more encoders to generate the embedding, the embedding corresponding to a sound represented in one or more of the audio signals and associated with an audio event, and wherein the embedding is sent to the second device.

6. The first device of claim 1, wherein one or more processors are further configured to process image data at one or more encoders to generate the embedding, the embedding corresponding to an object represented in the image data and associated with an audio event, and wherein the embedding is sent to the second device.

7. The first device of claim 6, further comprising one or more cameras configured to generate the image data.

8. The first device of claim 1, wherein:
   the class corresponds to a category for a particular sound represented in the audio signals and associated with a particular audio event; and
   the embedding includes a signature or information that corresponds to the particular sound or the particular audio event and is configured to enable detection, via processing of other audio signals, of the particular sound or the particular audio event in the other audio signals.

9. The first device of claim 1, wherein the one or more processors are further configured to:
   perform spatial processing on the audio signals based on the direction-of-arrival information to generate one or more beamformed audio signals, wherein the representation of the audio signals corresponds to the one or more beamformed audio signals.

10. The first device of claim 1, wherein the memory and the one or more processors are integrated into a headset device, and wherein the second device corresponds to a mobile phone.

11. The first device of claim 1, further comprising a modem, wherein the data is sent to the second device via the modem.

12. The first device of claim 1, wherein the representation of the audio signals corresponds to the audio signals, one or more beamformed audio signals, or reduced versions of the audio signals.

13. The first device of claim 1, wherein the one or more processors are further configured to generate a user interface output indicative of at least one of an environmental event or an acoustic event.

14. The first device of claim 1, wherein the one or more processors are further configured to receive, from the second device, data indicative of an acoustic event that is associated with a sound represented in one or more of the audio signals.

15. The first device of claim 1, wherein the one or more processors are further configured to:
   receive, from the second device, directional information associated with the audio signals; and
   perform an audio zoom operation based on the directional information.

16. The first device of claim 1, wherein the one or more processors are integrated in a vehicle.

17. The first device of claim 1, wherein the data based on the direction-of-arrival information includes a report indicating at least one detected event and a direction of the detected event.

18. The first device of claim 1, further comprising the multiple microphones.

19. The first device of claim 1, further comprising at least one speaker configured to output a sound associated with at least one of the audio signals.

20. A method of processing audio, the method comprising:
   receiving, at one or more processors of a first device, audio signals from multiple microphones;
   processing the audio signals to generate direction-of-arrival information corresponding to one or more sources of sound represented in one or more of the audio signals;

sending, to a second device, data based on the direction-of-arrival information and a class or embedding associated with the direction-of-arrival information; and selectively sending, based on an amount of available power at the first device, a representation of the audio signals to the second device.

21. The first device of claim 1, wherein, to selectively send the representation of the audio signals, the one or more processors are further configured to:

compare the amount of available power to a power threshold; and send the representation of the audio signals to the second device based on the amount of available power being greater than or equal to the power threshold.

22. The first device of claim 1, wherein, to selectively send the representation of the audio signals, the one or more processors are further configured to:

compare the amount of available power to a power threshold;

determine whether beamformed audio signals are available based on the amount of available power being less than the power threshold; and determine not to send the representation of the audio signals to the second device based on the beamformed audio signals being unavailable.

23. The first device of claim 1, wherein, to selectively send the representation of the audio signals, the one or more processors are further configured to:

compare the amount of available power to a power threshold;

determine whether beamformed audio signals are available based on the amount of available power being less than the power threshold; and send the representation of the audio signals to the second device based on the beamformed audio signals being available, wherein the representation of the audio signals corresponds to the beamformed audio signals.

24. The method of claim 20, further comprising:

processing signal data corresponding to the audio signals to determine the class or embedding; and performing a beamforming operation on the audio signals to generate the signal data.

25. The method of claim 20, further comprising:

processing signal data corresponding to the audio signals to determine the class or embedding, wherein the signal data is processed at one or more classifiers to determine the class from among multiple classes supported by the one or more classifiers, for a sound represented in one or more of the audio signals and associated with an audio event, and wherein the class is sent to the second device.

26. The method of claim 20, wherein the data is sent to the second device to enable distributed audio processing at a distributed audio system that includes the first device and the second device, the distributed audio processing including one or more low complexity audio processing operations associated with the first device.

27. The method of claim 20, further comprising:

receiving, at one or more processors of the second device, the data based on the direction-of-arrival information and the class;

obtaining, at the one or more processors of the second device, audio data representing a sound associated with the direction-of-arrival information and the class; and verifying the class, at the one or more processors of the second device, based on at least the audio data and the direction-of-arrival information.

28. The method of claim 20, further comprising:

receiving, at one or more processors of the second device, the data based on the direction-of-arrival information and the embedding; and processing, at the one or more processors of the second device, audio data representing a sound scene based on the direction-of-arrival information and the embedding to generate modified audio data corresponding to an updated sound scene.

29. A non-transitory computer-readable medium comprising instructions that, when executed by one or more processors of a first device, cause the one or more processors to:

receive audio signals from multiple microphones;

process the audio signals to generate direction-of-arrival information corresponding to one or more sources of sound represented in one or more of the audio signals;

send, to a second device, data based on the direction-of-arrival information and a class or embedding associated with the direction-of-arrival information; and selectively send, based on an amount of available power, a representation of the audio signals to the second device.

30. A first device comprising:

means for receiving audio signals from multiple microphones;

means for processing the audio signals to generate direction-of-arrival information corresponding to one or more sources of sound represented in one or more of the audio signals;

means for sending, to a second device, data based on the direction-of-arrival information and a class or embedding associated with the direction-of-arrival information; and means for selectively sending, based on an amount of available power, a representation of the audio signals to the second device.

* * * * *